United States Patent
Gornick et al.

(10) Patent No.: US 12,424,066 B2
(45) Date of Patent: Sep. 23, 2025

(54) MOTION-VALIDATING REMOTE MONITORING SYSTEM

(71) Applicant: Pivotal Vision, LLC, Bloomington, MN (US)

(72) Inventors: John R. Gornick, Inver Grove Heights, MN (US); Craig B. Moksnes, St. Paul, MN (US)

(73) Assignee: Pivotal Vision, LLC, Bloomington, MN (US)

( * ) Notice: Subject to any disclaimer, the term of this patent is extended or adjusted under 35 U.S.C. 154(b) by 8 days.

(21) Appl. No.: 16/397,118

(22) Filed: Apr. 29, 2019

(65) Prior Publication Data

US 2019/0258868 A1 Aug. 22, 2019

Related U.S. Application Data

(63) Continuation of application No. 15/049,711, filed on Feb. 22, 2016, now Pat. No. 10,275,658, which is a
(Continued)

(51) Int. Cl.
*G06K 9/00* (2022.01)
*G06T 7/20* (2017.01)
(Continued)

(52) U.S. Cl.
CPC .............. *G08B 13/194* (2013.01); *G06T 7/20* (2013.01); *G06T 7/292* (2017.01); *G06T 7/70* (2017.01);
(Continued)

(58) Field of Classification Search
CPC .............. G06K 9/00624; G06K 9/0063; G06K 9/00771; G06K 9/32; G06T 7/20;
(Continued)

(56) References Cited

U.S. PATENT DOCUMENTS 5,339,085 A 8/1994 Katoh et al.
5,850,352 A * 12/1998 Moezzi .................. G06T 15/10
345/419

(Continued)

FOREIGN PATENT DOCUMENTS

EP 1045591 A2 10/2000
JP 2007-74731 3/2007
(Continued)

OTHER PUBLICATIONS

Collins et al., "A System for Video Surveillance and Monitoring", Tech. Report CMU-RI-TR-00-12, Robotics Institute, Carnegie Melon University, May 2000, pp. 1-69 (Year: 2000).*

(Continued)

*Primary Examiner* — Eric Rush
(74) *Attorney, Agent, or Firm* — Patterson Thuente IP

(57) ABSTRACT

A method of autonomously monitoring a remote site, including the steps of locating a primary detector at a site to be monitored; creating one or more geospatial maps of the site using an overhead image of the site; calibrating the primary detector to the geospatial map using a detector-specific model; detecting an object in motion at the site; tracking the moving object on the geospatial map; and alerting a user to the presence of motion at the site. In addition thermal image data from a infrared cameras, rather than optical/visual image data, is used to create detector-specific models and geospatial maps in substantially the same way that optical cameras and optical image data would be used.

18 Claims, 38 Drawing Sheets

Related U.S. Application Data continuation of application No. 14/023,922, filed on Sep. 11, 2013, now Pat. No. 9,286,518, which is a continuation of application No. 12/167,877, filed on Jul. 3, 2008, now Pat. No. 8,542,872.

(60) Provisional application No. 60/958,192, filed on Jul. 3, 2007.

(51) Int. Cl.
| | |
|---|---|
| G06T 7/292 | (2017.01) |
| G06T 7/70 | (2017.01) |
| G06T 17/05 | (2011.01) |
| G06V 10/24 | (2022.01) |
| G06V 20/40 | (2022.01) |
| G06V 20/52 | (2022.01) |
| G08B 13/194 | (2006.01) |
| G08B 13/196 | (2006.01) |
| H04N 5/14 | (2006.01) |

(52) U.S. Cl.
CPC ............ *G06T 17/05* (2013.01); *G06V 10/24* (2022.01); *G06V 20/44* (2022.01); *G06V 20/52* (2022.01); *G08B 13/19602* (2013.01); *G08B 13/19604* (2013.01); *G08B 13/19608* (2013.01); *G08B 13/1961* (2013.01); *G08B 13/1963* (2013.01); *G08B 13/19641* (2013.01); *G08B 13/19645* (2013.01); *H04N 5/144* (2013.01); *G06T 2207/30232* (2013.01)

(58) Field of Classification Search
CPC ......... G06T 7/215; G06T 7/223; G06T 7/292; G06T 7/50; G06T 7/55; G06T 7/70; G06T 7/73; G06T 7/74; G06T 7/75; G06T 7/77; G06T 7/80; G06T 2207/30232; G06T 17/05; H04N 5/144; H04N 5/145; G08B 13/194; G08B 13/196; G08B 13/19602; G08B 13/19604; G08B 13/19608; G08B 13/1961; G08B 13/1963; G08B 13/19641; G08B 13/19645; G06V 10/24; G06V 10/248; G06V 10/96; G06V 20/10; G06V 20/20; G06V 20/41; G06V 20/44; G06V 20/52; G06V 20/70; G06V 2201/07; G06V 2201/08
USPC ....... 382/100, 103, 106, 107, 154, 285, 294; 348/143, 153–155, 159

See application file for complete search history.

(56) References Cited

U.S. PATENT DOCUMENTS

| | | | |
|---|---|---|---|
| 5,966,074 A * | 10/1999 | Baxter | G08B 13/19602 348/157 |
| 6,359,647 B1 | 3/2002 | Sengupta et al. | |
| 6,681,058 B1 | 1/2004 | Hanna et al. | |
| 6,778,705 B2 | 8/2004 | Gutta et al. | |
| 6,867,799 B2 | 3/2005 | Broemmelsiek | |
| 6,950,123 B2 | 9/2005 | Martins | |
| 6,987,883 B2 | 1/2006 | Lipton et al. | |
| 6,999,600 B2 | 2/2006 | Venetianer et al. | |
| 7,068,842 B2 | 6/2006 | Liang et al. | |
| 7,190,809 B2 | 3/2007 | Gutta et al. | |
| 7,259,778 B2 | 8/2007 | Arpa | |
| 7,536,028 B2 | 5/2009 | Sumitomo | |
| 7,593,547 B2 | 9/2009 | Mittal et al. | |
| 7,633,520 B2 | 12/2009 | Samarasekera et al. | |
| 7,720,257 B2 | 5/2010 | Morellas et al. | |
| 7,746,343 B1 * | 6/2010 | Charaniya | G06F 16/248 345/428 |
| 7,796,154 B2 | 9/2010 | Senior et al. | |
| 8,542,872 B2 | 9/2013 | Gornick et al. | |
| 8,614,741 B2 * | 12/2013 | Carlbom | H04N 21/23418 348/143 |
| 9,286,518 B2 | 3/2016 | Gornick et al. | |
| 10,275,658 B2 | 4/2019 | Gornick et al. | |
| 2001/0038718 A1 | 11/2001 | Kumar et al. | |
| 2002/0030741 A1 * | 3/2002 | Broemmelsiek | H04N 7/188 348/169 |
| 2003/0085992 A1 * | 5/2003 | Arpa | G06T 7/251 348/153 |
| 2004/0105573 A1 * | 6/2004 | Neumann | G06T 17/00 382/103 |
| 2004/0130620 A1 | 7/2004 | Buehler et al. | |
| 2004/0156530 A1 | 8/2004 | Brodsky et al. | |
| 2004/0246336 A1 | 12/2004 | Kelly, III et al. | |
| 2005/0073585 A1 * | 4/2005 | Ettinger | H04N 7/18 348/155 |
| 2005/0166163 A1 | 7/2005 | Chang et al. | |
| 2005/0276462 A1 * | 12/2005 | Silver | H04N 5/772 382/141 |
| 2006/0007308 A1 * | 1/2006 | Ide | G06T 7/73 348/E7.086 |
| 2006/0077255 A1 * | 4/2006 | Cheng | G08B 13/1965 348/143 |
| 2007/0035627 A1 | 2/2007 | Cleary et al. | |
| 2007/0039030 A1 * | 2/2007 | Romanowich | H04N 5/247 725/105 |
| 2007/0052858 A1 | 3/2007 | Zhou et al. | |
| 2007/0058040 A1 | 3/2007 | Zhang et al. | |
| 2007/0070190 A1 | 3/2007 | Yin et al. | |
| 2008/0030579 A1 | 2/2008 | Kelly, III et al. | |
| 2008/0074494 A1 | 3/2008 | Nemethy et al. | |
| 2008/0101652 A1 | 5/2008 | Zhao et al. | |
| 2009/0010493 A1 | 1/2009 | Gornick et al. | |
| 2009/0315978 A1 | 12/2009 | Wurmlin et al. | |
| 2014/0064560 A1 | 3/2014 | Gornick et al. | |
| 2014/0375819 A1 | 12/2014 | Larsen et al. | |
| 2016/0224840 A1 | 8/2016 | Gornick et al. | |

FOREIGN PATENT DOCUMENTS

| | | |
|---|---|---|
| KR | 2007-0000107 | 1/2001 |
| WO | WO 01/84844 A1 | 11/2001 |

OTHER PUBLICATIONS

Sinha et al., "Least Squares Fitting of Two Planar Point Sets for Use in Photolithography Overlay Alignment", *SPIE*, vol. 3303, 1998, pp. 44-52.

Tsai, "A Versatile Camera Calibration Technique for High-Accuracy 3D Machine Vision Metrology Using Off-the-Shelf TV Camera and Lenses", *IEEE J. Robotics and Automation*, vol. RA-3, No. 4, Aug. 1987, pp. 323-344.

Sibson, "Chapter 2—A Brief Description of Natural Neighbour Interpolation," *Interpreting Multivariate Data*, 1981 ©, pp. 21-36.

Collins et al. "Algorithms for Cooperative Multisensor Surveillance." Proceedings of the IEEE. 89.19 (2001): 1456-1477.

Collins et al., "A System for Video Surveillance and Monitoring," Tech. Report CMU-RI-TR-00-12, Robotics Institute, Carnegie Melon University, May 2000, 69 pages.

Search Report and Written Opinion dated Feb. 6, 2009 for PCT Application No. PCT/US2008/069222 filed Jul. 3, 2008, 8 pages.

Application and File history for U.S. Appl. No. 12/167,877, filed Jul. 3, 2008. Inventors: John R. Gornick et al.

Application and File history for U.S. Appl. No. 14/023,922, filed Sep. 11, 2013. Inventors: John R. Gornick et al.

Application and File history for U.S. Appl. No. 15/049,711, filed Feb. 22, 2016. Inventors: John R. Gornick et al.

Application and File history for U.S. Appl. No. 14/313,653, filed Jun. 24, 2014. Inventors: Colin Larsen et al.

(56) References Cited

OTHER PUBLICATIONS

Application and File history for U.S. Appl. No. 15/904,976, filed Feb. 26, 2018. Inventors: Colin Larsen et al.

* cited by examiner

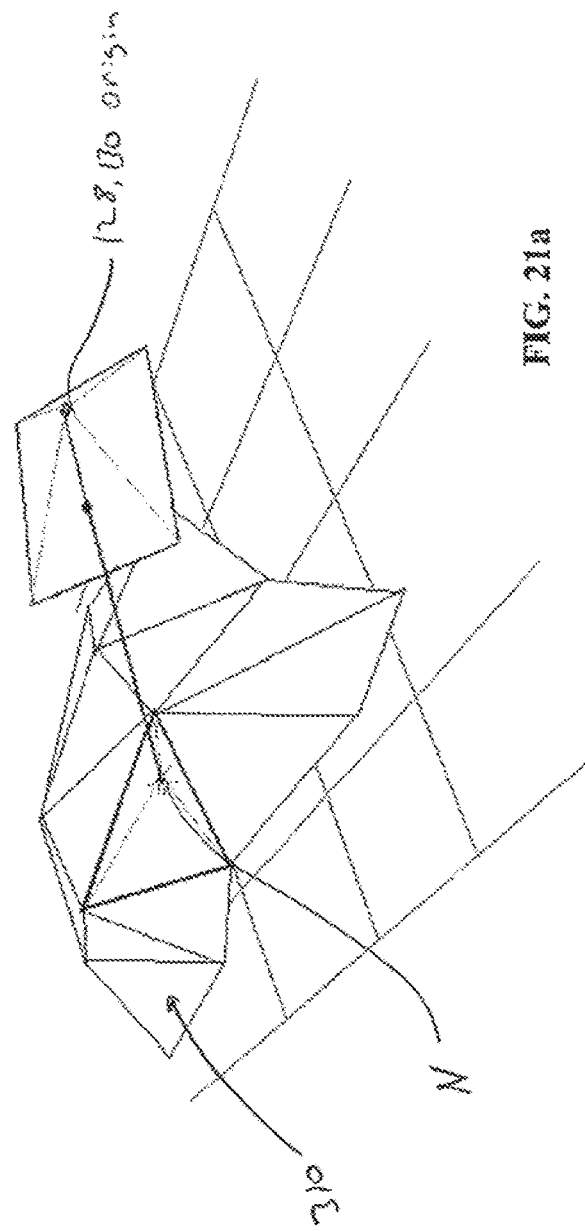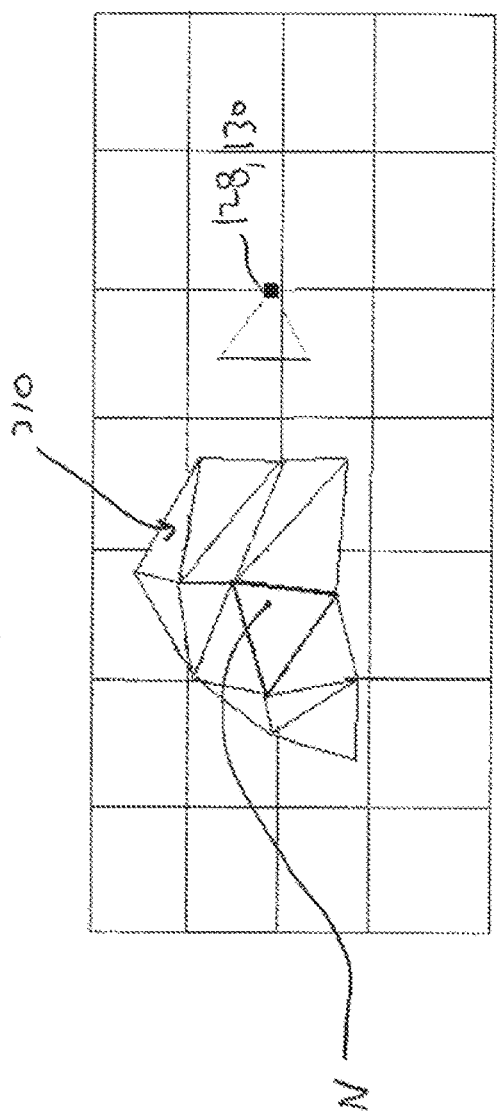
FIG. 21a
FIG. 21b

| $HP_{1,1}$ | $P_{1,1}$ | $P_{1,1}I_1$ | $P_{1,1}I_2$ | $P_{1,1}I_3$ | $P_{1,1}I_4$ | $P_{1,1}I_5$ | $P_{1,1}I_6$ | $P_{1,1}I_7$ | $P_{1,1}I_8$ | $P_{1,1}I_9$ | $P_{1,1}I_N$ | $P_{1,1}I_{avg}$ | $P_{1,1}$ Span |
|---|---|---|---|---|---|---|---|---|---|---|---|---|---|
| $HP_{1,2}$ | $P_{1,2}$ | $P_{1,2}I_1$ | $P_{1,2}I_2$ | $P_{1,2}I_3$ | $P_{1,2}I_4$ | $P_{1,2}I_5$ | $P_{1,2}I_6$ | $P_{1,2}I_7$ | $P_{1,2}I_8$ | $P_{1,2}I_9$ | $P_{1,2}I_N$ | $P_{2,1}I_{avg}$ | $P_{2,1}$ Span |
| $HP_{a,b}$ | $P_{a,b}$ | $P_{a,b}I_1$ | $P_{a,b}I_2$ | $P_{a,b}I_3$ | $P_{a,b}I_4$ | $P_{a,b}I_5$ | $P_{a,b}I_6$ | $P_{a,b}I_7$ | $P_{a,b}I_8$ | $P_{a,b}I_9$ | $P_{a,b}I_N$ | $P_{a,b}I_{avg}$ | $P_{a,b}$ Span |

FIG. 24

| | | | | | | | | | | | | |
|---|---|---|---|---|---|---|---|---|---|---|---|---|
| $HP_{1,1}$ | $P_{1,1}$ | 100 | 105 | 90 | 80 | 120 | 75 | 90 | 90 | 102 | 108 | 96 | 13.6 |
| $HP_{1,2}$ | $P_{1,2}$ | 99 | 98 | 97 | 97 | 96 | 99 | 102 | 103 | 105 | 102 | 100 | 3.0 |
| $HP_{a,b}$ | $P_{a,b}$ | 84 | 84 | 86 | 85 | 90 | 86 | 82 | 90 | 94 | 98 | 88 | 5.0 |

FIG. 25

| $HP_{i,t}$ $t=0$ | $P_{1,1}I_1$ | $P_{1,1}I_2$ | $P_{1,1}I_3$ | $P_{1,1}I_4$ | $P_{1,1}I_5$ | $P_{1,1}I_6$ | $P_{1,1}I_7$ | $P_{1,1}I_8$ | $P_{1,1}I_9$ | $P_{1,1}I_{10}$ | $P_{1,1}I_{avg}$ | $P_{1,1}$ Span |
|---|---|---|---|---|---|---|---|---|---|---|---|---|
|  | 105 | 90 | 80 | 120 | 75 | 90 | 90 | 102 | 108 | 195 | 96 | 12.1 |

FIG. 27a

| $HP_{i,t}$ $t=1$ | $P_{1,1}I_1$ | $P_{1,1}I_2$ | $P_{1,1}I_3$ | $P_{1,1}I_4$ | $P_{1,1}I_5$ | $P_{1,1}I_6$ | $P_{1,1}I_7$ | $P_{1,1}I_8$ | $P_{1,1}I_9$ | $P_{1,1}I_{10}$ | $P_{1,1}I_{avg}$ | $P_{1,1}$ Span |
|---|---|---|---|---|---|---|---|---|---|---|---|---|
|  | 90 | 80 | 120 | 75 | 90 | 90 | 102 | 108 | 195 | 90 | 96 | 12.1 |

FIG. 27b

| $HP_{i,t}$ $t=2$ | $P_{1,1}I_1$ | $P_{1,1}I_2$ | $P_{1,1}I_3$ | $P_{1,1}I_4$ | $P_{1,1}I_5$ | $P_{1,1}I_6$ | $P_{1,1}I_7$ | $P_{1,1}I_8$ | $P_{1,1}I_9$ | $P_{1,1}I_{10}$ | $P_{1,1}I_{avg}$ | $P_{1,1}$ Span |
|---|---|---|---|---|---|---|---|---|---|---|---|---|
|  | 80 | 120 | 75 | 90 | 90 | 102 | 108 | 195 | 90 | 101 | 96 | 12.1 |

FIG. 27c

| $HP_{i,t}$ $t=10$ | $P_{1,1}I_1$ | $P_{1,1}I_2$ | $P_{1,1}I_3$ | $P_{1,1}I_4$ | $P_{1,1}I_5$ | $P_{1,1}I_6$ | $P_{1,1}I_7$ | $P_{1,1}I_8$ | $P_{1,1}I_9$ | $P_{1,1}I_{10}$ | $P_{1,1}I_{avg}$ | $P_{1,1}$ Span |
|---|---|---|---|---|---|---|---|---|---|---|---|---|
|  | 90 | 101 | 96 | 102 | 105 | 98 | 99 | 100 | 96 | 92 | 98 | 4.6 |

FIG. 27d

FIG. 30 — LMI

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 13 | 8 | 11 | 9 |
| 0 | 0 | 0 | 0 | 0 | 10 | 15 | 14 | 19 | 10 |
| 0 | 0 | 0 | 0 | 0 | 0 | 12 | 18 | 15 | 14 |
| 0 | 0 | 0 | 0 | 0 | 0 | 0 | 13 | 13 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 31 — FLMI, $400_{FLMI}$

| 0 | 0 | 0 | 0 | 0 | 0 | 4 | 3 | 3 | 0 |
|---|---|---|---|---|---|---|---|---|---|
| 0 | 0 | 0 | 0 | 0 | 2 | 10 | 10 | 12 | 6 |
| 0 | 0 | 0 | 0 | 0 | 8 | 15 | 16 | 16 | 10 |
| 0 | 0 | 0 | 0 | 0 | 0 | 12 | 16 | 16 | 11 |
| 0 | 0 | 0 | 0 | 0 | 0 | 0 | 11 | 11 | 0 |
| 0 | 0 | 0 | 0 | 6 | 0 | 0 | 6 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

MOTION-VALIDATING REMOTE MONITORING SYSTEM

RELATED APPLICATIONS

This application is a continuation of application Ser. No. 15/049,711 filed Feb. 22, 2016, which in turn is a continuation of application Ser. No. 14/023,922, filed Sep. 11, 2013, now U.S. Pat. No. 9,286,518 issued Mar. 15, 2016, which in turn is continuation of application Ser. No. 12/167,877, filed Jul. 3, 2008, now U.S. Pat. No. 8,542,872 issued Sep. 24, 2013, which claims the benefit of U.S. Provisional Application No. 60/958,192, filed Jul. 3, 2007, each of which is hereby fully incorporated herein by reference.

FIELD OF THE INVENTION

The invention relates generally to remote monitoring and security systems. More specifically, the invention relates to motion-validating remote monitoring systems and methods.

BACKGROUND OF THE INVENTION

Standard closed-circuit television (CCTV) systems have long been used to monitor locations requiring security. Such CCTV systems remotely monitor buildings, military installations, infrastructure, industrial processes, and other sensitive locations. As real and perceived threats against persons and property grow, the list of locations requiring remote security monitoring also grows. For example, regularly unmanned infrastructure such as power substations, oil rigs, bridges, and so on, may now require protection through remote monitoring.

These traditional video surveillance systems may include networked video detectors, sensors, and other equipment connected to a central site. One of the drawbacks to such traditional monitoring systems is that they often rely on human supervision to view video images, interpret the images, and determine a relevant course of action such as alerting authorities. The high cost of manning such systems makes them impractical when a large number of remote sites require monitoring. Furthermore, a lack of automation in analysis and response increases response time and decreases reliability.

Known automated monitoring systems solve many of these problems. Such known automated systems digitally capture and stream video images, detect motion, and provide automatic alerts based on parameters such as motion, sound, heat and other parameters. However, these known automated systems often require large transmission bandwidths, provide only limited control over remote devices, remain sensitive to network issues, and struggle with accurate image and motion recognition.

Therefore, a need exists for reliable systems and methods of remote monitoring that require limited bandwidth, while providing accurate motion recognition and intelligent alert capabilities.

SUMMARY OF THE INVENTION

The present invention provides systems and methods to autonomously and seamlessly track moving objects in real-time over an entire remotely-monitored site. The present invention automatically and accurately detects and tracks moving objects at a monitored site using one or more primary detectors, without requiring secondary detectors, human operators, or other input sources to confirm or track the motion. Virtual models of each detector are created and linked to a common geospatial map. Tying together the separate virtual models on the common geospatial map creates a real time virtual model of an entire geographic area including the modeling of detected objects that are located and tracked across a site. When motion is detected, a primary detector is moved to, or trained on, the precise X-Y coordinate location of actual motion, rather than a pre-defined location. Tracking occurs continuously, and in real time, across the entire monitored site, even when objects move out of the detection range of one detector, and into the detection range of another detector. Multiple detectors monitoring detected motion at a site follow priority rules provided by an on-site controller to autonomously track a moving object. After motion has been validated, a user may be notified via one or more communication methods and presented with a sequence of relevant motion images.

In addition, thermal image data from infrared cameras, rather than optical/visual image data, is used in substantially the same way that optical cameras and optical image data would be used. In the same manner, when gathering temperature data from multiple detectors, users may be notified and presented with a sequence of relevant temperature images when changes occur and along with the geospatial location of the temperature measurement.

In one embodiment, the present invention is a method of autonomously monitoring a remote site, including the steps of locating a primary detector at a site to be monitored; creating one or more geospatial maps of the site using an overhead image of the site; calibrating the primary detector to the geospatial map using a detector-specific model; detecting an object in motion at the site; tracking the moving object on the geospatial map; and alerting a user to the presence of motion at the site.

In another embodiment, the present invention is a motion-validating monitoring system that includes a primary PTZ detector, a secondary detector, and an on-site detector controller. The on-site detector controller is adapted to receive image data from the primary PTZ detector and the secondary detector, and to use the data to create one or more detector-specific, three-dimensional models of the image viewed by the detector, the detector-specific model being capable of determining the precise location of a detected object in motion. The on-site detector controller is further adapted to project the location of the object in motion detected and located by each detector-specific model, to a geospatial map.

BRIEF DESCRIPTION OF THE DRAWINGS

FIG. 21a is a perspective diagram of a detector view of the point of FIG. 18 as projected onto a three-dimensional virtual model of a detector, according to an embodiment of the present invention;

FIG. 21b is an elevation diagram of the detector view of FIG. 21a;

FIG. 24 is a diagram of several one-dimensional pixel history arrays, according to an embodiment of the present invention;

FIG. 25 is a diagram of several one-dimensional pixel history arrays with sample pixel intensity values, according to an embodiment of the present invention

FIG. 27a is a pixel history array at time t=0, according to an embodiment of the present invention;

FIG. 27b is the pixel history array of FIG. 27a at time t=1;

FIG. 27c is the pixel history array of FIG. 27a at time t=2;

FIG. 27d is the pixel history array of FIG. 27a at time t=10;

FIG. 30 is a last motion image array, according to an embodiment of the present invention;

FIG. 31 is a filtered last motion image array, according to an embodiment of the present invention;

Figure 1:
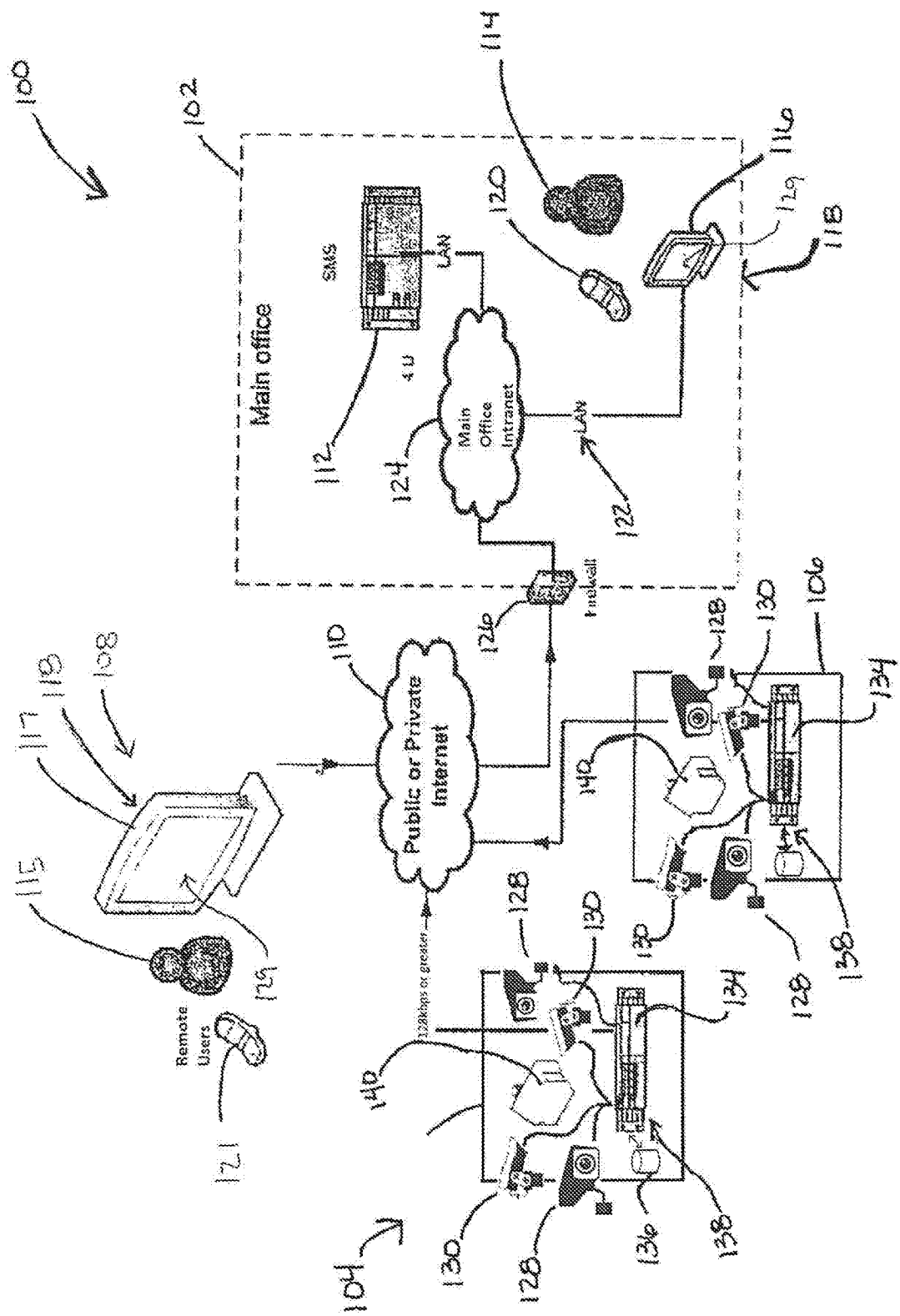
FIG. 1 is a system diagram of a motion-validating remote monitoring system, according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Referring to FIG. 1, in one embodiment, the present invention is a motion validating monitoring system 100 that includes a main office 102, a first remote site 104, an optional second remote site 106, a remote user location 108, and Internet 110. System 100 may include additional remote sites depending on the number of locations requiring remote monitoring. Main office 102 connects to remote sites 104 and 106, and with remote user location 108 via Internet 110.

In one embodiment, main office 102 includes a ScadaCam Management Server (SMS) 112, internal office user 114, computer terminal 116 with multi-detector viewer (MCV) software 118, wireless communication device 120, local area network (LAN) 122, main office intranet 124, and firewall 126. Wireless communication device 120 may be a mobile telephone, pager, or other wireless handheld communication device. Computer terminal 116 connects to SMS 112 via main office intranet 124 and LAN 122. In other embodiments of main office 102, computer terminal 116 connects directly to SMS 112. Main office 102 connects to Internet 110, that may be a public or private internet, through firewall 126.

In one embodiment, remote sites 104 and 106 each include one or more secondary detectors 128, one or more primary pan-tilt-zoom (PTZ) detectors 130, raw data 132 comprising detector images 129, on-site detector controller (ODC) 134 with database 136, processed site data 138, and optional structure 140. Secondary detectors 128 include fixed cameras that may be digital or analog video cameras that provide video output of all or a portion of a remote site. Secondary detectors 128 may include single-, or limited-function detectors such as motion detectors, fence shakers, door and window sensors, and so on. Generally, secondary detectors 128 provide a single view of all or a portion of a remote site 104 or 106, and do not pan or tilt.

Primary PTZ detectors 130, include PTZ cameras and other detectors that provide pan, tilt, and zoom capabilities, and may be controlled by a number of remote or local sources, including, but not limited to, ODC 134. In some embodiments, primary PTZ detectors may not all be capable of panning, tilting, or zooming.

Although embodiments of system 100 discussed herein include the use of secondary detectors 128, unlike most previously known systems, system 100 of the present invention does not require the use of secondary detectors 128. Previously known motion-tracking systems typically rely on secondary detectors, usually fixed optical cameras, to firstly detect motion. Then, based on the detection viewed by a secondary detector, a PTZ camera is panned, tilted, and/or zoomed to a predefined coordinate within the field of view of the secondary camera that detected motion to view the purported motion. Motion is confirmed using the PTZ camera, and once the moving object moves out of view of the secondary camera, the PTZ camera no longer tracks. Accordingly, and unlike system 100 of the present invention, a secondary detector working in conjunction with a primary PTZ detector is required to detect motion. System 100 does not require a secondary detector, and is capable of moving immediately to a location of detected motion, rather than a predetermined location.

Secondary detectors 128 and primary PTZ detectors 130 connect to ODC 134 using wired, wireless, fiber, USB, or other appropriate technologies. In other embodiments, remote site 104 or 106 may include other monitoring and sensing devices, such as motion detectors, sound recorders, door or gate switches, perimeter security devices, and so on, in addition to video cameras.

ODC 134 coordinates and provides a number of different functions such as an integrated digital video recorder (DVR), motion detection, motion following automation engine, communications managers, self-health monitors, local I/O management, while processing all inputs, raw data 132, such as image data, and requests, and ultimately producing an output of videos and images 129, or processed site data 138. Motion following entails directing one or more detectors to follow objects in motion according to priority rules and detector availability rules as described further below. ODC 134 includes electronic components such as processors, memory devices, and so on, especially adapted to implement the algorithms and methods described below. Such algorithms and methods may take the form of software modules, each adapted to perform one or many of the functions describe herein.

ODC 134 may connect to Internet 110 via wired or wireless technology. In some embodiments, ODC 134 may connect to Internet 110 using DSL, broadband, fiber optics, or other high-speed connection. However, high-speed connectivity may not be available at many remote sites 104 or 106, so slower speed connectivity, for example, narrowband transmission over a telephone network, may be used.

Remote sites 104 and 106 may also include structures 140 to be monitored by system 100. Structure 140 may be a building, power substation, industrial equipment, or any other item requiring monitoring. In other embodiments, remote site 104 may be a geographical area that does not include a structure 140.

In one embodiment, remote user location 108 includes a remote user 115, computer terminal 117 with multi-camera viewer (MCV) software modules 118, and wireless communication device 121. Computer terminal 117 connects to Internet 110, linking it to the other devices in system 100. Remote user 115 gains access to system 100 for viewing detectors 128 and 130, configuring the system, and accessing reports. Multi-camera viewer software generally includes the capability to view images communicated from ODCs 134 at remote sites 104, 106.

In general operation, detectors 128 and 130 monitor remote sites 104 and 106, feeding video images or raw data 132 to an ODC 134 at each site. ODC 134 manages and controls detectors 128 and 130, directing them to track objects in motion, processes raw data 132, and communicates processed site data 138, which may include video and report information, to main office 102, and remote user sites, via Internet 110. Data 138 is received by SMS 112 and made accessible to internal office users 114 or remote users 115 running MCV software 118 on their respective computer terminals 116 and 46. Alternatively, SMS 112 may wirelessly transmit selected information, such as alarms in e-mail or text messaging formats, to a user's wireless communication device 120.

In one embodiment, because all resources attach to SMS 112, networking installation and security becomes easy. Not having to route all users out to remote site devices maintains security. Also, because of this topology, remote users 115 are attaching to SMS 112 usually over a high-speed network, providing very quick access to videos and report information. Conversely, if remote users 115 were to attach directly to remote site devices to obtain videos and information, the slow-speed connection typically used to connect the remote devices to an internet, would dramatically slow access to the information, despite a user's high-speed connection to an internet.

As such, the present invention at least delivers a reliable, cost-effective solution for remote security and monitoring, eliminating the need for round-the-clock human supervision of remote sites 104 and 106. Further system 100 provides automated unattended surveillance of remote sites 104 and notifies users 115 and 114 within seconds of an alarm-level event through a monitoring application, e-mail, or text message. After an alarm notification, a user 115 or 114 may retrieve live streaming feed or view recently recorded high-resolution digital video or images from remote sites 104 or 106.

As will be described in further detail below, and unlike previously known systems, system 100 creates and uses mathematical, three-dimensional virtual models of each detector 128, 130, referenced as detector-specific models, or detector models 160 below. These detector-specific models 160 are linked to a single master model of site 104, referenced as geospatial map 154 below. Detector models 160 simulate all physical awareness of each detector 128, 130 and autonomously track any motion activity that any of the detectors 128, 130 detect. All motion activities are placed on to the master mathematical model geospatial map 154 for seamless, real-time, detector-to-detector tracking of objects in motion.

A key difference between system 100 and known systems is that known systems solely use the actual detector to keep track of objects in motion. Once an object leaves the view of a detector of a previously known monitoring system, the system no longer knows where the object is located. The systems and methods of the present invention only use what each detector 128, 130 sees as an intelligence gathering vehicle, regarding object size and x-y-z coordinate location, and places it in geospatial map 154. The tracking actually goes on inside the geospatial model, geospatial map 154, a scaled simulation, rather than at the real-life detector 128, 130.

After detector-specific model 160, a three-dimensional spatial environment (x, y, z) of a remote site 104 is built, the 4th dimension of time is added where the real world object's size, speed and trajectory of an object 166 is mathematically simulated using a view from each detector 128, 130, at different angles from the object. Trajectories of objects 166 being tracked can be plotted and paths mathematically can be forecasted.

Moving objects 166 can pass behind obstructions on site 104, blocking it from the view of detectors 128, 130 but system 100 can do detector handoffs in the geospatial model to seamlessly continue tracking as an object 166 leaves the view of one detector and comes into the view of the next one. This can occur only because the tracking and hand offs are done inside the model as opposed to the real world field detectors.

Further, a broad unique feature of motion-validating security system 100 is that it is able to track objects 166 in motion, with a changing background, using multiple primary PTZ detectors 130, and optionally with secondary detectors 128.

As described below in further detail, the present invention also includes a method of managing, grouping, and identifying all objects present within the spatial environment. The information is again filtered through algorithms to further classify the metric information as a whole. Physical width in scale, height in scale, color histogram computation, speed parameters, current spatial location, and projected trajectory all associated to a motion alert zone are processed. All objects from all detectors 128, 130 in the area are tracked independently and objects 166 that pass the algorithms filtering will now be considered of high importance, or validated objects. As described below, validated objects are those objects that ultimately are projected to geospatial map 154.

The present invention is also a determination process that occurs against all of the information and variances of objects 166 to make a determination whether each validated object is a threat and needs to be reported to a user. In addition to the physical width in scale, height in scale, color histogram computation, speed parameters, current spatial location, and projected trajectory the object is placed with exception to user identified motion alert zones to determine the appropriate reporting scenario.

Figure 2:
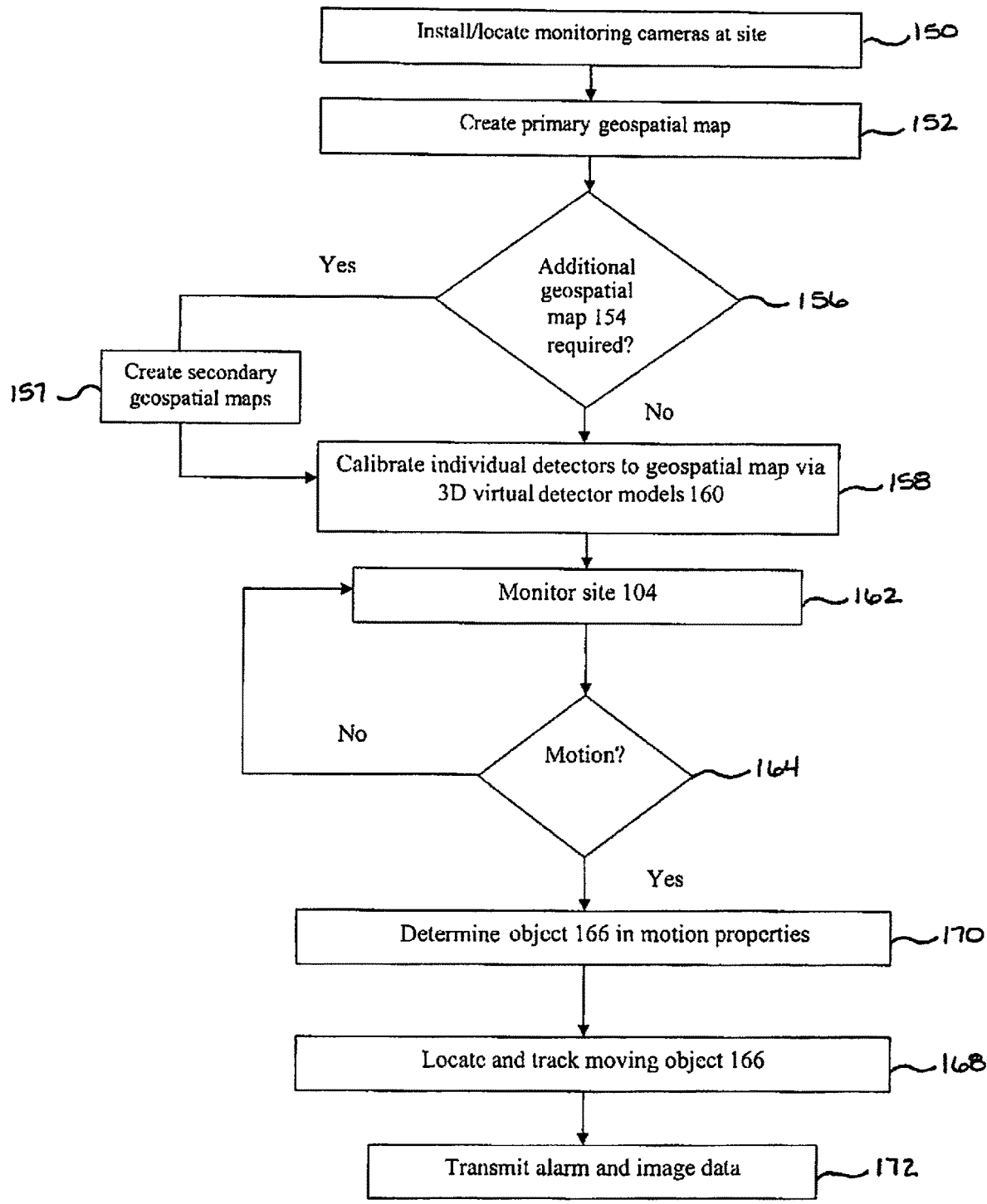
FIG. 2 is a flowchart of the motion-validating remote monitoring system of FIG. 1.

Referring now to FIG. 2, the depicted flowchart illustrates the high-level operations of an embodiment of system 100 as applied to a monitored remote site 104, or a monitored remote site 106.

Initially, secondary detectors 128 and primary PTZ detectors 130 are installed, along with other components of monitoring system 100 at remote site 104, as indicated by Step 150 of FIG. 2. At Step 152, a primary two-dimensional geospatial model, or map, 154 of the site being monitored, remote site 104 in this example is created. If at Step 156 it is determined that additional, secondary geospatial maps 154 are needed, these are created per Step 157. Additional, secondary geospatial maps 154 may be of buildings, structures, or other particular areas of interest within remote site 104.

After creating one or more geospatial maps 154 at Steps 152 and 157, secondary and PTZ detectors 128 and 130, respectively, at Step 158, are calibrated to geospatial maps 154. This step includes creating a detector-specific virtual, three-dimensional (3D) model 160 for each detector 128, 130. Detector model 160 is a three-dimensional earth grid model of the points on the earth being seen by each detector 128, 130, and includes construction of images viewed or detected with each detector 128, 130. The basis behind this unique method is that a scaled mathematical model of the real world view of a detector 128, 130 is built and used for simulation of objects 166 located on, or passing across, a site 104. Details of Step 158, including the creation of detector model 160 will be described in further detail below.

At Steps 162 and 164, system 100 monitors remote site 104, continuously checking for any objects 166 in motion within the bounds of remote site 104. If an object 166 in motion is detected, the exact location of object 166 is determined, and object 166 is tracked, as indicated at Steps 168. "Tracking" in part includes ODC 134 directing one or more detectors 130 to automatically and continuously view object 166. At Step 170, system 100 determines object 166 properties, including height, width, direction and speed, among others.

The details behind each process Step 150 to 170 are described in more detail below. Further, although each step is presented in a particular sequence for the purpose of explaining the unique features and operations of the present invention, the sequential order of each step may vary from the order presented.

As indicated above, and with reference to Steps 150 to 166 of FIG. 2, a mathematical virtual 3D detector model 160, is built for each detector. Models 160 are used to project as accurately as possible, points from a detector image frame to a three-dimensional x,y,z coordinate in the context of a user-supplied and accurately scaled overhead map, diagram, or drawing. The model is also used to perform the reverse projection.

With respect to Step 150, secondary detectors 128 and Primary PTZ detectors 130 are initially installed at a remote site 104. The number of detectors 128 and 130 installed may vary from site to site, depending on considerations that include remote site 104 geographic size, number and degree of site 104 elevation changes, existence and quantity of site 104 portions requiring additional monitoring, and so on. Further, any combination of secondary detectors 128 and primary PTZ detectors 130 may be used. Although both secondary and primary PTZ detectors 128, 130 may be installed at a typical site 104, some remote sites may only include secondary detectors 128 or primary PTZ detectors 130.

Further, the term "detector" as used in the present invention includes devices, such as cameras, used to capture images using light in the visible spectrum, such as an optical video camera, but may also include devices capable of capturing images using wavelengths elsewhere in the electromagnetic spectrum, including infrared, thermal, and so on.

The term "detector" also generally includes other detectors or sensors capable of collecting data that may correlate to, and be used to detect, an object in motion at a monitored remote site 104.

For example, in one embodiment, system 100 includes optical fixed and PTZ video cameras as detectors 128, 130. Pixel data describing visible spectrum images are captured and used to create detector-specific models 160 and geospatial map 154, and are used to track motion. In another embodiment, system 100 uses thermographic cameras as detectors 128, 130. In such an embodiment, system 100 uses thermal image data, rather than optical/visual image data, to create detector-specific models 160 and geospatial map 154, in substantially the same way that it would, using optical cameras and optical image data.

Referring now to Step 154 of FIG. 2, and to FIGS. 8 to 16, geospatial map 154 of remote site 104 may now be created. Geospatial map 154 is essentially a two-dimensional scaled overhead image of remote site 104 overlayed with a coordinate system defined in terms of pixels and distance units. Every point, or location, shown on geospatial map 154 is defined by a geo-coordinate (GC). A GC is defined by an "x" coordinate and a "y" coordinate, each corresponding to actual distances from an origin reference point, referenced by (0,0), and corresponding to units of measure such as feet, meters, or other, so that any specific GC may be designated (x,y). As will be described further below, each portion of an image 129 captured by a detector 128, 130 may be correlated to a corresponding GC on geospatial map 154.

Accordingly, to begin defining geospatial map 154, horizontal and vertical scales defining the number of pixels per geospatial map 154 unit are determined.

As will be explained further below, points defined or identified within detector specific models 160 also use x,y,z coordinates to define locations of points, or objects. However, the initial x,y,z coordinates in detector-specific models, though eventually scaled, are specific and relative to each detector. Each detector location within its model 160 is considered the origin, and the home direction of each detector 128, 130 is considered the directional north for the associated model 160. As such, detector-specific horizontal and vertical offsets must be calculated to project detector-specific locations to the real-world, geospatial x,y coordinates of geospatial map 154. Further, a direction, or angle of rotation offset is also required to transform directional north in detector-specific models to line up with wherever "North" is in the overhead image.

Figure 3:
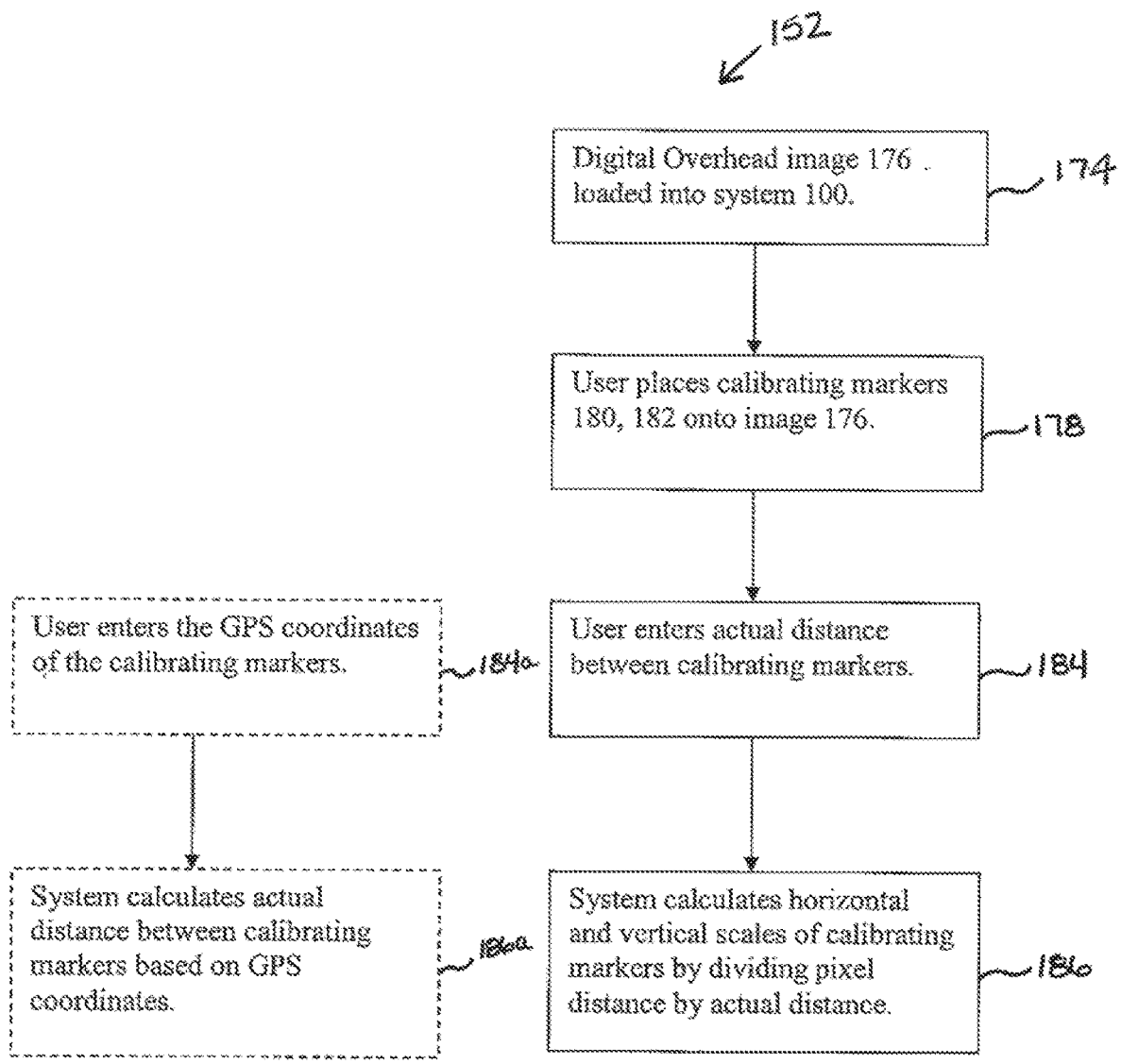
FIG. 3 is a flowchart of the step of creating a primary geospatial map, according to the flowchart of FIG. 2.

With respect to Step 150 of FIG. 1, creating a first or primary geospatial map is depicted and described using the flowchart of FIG. 3.

Figure 4:
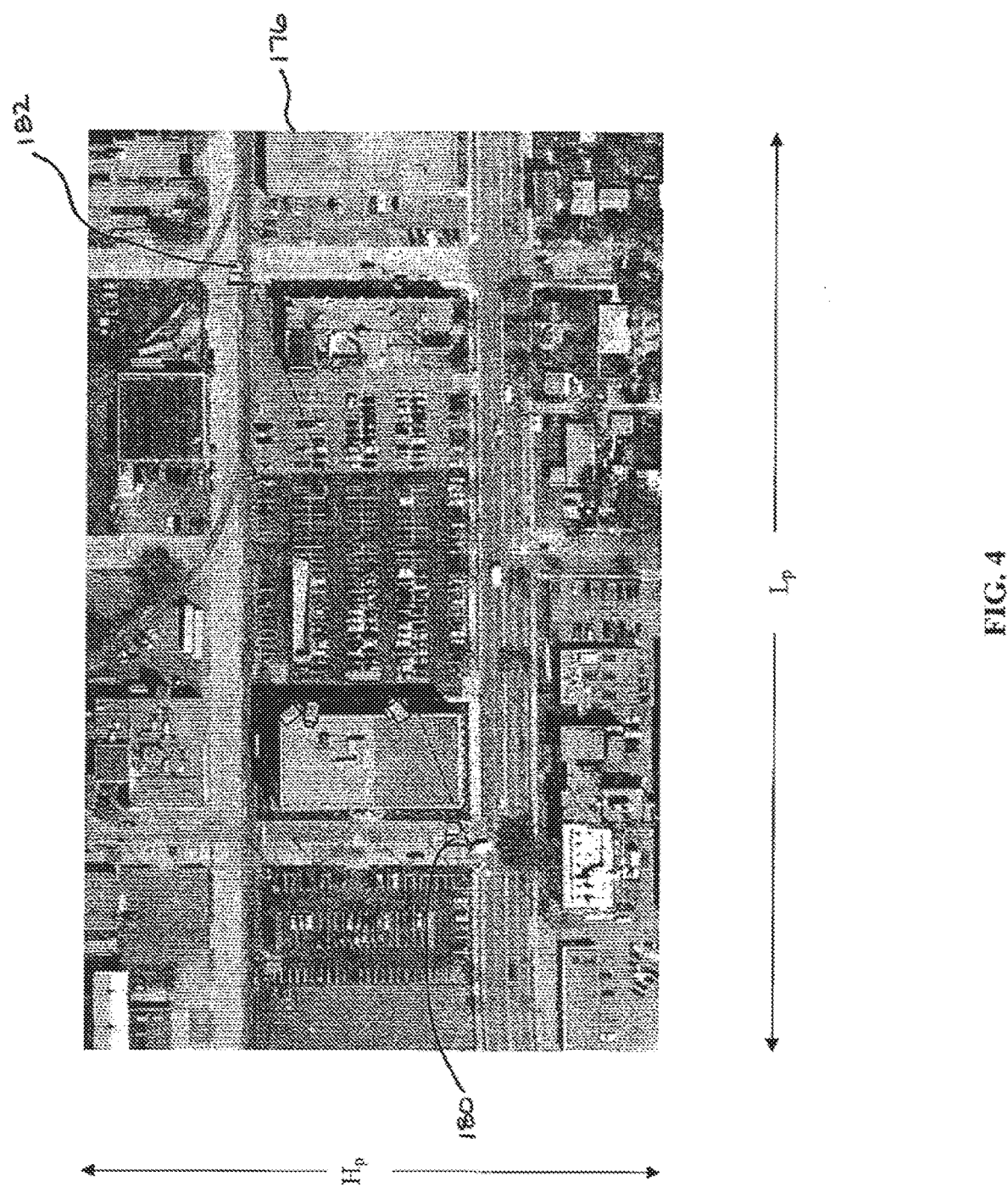
FIG. 4 is an image of a monitored site including two positional markers, according to an embodiment of the present invention.

At Step 174, digital overhead image 176 is loaded into system 100. Referring also to FIG. 4, in one embodiment, overhead image 176 may be a satellite image, or other overhead image, of remote site 104. In other embodiments, overhead image 176 may be an elevation drawing, floor plan, or other such drawing or image. Digital overhead image 176 will inherently be defined by a total number of pixels, as well as a pixel length Lp, and a pixel height, Hp.

At Step 178, a user 114 at main office 102, possibly an administrator, or a remote user 115 at a remote user location 108, viewing overhead image 176 at a computer terminal 116, uses a mouse and cursor to insert two markers 180 and 182 onto a displayed version of overhead image 176, previously loaded into system 100 at Step 174. The distance between these markers is either an actual measured distance known to the user, or may be calculated by system 100 using known GPS coordinates of the locations corresponding to each marker 180 and 182.

At Step 184, user 114 enters the actual distance in terms of feet or meters, or other units of measure. Alternatively, at Step 184a, user 114 enters a pair of GPS coordinates corresponding to the marker images on overhead image 176.

At Step 186, system 100 calculates a horizontal and vertical scale for overhead image 176 by dividing the number of pixels separating markers 180 and 182 on image 176, by the actual measured distance. For example, if the distance between markers 180 and 182 is 664 feet, and the number of pixels separating markers 180 and 182 is 500, a scale of 0.753 pixels per foot is determined. Alternatively, at Step 186a, system 100 uses provided GPS coordinates to determine horizontal and vertical scales.

In some embodiments, a user specifies directional north on geospatial map 154. In other embodiments, directional north is defined by default as an image bottom-to-top direction.

As such, geospatial map 154 of remote site 114 has been created by calculating a pixel/distance scale and applying a set of geospatial coordinates (GCs) to overhead image 176.

System 100 also provides the ability to use multiple overhead images for a single site 104 to create multiple geospatial models 154, as indicated at Step 157 of FIG. 2. User 114, 115 is allowed to switch among these geospatial maps 154 on a viewer application. An example would be to use a primary satellite overhead image 176 to create a primary geospatial map 154a of a large campus, parking lots, and paths for outside surveillance, as well as use an interior floor image 188 and corresponding geospatial map 154b of a building on campus to show indoor surveillance.

If detectors 128, 130 are positioned and calibrated to primary geospatial map 154a, they will look aligned and scaled correctly on that primary geospatial map 154a. However, the interior floor image may be of a different scale, most likely do not cover the same area, and may even have "North" pointing in a different direction than the satellite image. Therefore, the present invention provides a process of calibrating a secondary overhead image 188 to an already established geospatial map 154a, used to create a secondary geospatial map 154b. This process takes advantage of the previously defined horizontal/vertical scale, offsets and direction parameters described above.

Figure 5:
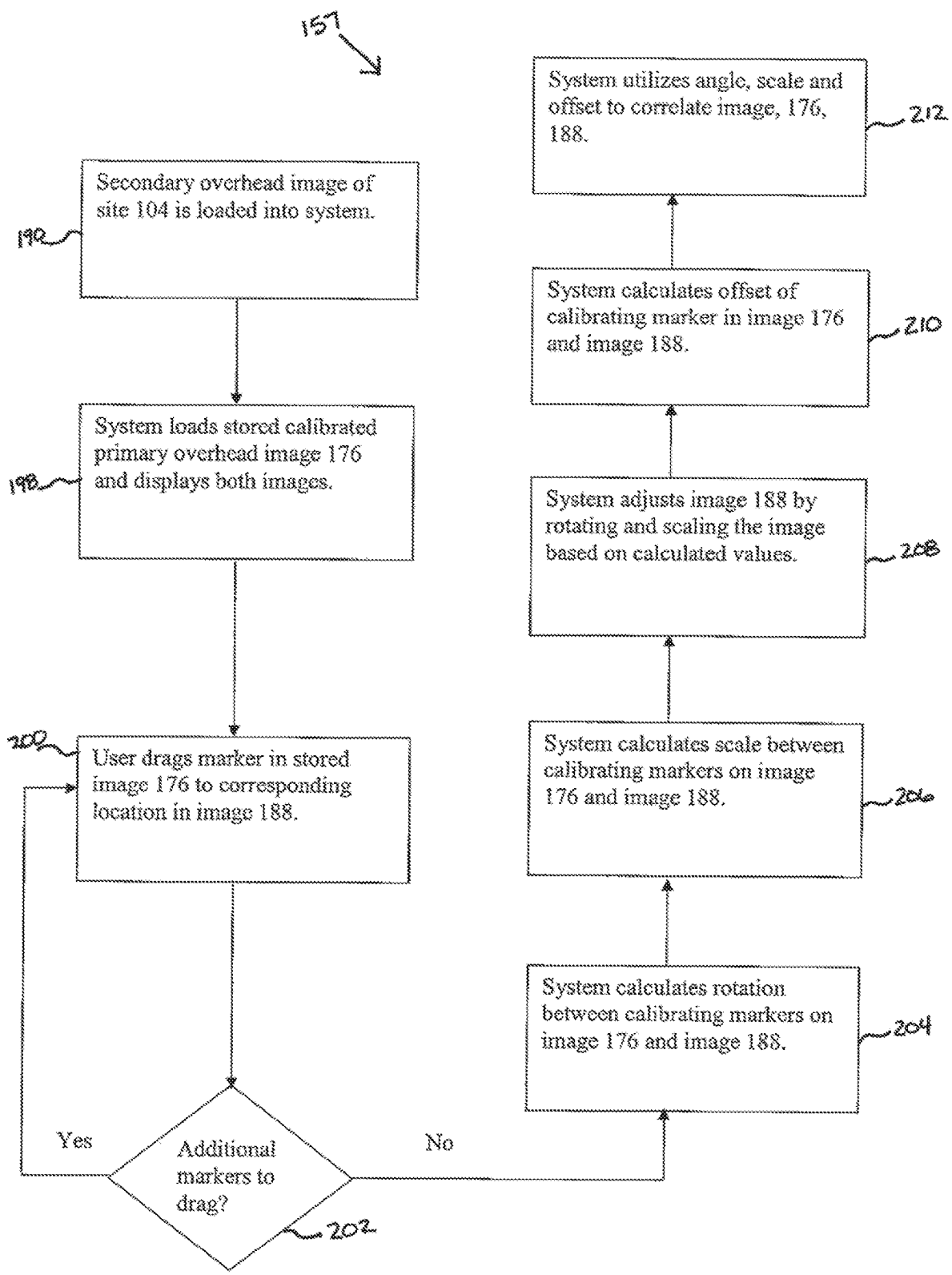
FIG. 5 is a flowchart of the step of creating secondary geospatial maps, according to the flowchart of FIG. 2.

Referring to FIG. 5, Steps 190 to 212 describe the process of calibrating a secondary geospatial map 154a.

Figure 6:
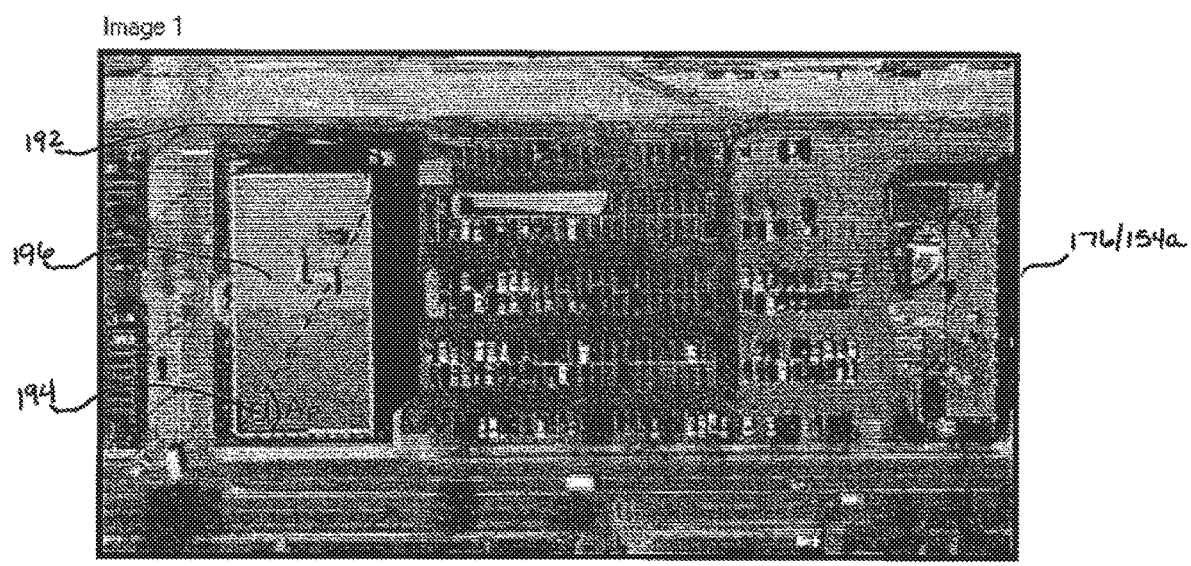
FIG. 6 is an image of a monitored site including two positional markers at a building, according to an embodiment of the present invention.
Figure 7:
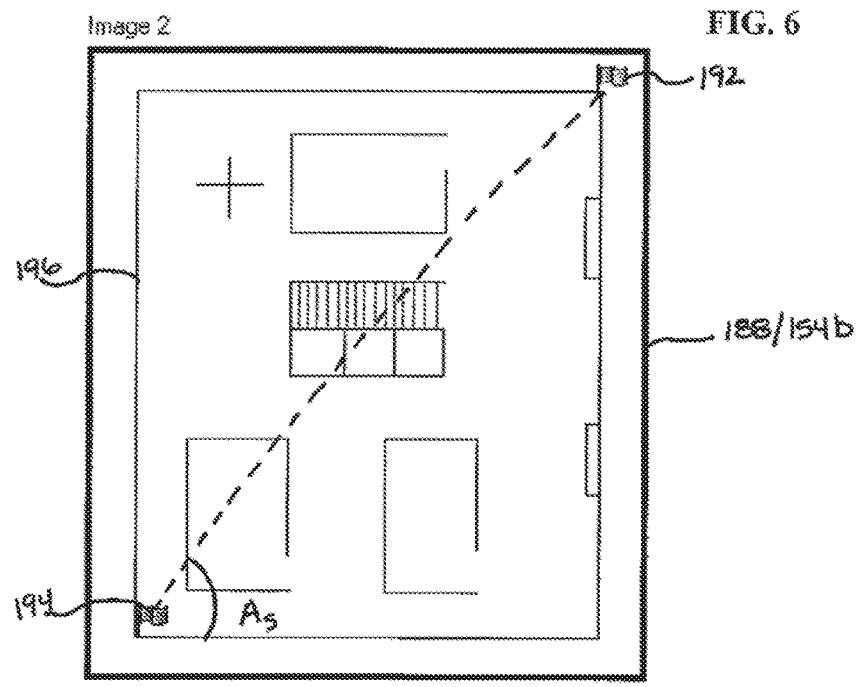
FIG. 7 is an image of a floor plan of a building with two positional markers, according to the embodiment of FIG. 6.

Referring also to FIGS. 6 and 7, two new markers, 192 and 194 have been added to geospatial map 154a via user 114, 115. Markers 192 and 194 mark two corners of a building of interest 196 located on geospatial map 154a and image 188. A new geospatial map 154b is derived from secondary overhead image 188, in this case, a floor plan of building of interest 196, and from information associated with geospatial map 154a.

Referring again to FIG. 5, at Step 190, secondary overhead image 188 is loaded into system 100. At Step 198, system 100 loads stored image 176 of geospatial map 154a, and displays both geospatial map 154a and secondary overhead image 188. At Step 228, while having both previously calibrated geospatial map 154a and new, image 188 onscreen, user 114 drags marker 192 to a point on geospatial map 154, and then drags the same marker 192 to the same point on overhead image 188. At Step 202, additional markers, including marker 194, may be correlated between images.

Parameters are then calculated for secondary image 188 that will transform real-world, geospatial x,y coordinates (GCs) of the two markers 192 and 194 already established on primary image 176 and geospatial map 154a into GCs that equal where the markers have been placed in secondary image 188. This is done at Steps 210 to 212.

At Step 204, and also referring to FIG. 7, a secondary image 188 rotation angle is calculated by subtracting angle $A_s$ of geospatial map 154b coordinates marker 192 to marker 194 from angle $A_p$ of secondary overhead image 188 coordinates marker 192 to 194.

At Step 206 a scale is calculated by dividing pixel distance between marker 192 and marker 194 on secondary image 188 by the previously measured or calculated distance between them.

At Step 208, GCs of marker 192 are rotated an amount equal to the rotation angle calculated in step 204 and then multiplied by the scale factor calculated in step 206.

At Step 210, subtracting marker 192 GCs on primary overhead image 176 from the result calculated in step 208 to yield a distance offset from primary overhead image 176 to secondary image 188. The distance offset can then be taken into account when mapping image 129 points to secondary geospatial map 154b.

The above described process yields a second geospatial map 154b correlated to geospatial map 154a such that pixels or points from an image 129 may be projected to a correct location, defined by a single, common GC on either geospatial map 154a or 154b. The reverse transformation is also possible.

Figure 8:
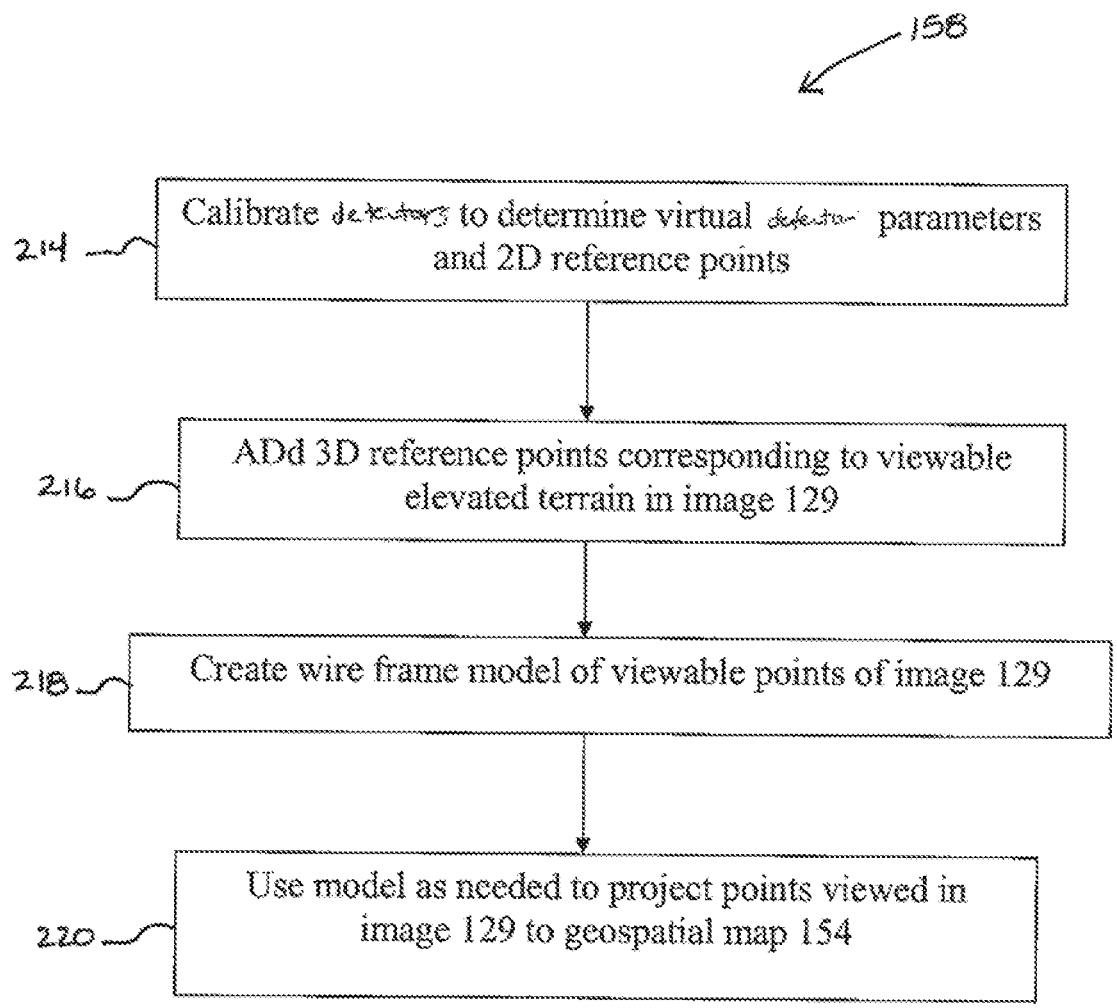
FIG. 8 is a flowchart of the step of calibrating individual detectors to a geospatial map via virtual detector models, according to the flowchart of FIG. 2.

Once geospatial maps 154 have been created per Steps 152 to 157 of FIG. 2, the next step, Step 158, calibrating individual detectors to geospatial maps 154 using detector models 160, Step 158 of FIG. 2, may be implemented as described and depicted in the flowchart of FIG. 8.

Referring to FIG. 8, calibrating detectors to geospatial maps 154 includes Steps 214 to 220. Steps 214, 216, and 218 essentially describe the creation of detector-specific, 3D virtual models 160, where each model 160 may be thought of as a collection of two- and three-dimensional reference points or coordinates, a collection of measured and virtual detector parameters, and a 3D wire frame model of the portion of site 104 appearing within an image 129 of the detector 128, 130. In the context of the present invention, two-dimensional refers to a coordinate that has a z coordinate of zero.

At Step 214, each detector 128, 130 is calibrated to determine its actual and virtual detector parameters, and a number of two-dimensional reference points are determined. Step 214 is described in further detail below with reference to FIGS. 8-17.

At Step 216, a number of three-dimensional reference points corresponding to viewable elevated terrain or structures at site 104 are determined. Step 216 is described in further detail below with reference to FIGS. 18-19.

At Step 218, a three-dimensional wire frame model simulating points of image 129 is created. Step 218 is described in further detail below with reference to FIGS. 20-21.

At Step 220, detector models 160 are employed as needed during the motion tracking processes to project or correlate points viewed in images 129 to geospatial maps 154, as described in further detail below.

Figure 9:
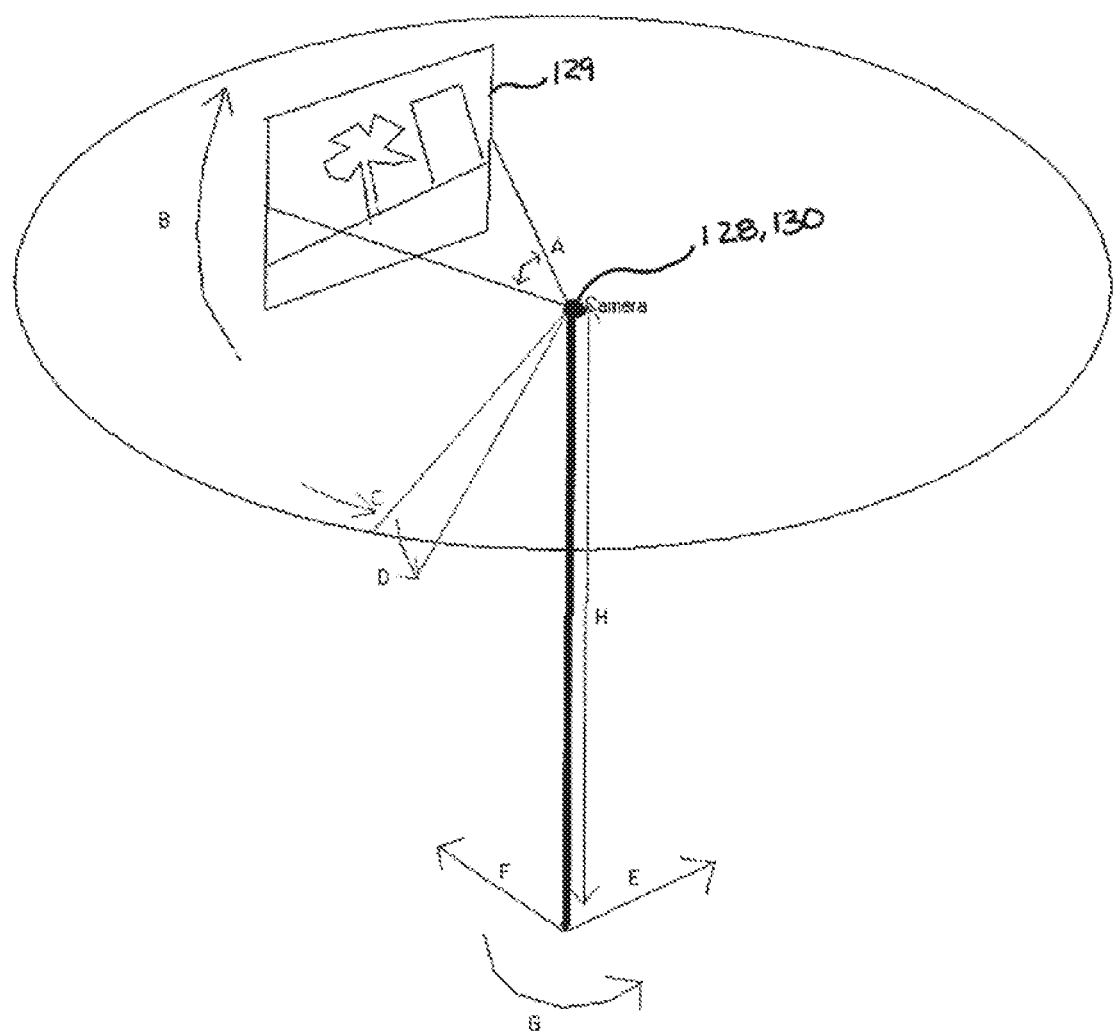
FIG. 9 is a diagram of a pinhole camera model as employed by an embodiment of the present invention.

With respect to Step 214 and detector calibration, each detector 128, 130 may be initially modeled as a pinhole camera, as depicted in FIG. 9. In the pinhole camera model, the basic mathematical relationship between the coordinates of a three-dimensional point and its projection onto an image plane are well known. The camera aperture, or focal point, is described as a point and no lenses are considered in the model.

Further, each detector 128, 130 is said to capture an image or frame 129 that can be defined by a matrix of pixels, as known by those skilled-in-the art.

Still referring to FIG. 9, the following terms are used throughout to describe the optics and the poses of detectors 128, 130:

Horizontal Field of View (A)—Describes the angle that detectors 128 and 130 are able to "see" horizontally. For a primary PTZ detector 130 with variable zoom, multiple horizontal field of view (FOV) measurements may be stored for incremental zoom levels. For example, horizontal FOV measurements may be stored for every 10% of zoom level between 0% and 100% of the total zoom range for eleven measurements total.

Vertical Ratio—Describes the ratio of the horizontal FOV to the vertical FOV.

Zoom X and Y Offset—On a variable zoom detector 130 or camera, zooming in or out can cause the focal point in the center of the frame to shift horizontally and/or vertically due to the mechanical movement of lenses. The present invention may store and utilize a zoom offset for certain zoom level increments to adjust the pan/tilt direction that detector 130 is facing in order to compensate for this shifting focal point. In one embodiment, an offset for every 10% zoom level is stored and utilized.

Detector Rotation Angle (B)—Detector Rotation Angle B is defined as the angle the detector 130 head deviates from a level plane If looking at the horizon through the view of the camera, points selected across the horizon should ideally project out to a flat plane in a line perpendicular to the angle that the camera is facing on an overhead view. In the case of where the horizon appears slanted due to detector head rotation, this parameter is used to mathematically rotate points back to a level position before projection.

Lens Distortion—Almost all lenses have some type of distortion that causes straight lines to appear bowed in or bowed out from a center point of the image. In some embodiments, system 100 corrects for this distortion to achieve proper projection. Because lens distortion is not always centered around the very center of the frame, distortion center point may be identified, stored in x,y screen coordinates, and utilized.

Tilt Directional Angle (C) and Tilt Displacement Angle (D)—Because detectors are rarely mounted perfectly level, whether up on a pole or on top of a building, tilt directional angle is used to specify the direction (0-360 degrees) of where the detector is tilted. Tilt displacement angle D defines of the degree of tilt at that direction.

Geospatial X Offset (E) and Y Offset (F)—Describes where on the geospatial map detector 128 or 130 is located in units applicable to geospatial map 154, such as feet or meters.

Geospatial Direction Delta (G)—The angle difference between "North" on geospatial map 154 and the detector's home position. "North" may refer to the commonly understood cardinal direction North, or may refer to a direction corresponding to a predefined direction as indicated on geospatial map 154.

Detector Height (H)—Distance of base of detector 128, 130 up to detector's focal point.

Figure 10:
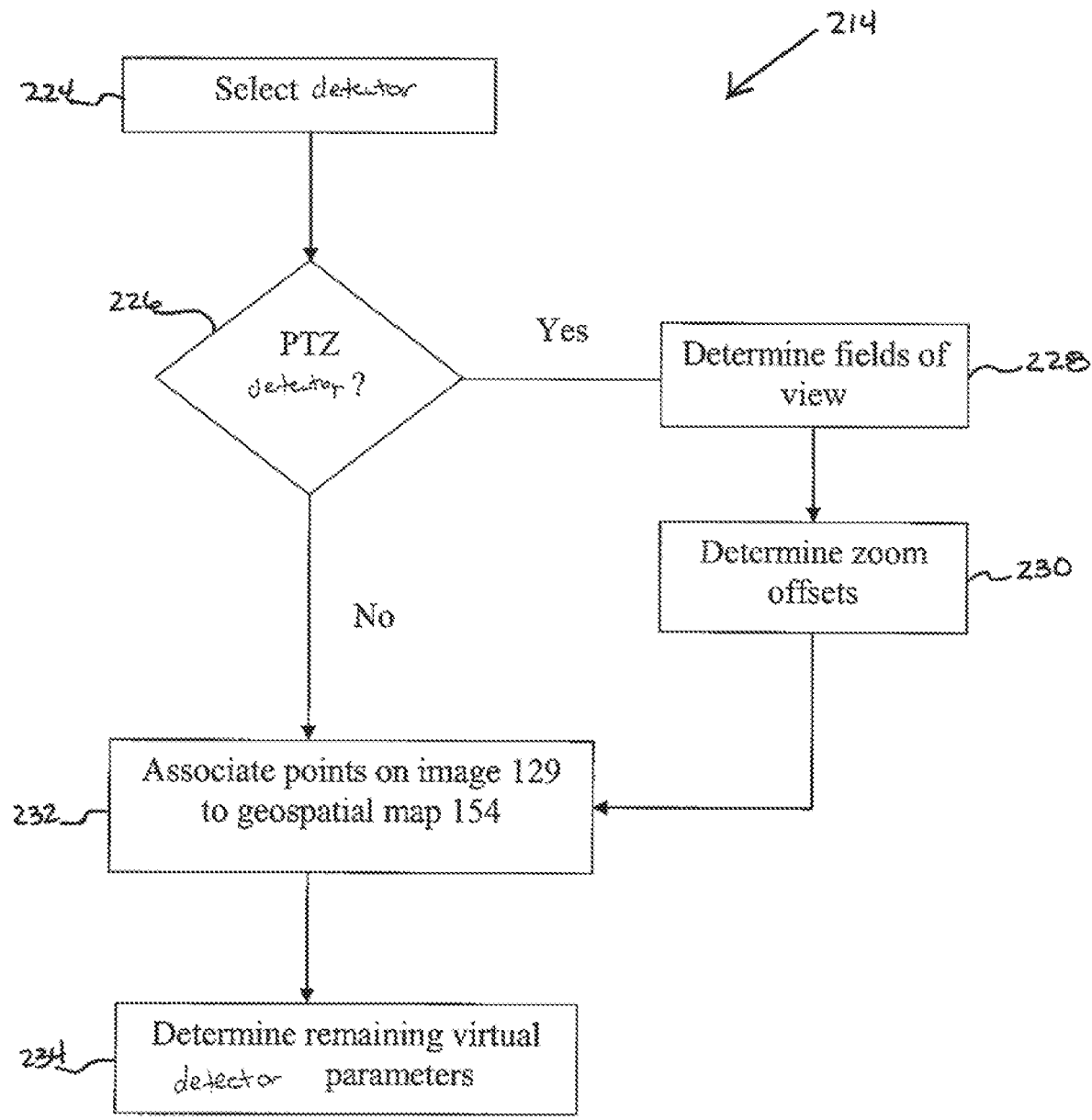
FIG. 10 is a flowchart of the step of calibrating detectors to determine virtual detector parameters, according to the flowchart of FIG. 8.

Referring to FIG. 10, Step 214 of FIG. 8 may be broken down into a series of Steps 224 to 234 as depicted and described.

First, at Step 224, an individual detector 128 or 130 is selected for calibration. At Step 226, if the selected detector is a Primary PTZ detector 130, fields of view and zoom offsets are determined per Steps 228 and 230, respectively. If the selected detector is a secondary detector 128, then the process proceeds to Step 232, associating two-dimensional points from an image 129 to geospatial map 154.

Figure 11:
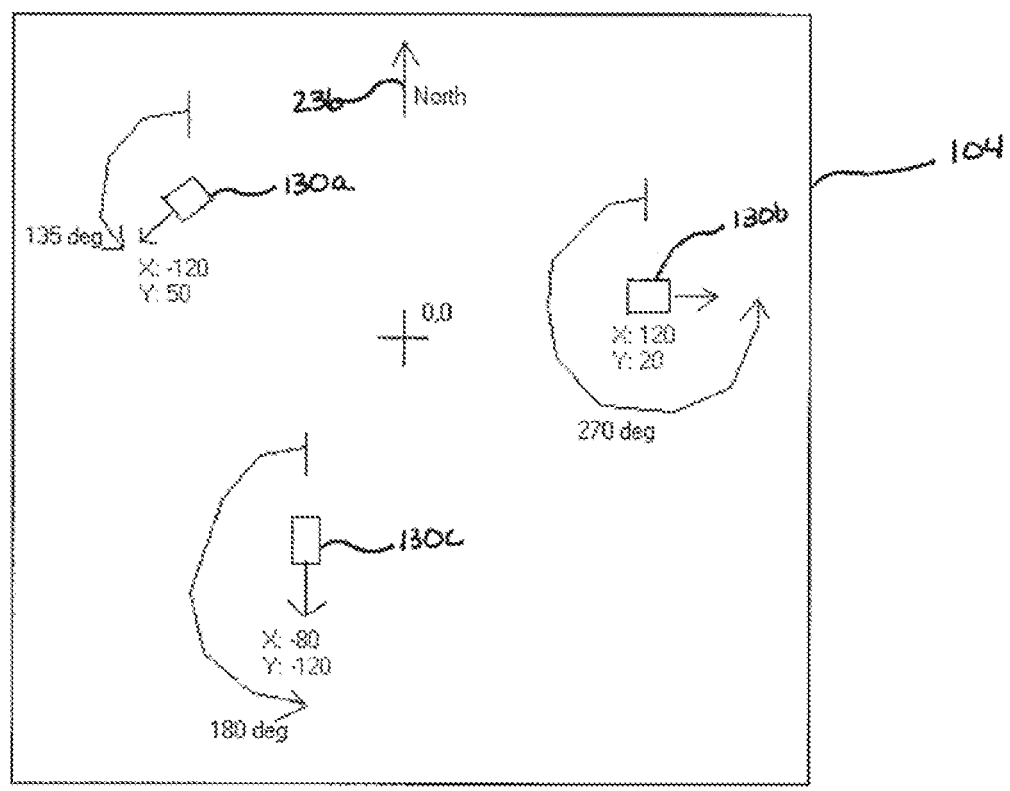
FIG. 11 is an elevation view of a set of detectors located at a monitored site and in their home positions, according to an embodiment of the present invention.
Figure 12:
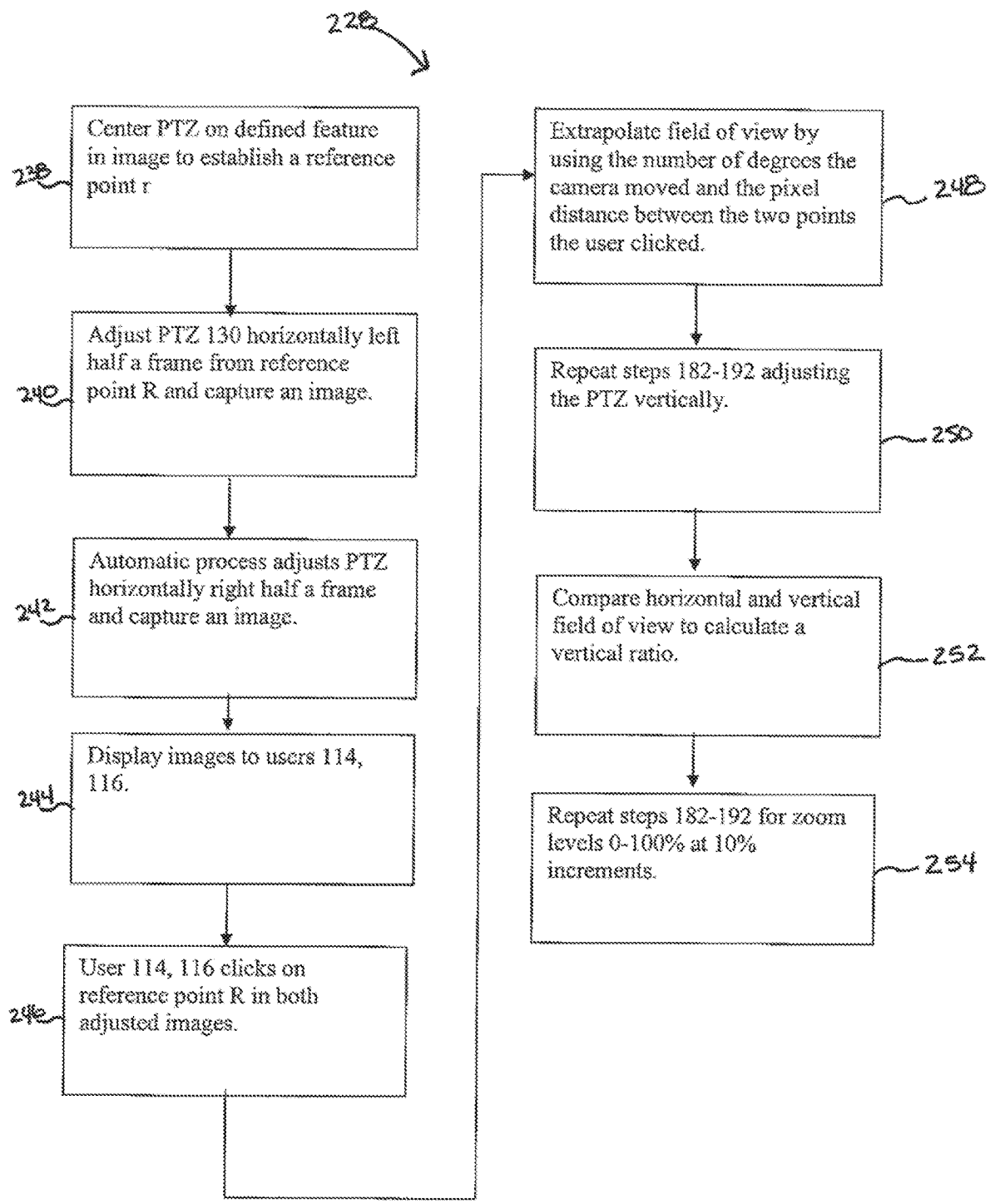
FIG. 12 is a flowchart of the step of determining fields of view, according to the flowchart of FIG. 10.
Figure 13:
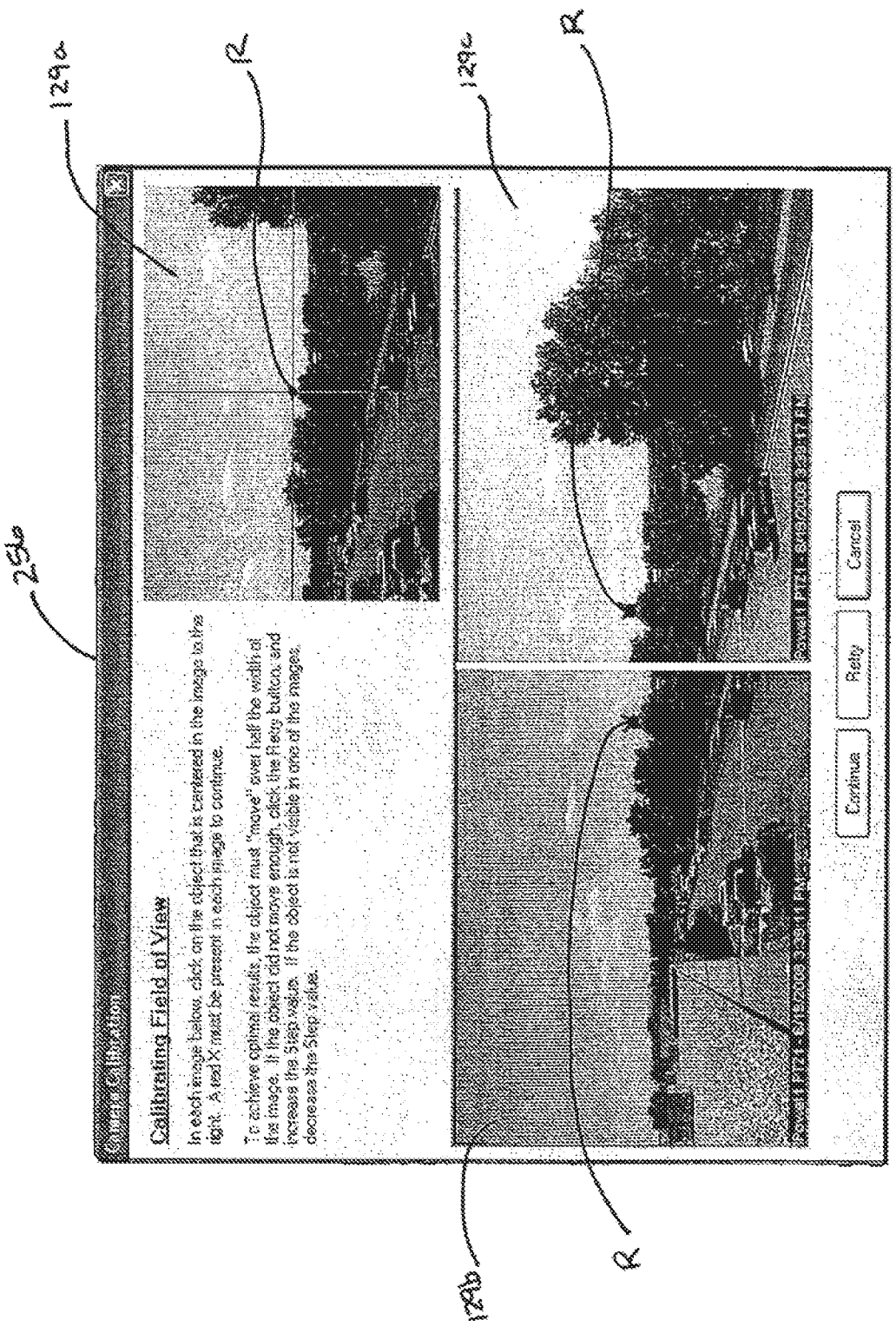
FIG. 13 is an image of a graphical user interface used for calibrating detector field of view, according to the process of FIG. 10.

In the case where the selected detector to be calibrated is a primary PTZ detector 130, at Step 228, detector 130 fields of view are determined according to FIGS. 11-13.

Referring specifically to FIG. 11, in the depicted embodiment, remote site 104 includes three primary PTZ detectors 130, primary PTZ detectors 130$a$, 130$b$, and 130$c$. Using a two-dimensional Cartesian coordinate system, a centerpoint of remote site 104 is defined at (0,0), and corresponding to the geospatial map 154 origin, and detectors 130 are located at (−120, 50), (120, 20), and (−80, −120), respectively. Although any number of units may be used, in this embodiment, units in this case correspond to feet, as used in geospatial map 154. Directional North is indicated by arrow 236, and corresponds to 0°. "Home" positions of each detector 130 are defined in this embodiment as 135°, 270°, and 180°, respectively, are rotational offsets to be considered when mapping points from model 160 to geospatial map 154.

Once each detector 130 position is defined relative to site 104, Step 228 of FIG. 10, a field of view calibration process for each detector 128 and 130, is implemented. A rotation calibration process for primary PTZ detectors 130 is also implemented.

Referring to FIGS. 12 and 13, a detector 130 field of view and rotation calibration process is described in Steps 238 to 254 and in the graphical user interface (GUI) image 256, respectively. The field of view and rotation calibration process yields detector parameters of horizontal FOV, vertical FOV, and vertical ratio, for each zoom level of a detector 130. This information is used in part to define a detector model 160 of a detector 130.

To start, at Step 238, a user moves primary PTZ detector 130 so that it is centered on a corner or other type of feature with definition in the image 129$a$ frame, which defines a reference point R. At Step 240, via either a manual or automated process, detector 130 shifts left by half a frame of reference point R and captures an image 129$b$, leaving reference point R at a right-most side of image 129$b$. At Step 242, the detector is then shifted right by half a frame of the reference point and captures a second image 129$c$, leaving reference point R at a left-most side of image 129$c$.

As indicated at Step 244, and as depicted in FIG. 6, the reference image and the two shifted images 129$b$, $c$, are displayed to user 114, 116 at GUI image 256. At Step 246, a user clicks on reference point R in both adjusted images 129$a$ and $b$.

The number of pixels associated with each image 129 is known in advance, and is a function of detector 128, 130. As will be understood by those familiar with digital imaging technology, a digital image displayed on a monitor or screen may be defined by a pixel matrix, such that any given "point" on a displayed image is associated with a pixel, and a pixel location coordinate. For example, a JPEG-formatted image displayed on a screen may be 700 pixels wide ("x" direction) by 500 pixels tall ("y" direction), with, for example, the extreme upper left displayed pixel corresponding to pixel coordinates (0,0), and lower right displayed pixel corresponding a pixel coordinates (699, 499). Such relative coordinate data corresponding to individual pixels, or locations on an image, may be captured using known technology.

In the present invention, image 129 is displayed at terminal 116, 118 and viewed by a user 114,115. As a user 114, 115 follows the steps described above, a left-most pixel location or coordinate is captured with one mouse click, followed by a right-most pixel location with a second mouse click. Accordingly, a horizontal image length as measured in pixels is determined for a given image 129. Knowing the movement of detector 130 in degrees of rotation, a horizontal FOV can be defined in terms of pixels as indicated at Step 248.

At Step 250, the process steps of 238 to 248 are repeated in a vertical context to determine a pixel-defined vertical FOV. At Step 252, a vertical ratio is calculated using the horizontal and vertical FOVs.

At Step 254, the zoom increment is increased by a step, and steps 238 to 252 are repeated to define a horizontal FOV for each periodic zoom increment for each detector 130. In one embodiment, the zoom increments change in 10% increments, so that eleven different horizontal FOVs are calculated. The vertical FOVs are calculated for each zoom level increment by dividing the vertical ratio determined earlier. To determine an approximate camera head rotation, the angle from the left-most pixel location to the center of the left image, and the angle from the center of the right image to the right-most pixel location are averaged together.

Figure 14:
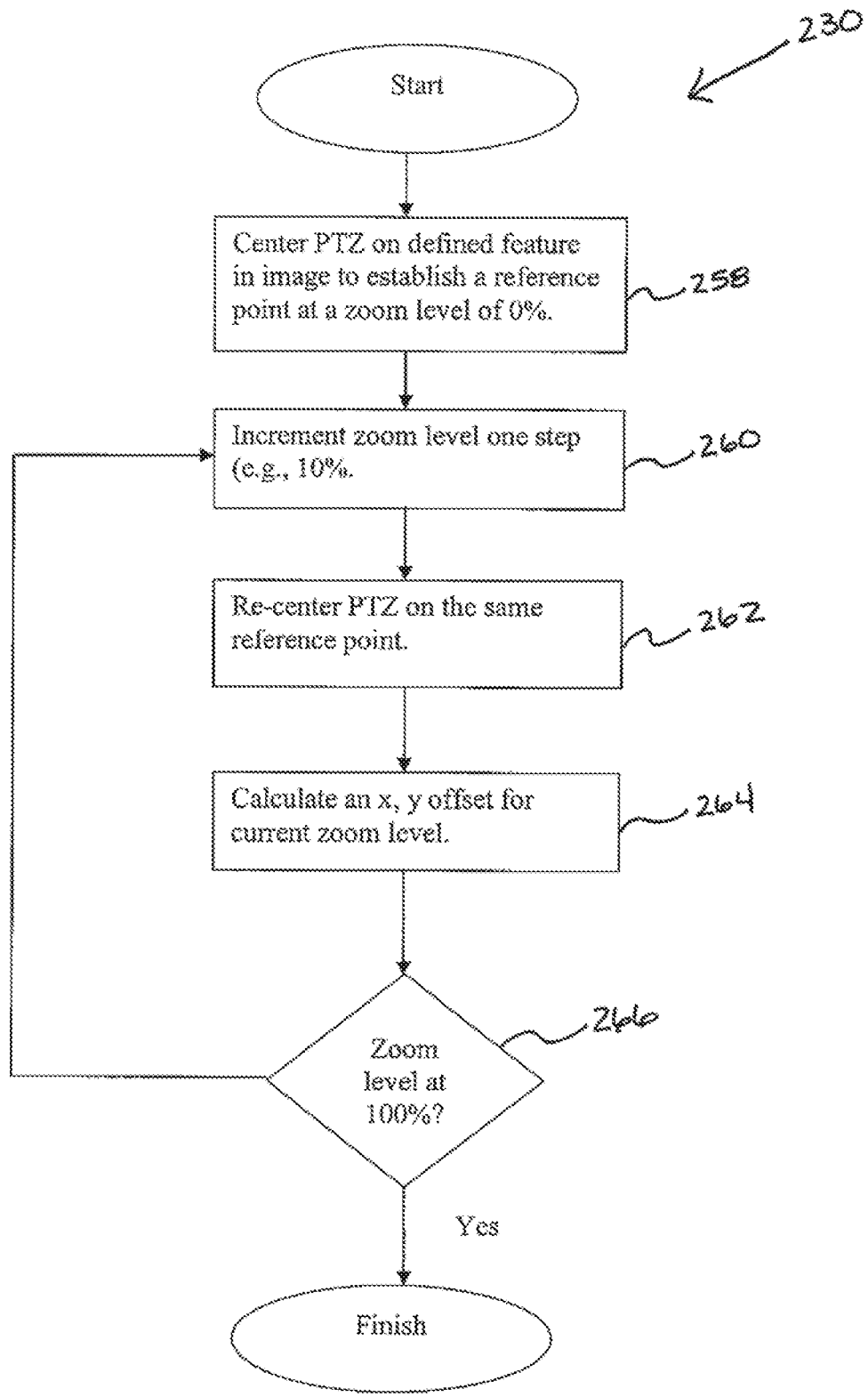
FIG. 14 is a flowchart of the step of determining zoom offsets, according to the flowchart of FIG. 10.

Referring to FIG. 14, a zoom offsets calibration process, Step 230 of FIG. 10, is also applied to primary PTZ detectors 130.

In the same fashion as the field of view calibration, at Step 258, user 114, 115 moves detector 130 to center on a reference point at a zoom level of 0%. At Step 260, using either a manual or automated process, detector 130 is zoomed in one increment. In one embodiment, the zoom increment may be 10%. At Step 262, user 114, 115 then adjusts the position of detector 130 to center on the same reference point. In some cases, due to the particular properties of detector 130, the detector may or may not need to be moved.

At Step 264, an x and a y offset, defined in numbers of pixels, are then calculated for the current zoom level by taking the difference between the current (x,y) position of the detector and the reference position of the detector at 0% zoom.

At Step 266, if the zoom level is at 100%, zoom offsets for each zoom increment have been determined, and the process is complete. If the zoom level has not reached 100%, Steps 260 to 266 are repeated until all zoom offsets are determined.

The zoom offset parameters for each primary PTZ detector 130 are then saved in memory and used to create 3D virtual model 160.

Referring again to FIG. 10, after a secondary detector 128 is selected at 224, or after primary PTZ detector 130 fields of view and offsets are calculated via Steps 228 and 230, Step 232 is implemented.

Step 232 associates a finite number of "two-dimensional" (2D) points on image 129 to corresponding points on geospatial map 154. In doing so, a set of reference points with corresponding, unique, GCs is established, and used to create a 3D model 160 that can extrapolate further points and their coordinates.

Figure 15:
FIG. 15 is a detector image of a portion of a monitored site including reference points, according to an embodiment of the present invention.
Figure 16:
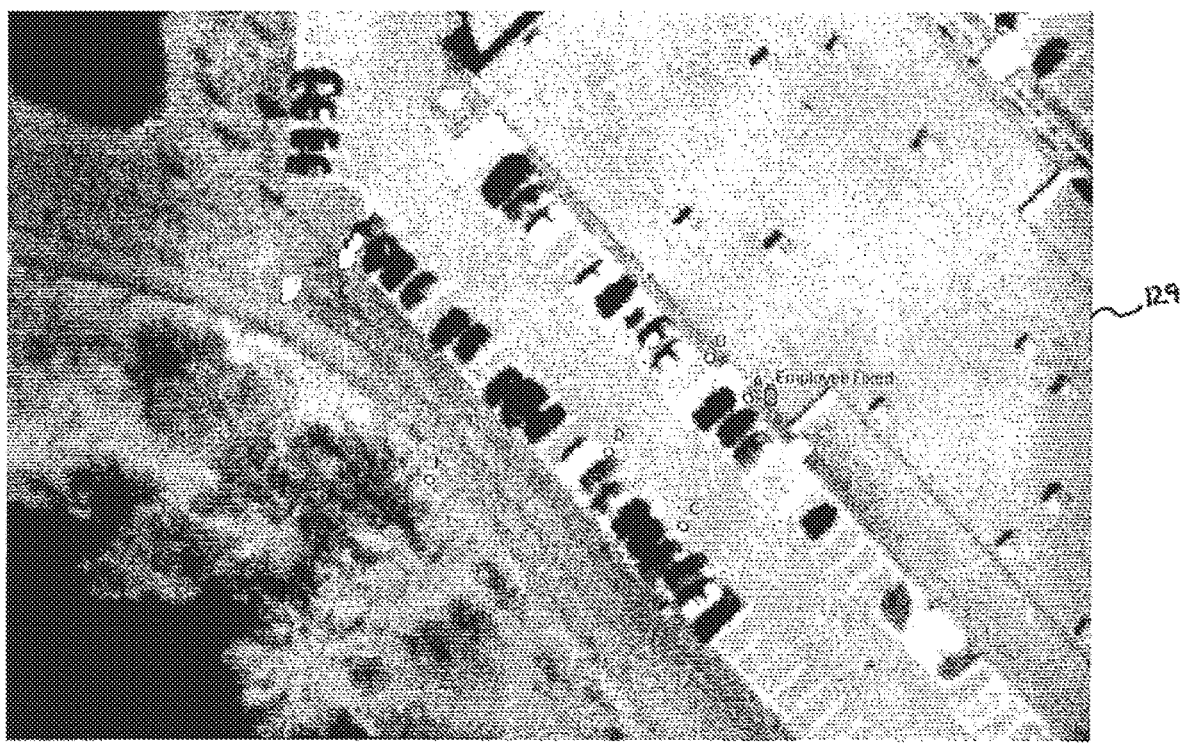
FIG. 16 is a detector overhead image of a portion of a monitored site including reference points, according to an embodiment of the present invention.

Referring to FIGS. 15 and 16, Step 232 begins with user 114 identifying at least five points A-E that appear in both detector image 129 and geospatial map 154. Points A-E should generally be at the same altitude because they will eventually define a base plane with a z-coordinate of zero [41].

User 114, 115 operating a terminal 116, 117, simultaneously views both detector image 129 and geospatial map 154. In a manner similar to the processes described above, uses a mouse and cursor to drag and drop each of the five points A-E from image 129 on to geospatial map 154. It will be appreciated that other methods and techniques may be used to match points from image 129 to geospatial 154. Further, in some cases, more or less than five matching points may be used, depending on site 104 characteristics and desired accuracy.

After the point-matching detector calibration process, the GCs of points A-E appearing in image 129 are now defined, i.e., x- and y-coordinates corresponding to geospatial map 154. The GCs of these points A-E are then used as input into an algorithm of the present invention that creates a unique virtual 3D detector model 160 for each detector 128,130.

One algorithm widely used in the computer vision industry to create virtual detector models, which includes defining virtual detector parameters, is disclosed in a paper authored by Roger Y. Tsai and entitled "A Versatile Camera Calibration Technique for High-Accuracy 3D Machine Vision Metrology Using Off-the-Shelf TV Cameras and Lenses," which is hereby incorporated by reference. It allows an input of two-dimensional screen coordinates and actual three-dimensional "world" or site coordinates, and outputs detector parameters, such as FOV, vertical ratio, detector coordinates, including height, etc., required to define a 3D virtual model. However, the methods described by Tsai only apply to an immovable (fixed) detector, whereas the approach of the present invention as described below works on either a secondary detector 128 or movable primary PTZ detector 130.

Figure 17:
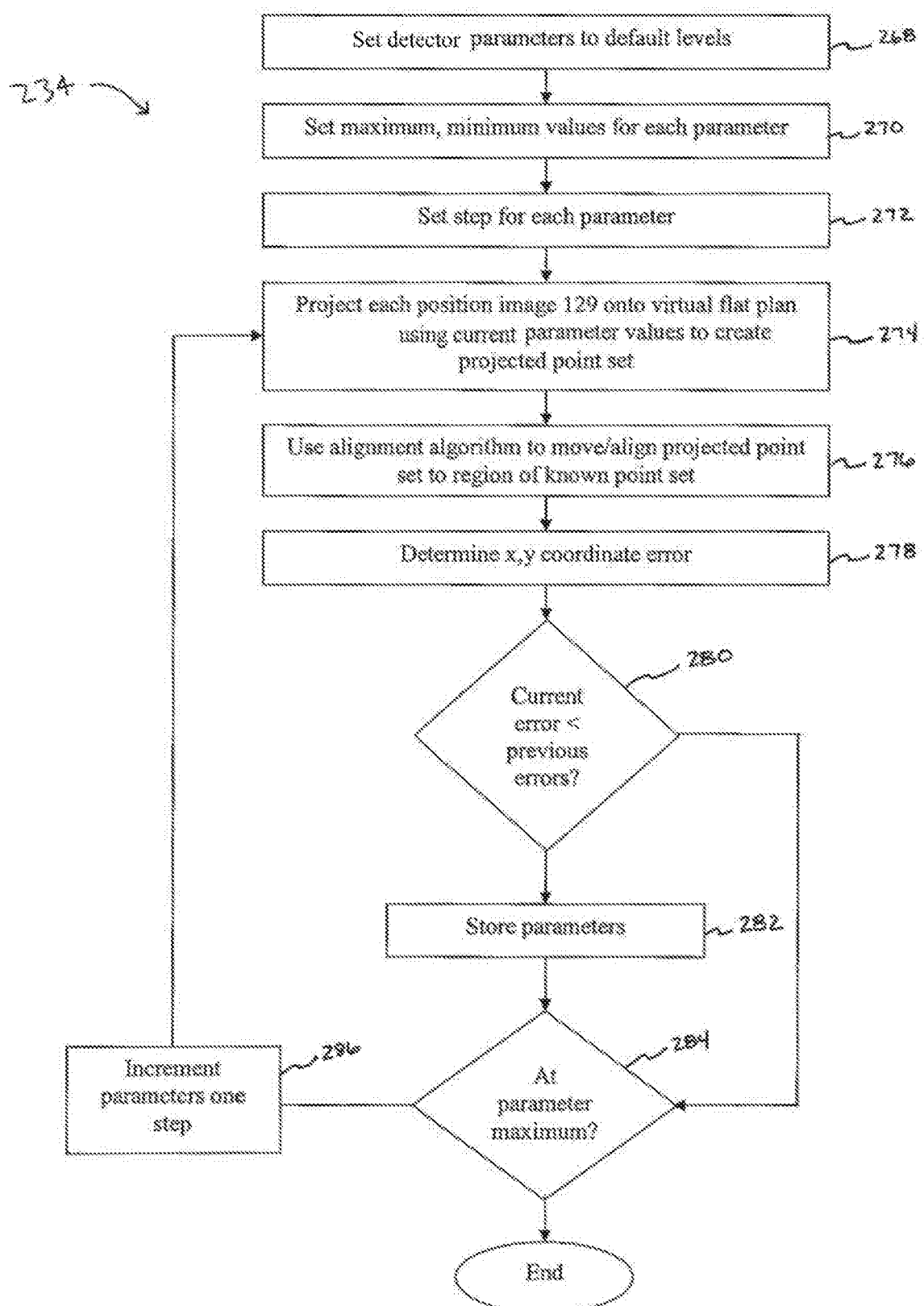
FIG. 17 is a flowchart of the step of determining remaining virtual detector parameters, according to the flowchart of FIG. 10.

Referring to FIG. 17, an improved algorithm for determining virtual detector parameters, according to Step 234 of FIG. 10, is depicted and described. It will be understood that detector parameters refers at least to camera location, horizontal field of view, camera height, camera tilt direction/tilt delta, lens distortion, and camera head rotation.

At Step 268, detector parameters are initially set to default levels. For primary PTZ detectors 130, certain previously determined parameter values, for example, horizontal and vertical fields of view for each zoom step, vertical ratio, and so on, may be used to set initial parameter values. For other primary PTZ detector 130 and secondary detector 128 parameters, the algorithm of FIG. 17 will iteratively calculate best values for such parameters.

At Step 270, maximum and minimum values representing a span or range for each parameter is selected and input to the algorithm. Initially, these values may be set to absolute theoretical maximums and zero, may be set according to estimated values based on known detector properties, or may be estimated based on previous experience. The initial span is not critical as these may be adjusted iteratively based on algorithm results.

At Step 272, an increment, or step, is selected for each parameter. As with the span selected above, the initial step value selected is not critical and may be adjusted to achieve improved results if needed.

At Step 274, using current detector parameter values (initially set at default values), the previously identified image 129 point set A-E is projected to a virtual flat plane using known techniques such as those disclosed by Tsai, thereby creating a projected point set A'-E' with a corresponding set of projected x,y coordinates.

Next, at Step 276, a known alignment algorithm is used to move, or align the projected point set A'-E' to a region of the known point set A-E. Because it is not known what the location and direction of detector 128, 130 is with respect to geospatial map 154 (for example, refer back to FIG. 11), a point set alignment algorithm is run to move or align projected points A'-E' to the GCs of known points A-E, as closely as possible. This alignment algorithm is detailed in the paper authored by Divyendu Sinha and Edward T. Polkowski and entitled "Least Squares Fitting of Two Planar Point Sets for Use in Photolithography Overlay Alignment," which is hereby incorporated by reference in its entirety. If the x,y coordinates, or locations, of newly aligned point set A'-E' precisely, or closely matched the GCs of known point set A-E, the error would be zero or small, indicating that the current set of virtual detector parameters provides a good model for the actual detector 128, 130 providing image 129. However, several iterations of the algorithm typically are required before acceptable detector parameters are determined.

At Step 280, if the error determined at Step 278 is smaller than any previously determined error, the current detector parameter values are stored at Step 282. Otherwise, at Step 284, the detector parameter values are checked to see if the maximum values have been reached, and if not, at Step 286, the detector parameter values are increased by the step values identified previously at Step 272, and Steps 274 to 284 are repeated, until the detector parameters that provide the most accurate projection of points A-E are determined and stored.

Depending on the accuracy of the results of the algorithm user 114, 116 may choose to run the algorithm multiple times to refine and improve the virtual detector parameters. Reducing both span and step values with each iteration will yield progressively improved results.

The applied algorithm of FIG. 17 (Step 234 of FIG. 10) not only has the flexibility to lock certain detector parameters in place, but adjust the other parameters to make the model as accurate as possible.

The results may also be adjusted such that if user 114, 116 determines that the parameters such as detector height and detector location were not calculated accurately, the user has the option of specifying the height, or moving the detector to a more appropriate location. The algorithm above is then instructed to not modify the detector height and location while iterating. Specifying such known parameters reduces the number of unknown variables, detector parameters, and tends to improve the accuracy of the derived virtual detector parameters.

Once the virtual detector parameters have been determined, it is possible to project any point in the view of detector 128, 130, meaning any point appearing in image 129, to its respective point on a flat plane and vice versa. Unfortunately, the terrain of site 104 that detector 128, 130 may be observing can rarely be simulated by a flat plane. As such, all identified points are assumed to have a z coordinate of zero, and any observed point above a flat plane having a non-zero z-coordinate would be located incorrectly when mapped to a flat plane image, such as geospatial map 154. As such, virtual detector parameters, along with known reference points define a virtual 2D detector model that is capable of projecting points appearing in image 129 to a flat plane.

Figure 18:
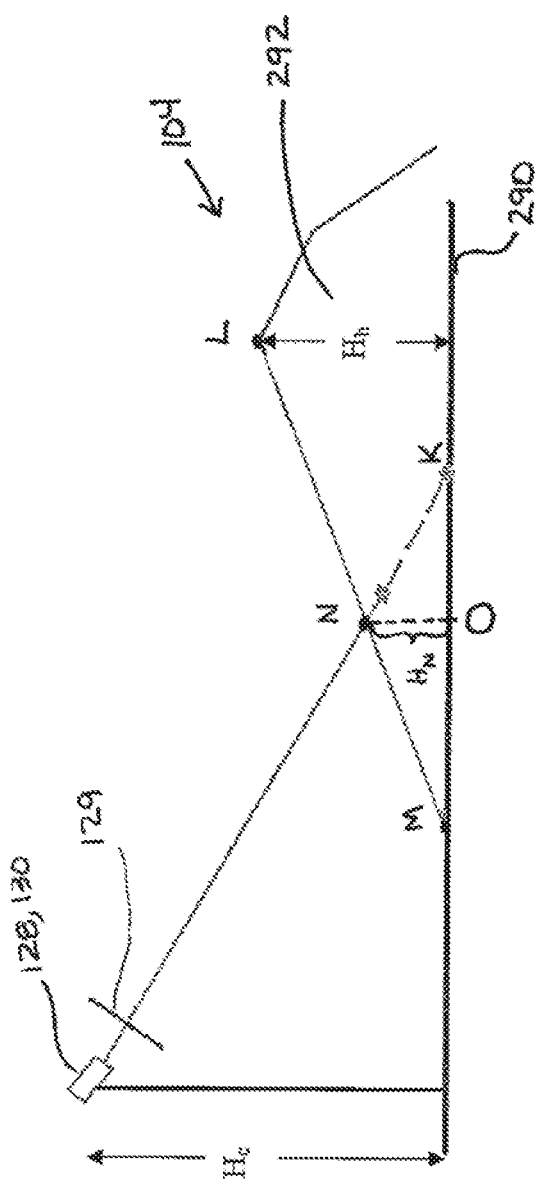
FIG. 18 is a diagram of a camera viewing a point in three-dimensional space, according to an embodiment of the present invention.

Referring now to FIG. 18, for example, detector 128, 130 includes image 129 of a portion of site 104. Image 129 displays a hill 292 that includes a front face defined by points M-N-L. If an object was detected at point N in detector image 129, point N projected out onto flat plane 290 would not take into account hill 292 that is in the way and would calculate a geospatial location, or set of GCs, incorrectly. Point N would be projected onto flat plane 290 incorrectly at point K, when it should have been projected onto flat plane 290 at point O.

However, by adding points L and M with non-zero z coordinates, interpolation can be used to calculate an intersection of the ray originating at detector 128, 130 out to point K with the line segment M-L, and a more accurate geospatial location of point N can be found at point O.

Referring to FIG. 8, three-dimensional reference points viewed by detector 128, 130, such as point M from the above example, are identified and stored as indicated at Step 216.

Figure 19:
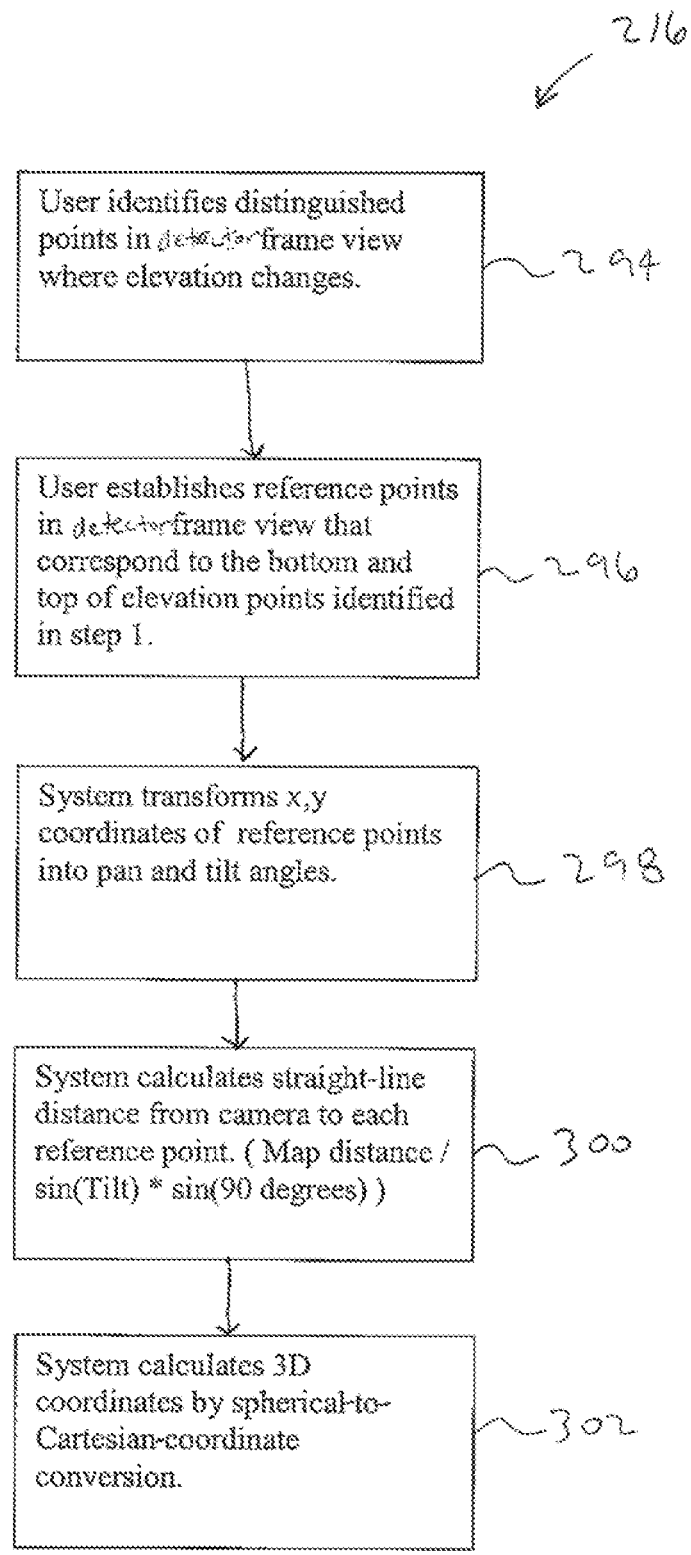
FIG. 19 is a flowchart of the step of adding 3D reference points corresponding to viewable elevated terrain in an image, according to the flowchart of FIG. 8.

Referring to FIGS. 18 and 19, the details of Step 216 are depicted and described in Steps 294 to 302 as follows.

First, according to Steps 294 and 296, user 114, 115 identifies and associates more reference points from the detector view, namely points from image 129, to geospatial map 154 in areas where the elevation varies. The process is substantially the same as described above with respect to mapping "two-dimensional" points A-E to geospatial map 154. Points, such as points M and L, are selected at the bottom and top of elevation changes. Points between M and L will be identified through interpolation.

At Step 298, because the position of detector 128, 130 in terms of GCs is known via processes described above, distances from detector 28, 130 to each newly entered point may be calculated. Using the virtual 2D detector model to convert x,y image pixel coordinates of each point into pan/tilt angles, the straight-line distance from detector to each point can be calculated as:

Straight-light Distance=Map distance/sin(Tilt)*sin(90 degrees)

3D coordinates are then calculated and added to geospatial model 154 using spherical to Cartesian coordinate conversion:

$x = r \sin \theta \cos \varphi$ $y = r \sin \theta \sin \varphi$ $z = r \cos \theta$ Where r is the straight-line distance to each point and theta and phi are the pan/tilt angles of each point.

Though the 3D points calculated are in real-world units, they are in a coordinate space relative to the detector used, and not in terms of geospatial coordinates, GCs, used to define a location on geospatial map 154. They cannot yet be related to other detectors. These points will be referred to as local points.

When enough local points have been added so that all major elevation changes have been included and the desired coverage area has been surrounded, the final step in the process of created a virtual 3D detector model 160 is to create a wire frame model 310 of the points that represent the terrain of the viewable area of site 104.

Figure 20:
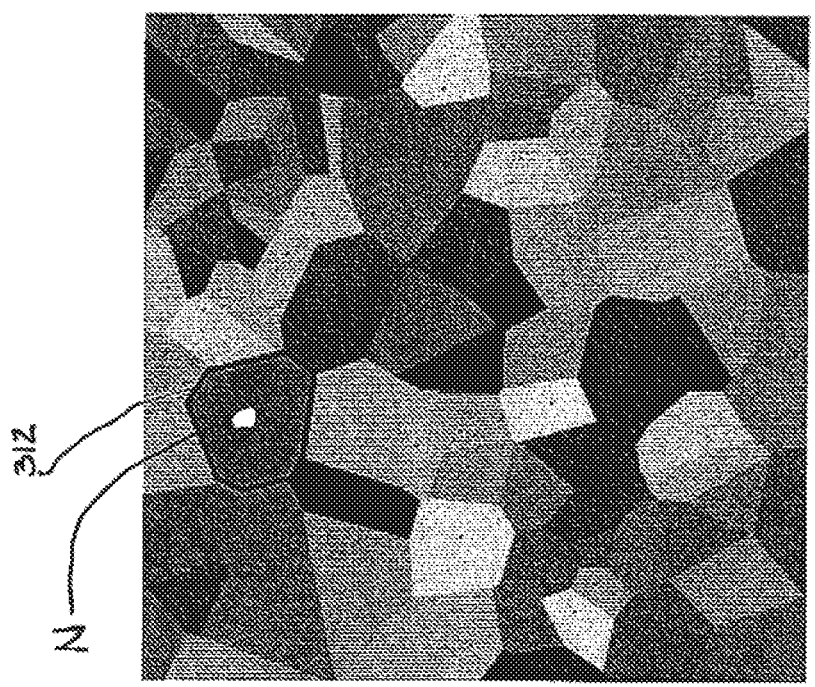
FIG. 20 is a Voronoi diagram with Thiessen polygons of the point viewed by the detector of FIG. 18, according to an embodiment of the present invention.

Referring to FIGS. 20-21 a method of the present invention, identified previously as Step 218 of FIG. 8, uses a combination of well-known algorithms to produce a mesh of triangles defining wire frame model 310. Representing the model using triangles provides an easy and less CPU-intensive method of calculating intersections from detector 128, 130 into virtual 3D detector model 160 and linear interpolation of values of points within the triangles.

To create wire frame model 310, first, a Voronoi diagram of the local reference points, for example point N, is created, thereby generating Thiessen polygons for each local reference point. Thiessen polygon 312 for point N is depicted, for example, in the Voronoi diagram of FIG. 20.

As will be understood by those skilled in the art, a Thiessen polygon network may be created by employing Delaunay triangulations of the local points to generate an intermediate mesh. The Voronoi Diagram is then generated by connecting the circumcenters of each triangle around the input points to create Thiessen polygons.

Next, for each point on the Thiessen polygon, the known technique of Natural Neighbor Interpolation maybe used to determine z coordinates for the local points. A final triangulated mesh by connecting the input points with the new Thiessen polygon points into smaller triangles. Such techniques are described, for example, in Sibson, R., "A Brief Description of Natural Neighbor Interpolation," Chapter 2 in Interpolating Multivariate Data, John Wiley & Sons, New York, 1981, pp. 21-36, the contents of which are hereby incorporated by reference.

As such, a three-dimensional wire frame model 310 of the view of each detector 128, 130 is created as part of an overall virtual 3D detector model 160.

Figure 22:
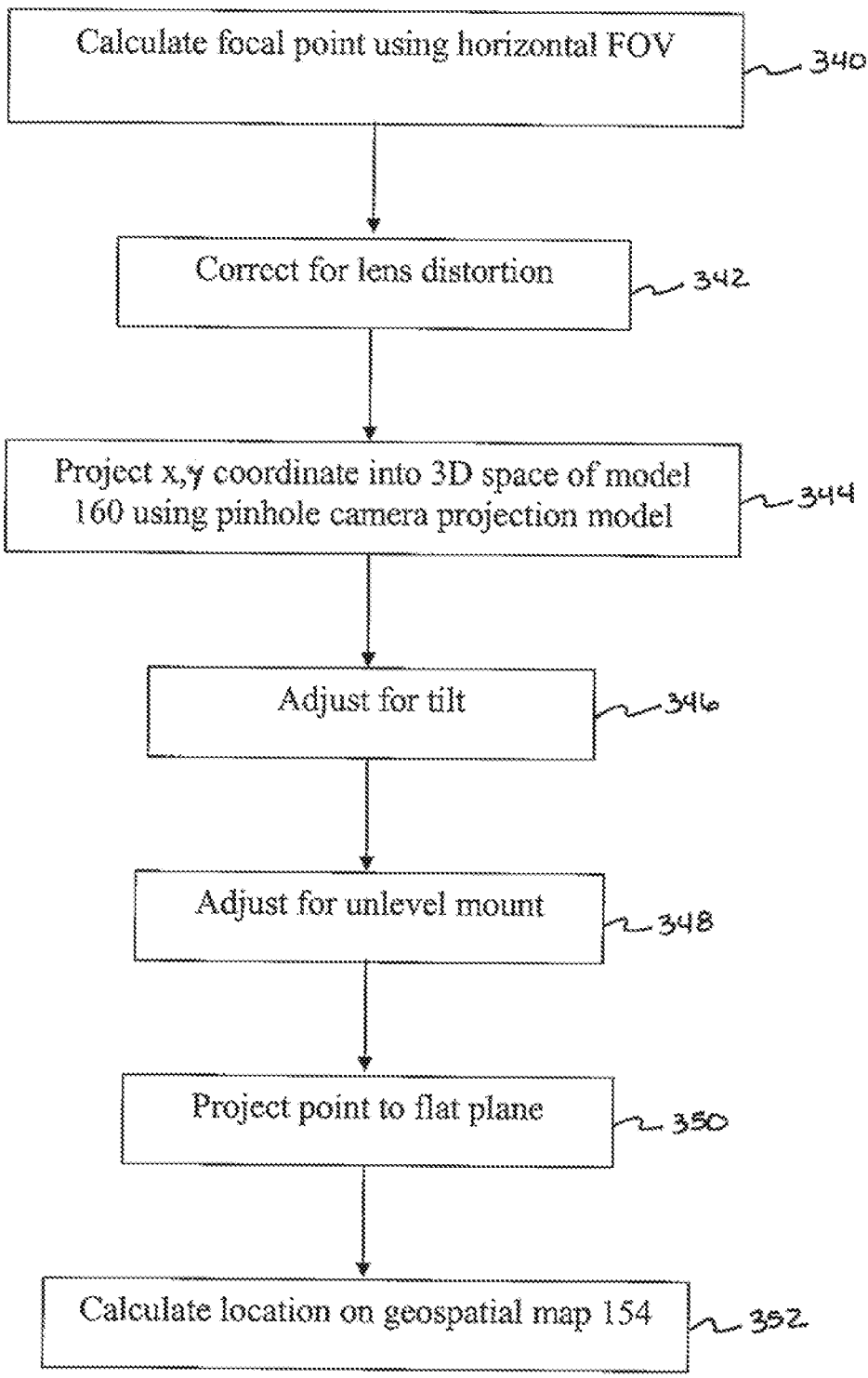
FIG. 22 is a flowchart of projecting, three-dimensional local points of a detector model to a geospatial map, according to an embodiment of the present invention.

Referring to FIGS. 21-22, a method of mapping, or projecting, three-dimensional local points of detector model 160 to geospatial map 154 is depicted and described.

At Step 340, detector focal length is calculated using the horizontal field of view. In some embodiments, lens distortion may then be corrected at Step 342 by adjusting the screen x,y coordinate inward or outward from a distortion center point by the distortion magnitude of detector 128,130 in detector model 160.

At Step 344, the resulting x,y is then projected into 3D space using the pin-hole camera projection formula. According to Step 346, to adjust for the detector head's tilt in its detector housing, the x,y,z point is rotated by the detector rotation angle.

Then according to Step 348 to adjust for detector 128,130 not being mounted level, rotate the x,y,z point by the tilt amount at the tilt direction angle.

Next, according to Step 350, the local point is projected to a detector-specific flat plane. This is done by first intersecting a line including the x,y,z and detector 128,130 location 0,0,0 with a flat plane positioned at a distance below detector 128,130 location equaling the detector height, He.

Then, according to Step 352, the location of the local point is calculated on, or projected to, geospatial map 154. This is done by first searching through the triangles in the detector-specific 3D model 160 of the viewable area and finding the triangle that intersects with a ray that starts at the detector location 0,0,0 and extends out toward the x,y,z coordinate of the input point. Then, using that intersection point, find its Barycentric coordinates within the intersection triangle. Then use the Barycentric coordinates to map the intersection point in detector model 160 to the corresponding triangle on geospatial 154 to find the GC.

As multiple detectors 128, 130 are added to site 104, each one goes through an identical process building its virtual view of the site into its model 160. The common x,y,z points that each detector can detect are matched up for all detectors 128, 130 in the model.

By creating virtual detector-specific models 160, identifying locations of objects 166 in models 160, then projecting these locations on to geospatial map 154, system 100 of the present invention provides features and functions previously unavailable in known systems. As will be described in further detail below, the unique features include the ability to immediately know, and display if desired, the exact distance of an object 166 being viewed by a detector 128, 130, to the viewing detector 128, 140. System 100 also provides the ability to pinpoint the exact geospatial location of object 166 relative to site 104 while object 166 is in motion and being viewed by a detector 128, 130.

Further, by creating and linking multiple detector models 160 to a single geospatial map 154, objects 166 may be tracked continuously, or seamlessly. This differs from known systems which do not link multiple detectors to a common geospatial map. Such systems track motion in discrete zones corresponding to the fields of view of PTZ cameras. As objects leave such zones, they are "lost", then they reappear as new objects entering the fields of view of another camera set.

Referring again to FIG. 2, once virtual 3D detector models 160 have been created and calibrated to geospatial map 154 as depicted by Step 158 and as described above, system 100 of the present invention monitors site 104, in accordance with Step 162. If an object 166 in motion is detected according to Step 164, a series of Steps 168 to 170 take place to confirm or validate motion, locate and track the moving object, and define the properties of the object.

Referring to FIGS. 23-36, system 100 of the present invention, in summary, analyzes background and foreground pixels from sequences of images 129, then groups blocks of pixels that indicate motion into rectangular regions, motion rectangles based on a rule set. Regions of interest are created to keep track of constantly changing motion rectangles. Validated regions of interest on to geospatial map 154, and the regions may appear to user 114, 115 on terminal 116, 117 as moving graphical images surrounding an object 166 in motion.

In the context of the present invention, a single digital image 129, or frame, as captured by a detector 128,130, may be defined as a number of pixels $P_{a,b}$ arranged in a two-dimensional array P of pixels having a rows and b columns. Further, and as described below in detail, a single pixel, $P_{a,b}$, is associated with a one-dimensional pixel history array, $HP_{a,b}$ (see FIG. 24) which includes individual pixel $P_{a,b}$ data for a series of images 129 rendered over a specified time period.

Figure 23:
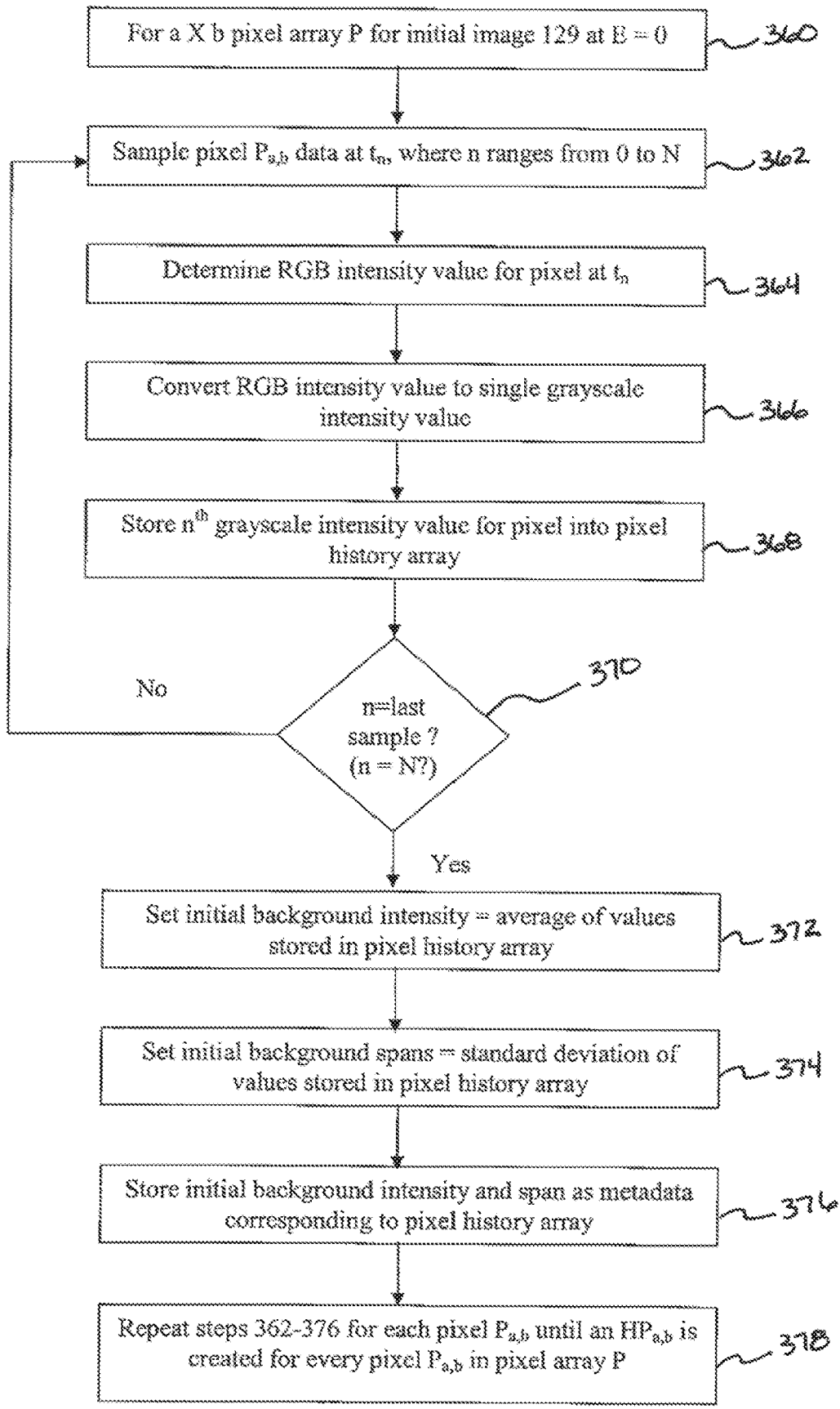
FIG. 23 is a flowchart of establishing an initial background, according to an embodiment of the present invention.

Referring to FIGS. 23-24, to begin the motion detection and validation process, and with reference to Step 360, a first, single image 129 from a detector 128, 130 is captured and a pixel array P, having a rows and b columns, is formed. Pixel data includes at least red, green, blue (RGB) intensity values.

At Step 362, pixel data for an individual pixel $P_{a,b}$ is sampled at time $t_n$, followed by a determination at Step 364 of the RGB intensity value for each pixel at time $t_n$.

At Step 366, the RGB intensity value for each pixel is converted to a single 256 bit grayscale intensity value.

At Step 366, the grayscale intensity value is stored into a pixel history array $HP_{a,b}$.

According to Step 370, Steps 362 to 368 are repeated for each pixel $P_{a,b}$, until a series of pixel grayscale intensity values $I_{a,b}$ corresponding to a series images 129 to define a pixel array $HP_{a,b}$ for a defined time period and number of samples N.

At Step 372, an initial background intensity is calculated as an average of the sampled intensity values stored for that particular pixel in pixel history array $HP_{a,b}$. At Step 374, span S, discussed in further detail below, is set equal to a standard deviation $\sigma_1$ of the pixel intensity values I calculated for each pixel. Average intensity values I and span S are stored as metadata in pixels for history array $HP_{a,b}$ at step 376.

As indicated at Step 378, Steps 362 to 376 are repeated such that a pixel history array HPa,b is created for each pixel $P_{a,b}$.

FIG. 24, depicts the general structure of pixel history arrays $HP_{1,1}$ to $HP_{a,b}$ for pixels $P_{1,1}$ to $P_{a,b}$. As depicted, each pixel history array $HP_{a,b}$ includes N intensity values $P_{a,b}$ for each pixel$_{a,b}$, an average intensity value $P_{a,b}I_{avg}$ for each pixel $P_{a,b}$, and a span S for each series of N samples of pixel intensities $I_N$.

FIG. 25 depicts a series of pixel history arrays for N=10 samples, and in accordance with FIG. 24. In some embodiments, several seconds worth of samples are recorded, thereby capturing data from approximately twenty image 129 frames.

The above described series of pixel history arrays HP define an initial background B for a particular detector 128, 130.

Similarly, background B may require periodic updating due to other factors not associated with motion, including, for example, changing light conditions, objects added to the viewed image, and so on.

However, because each pixel $P_{a,b}$ may have a different rate of intensity fluctuation and standard deviation due to image sensor noise, background noise, rippling water, shimmering reflections, etc., background B must be continually monitored and intensity $I_{avg}$ and spans S updated as needed.

During the first several seconds of flowing images 129, every pixel $p_{a,b}$ of background B is in "learning mode". As new images 129 are stored, new pixel intensity values $P_{a,b}I_{a,b}$ are added to the end of each pixel history array $HP_{a,b}$ in background B. Span S for each pixel $P_{a,b}$ is then calculated based on a multiple of the standard deviation $\sigma_1$ of the pixel history. While in learning mode, span S is saved to background B on each new image 129. Learning mode is done when it is determined that the pixel history has become "stable" and then the span is no longer updated for every image.

Because a scene may change, due to lighting, or in the case of a primary PTZ detector 130, due to the detector moving to a new position, the background pixels must be continually updated to accommodate this. Therefore, after establishing an initial Background B in accordance with FIG. 23, in order to update background B, pixel intensity values $P_{a,b}I_{a,b}$ are continually updated and stored in pixel history arrays $HP_{a,b}$ as a detector 128, 130 provides each new image 129. However, pixel intensity averages I and spans S for an individual pixel $P_{a,b}$ are only updated when none of the stored samples $P_{a,b}I_{a,b}$ in pixel history array $HP_{a,b}$ is outside of an allowed intensity range R for that given pixel. Range R is defined as average intensity Iavg+/− Span S. Any pixel intensity I that falls within range R is considered normal and not indicative of motion. Pixel intensities I outside of range R are considered spikes, and may indicate the presence of motion, and therefore should not be incorporated into background B.

Figure 26:
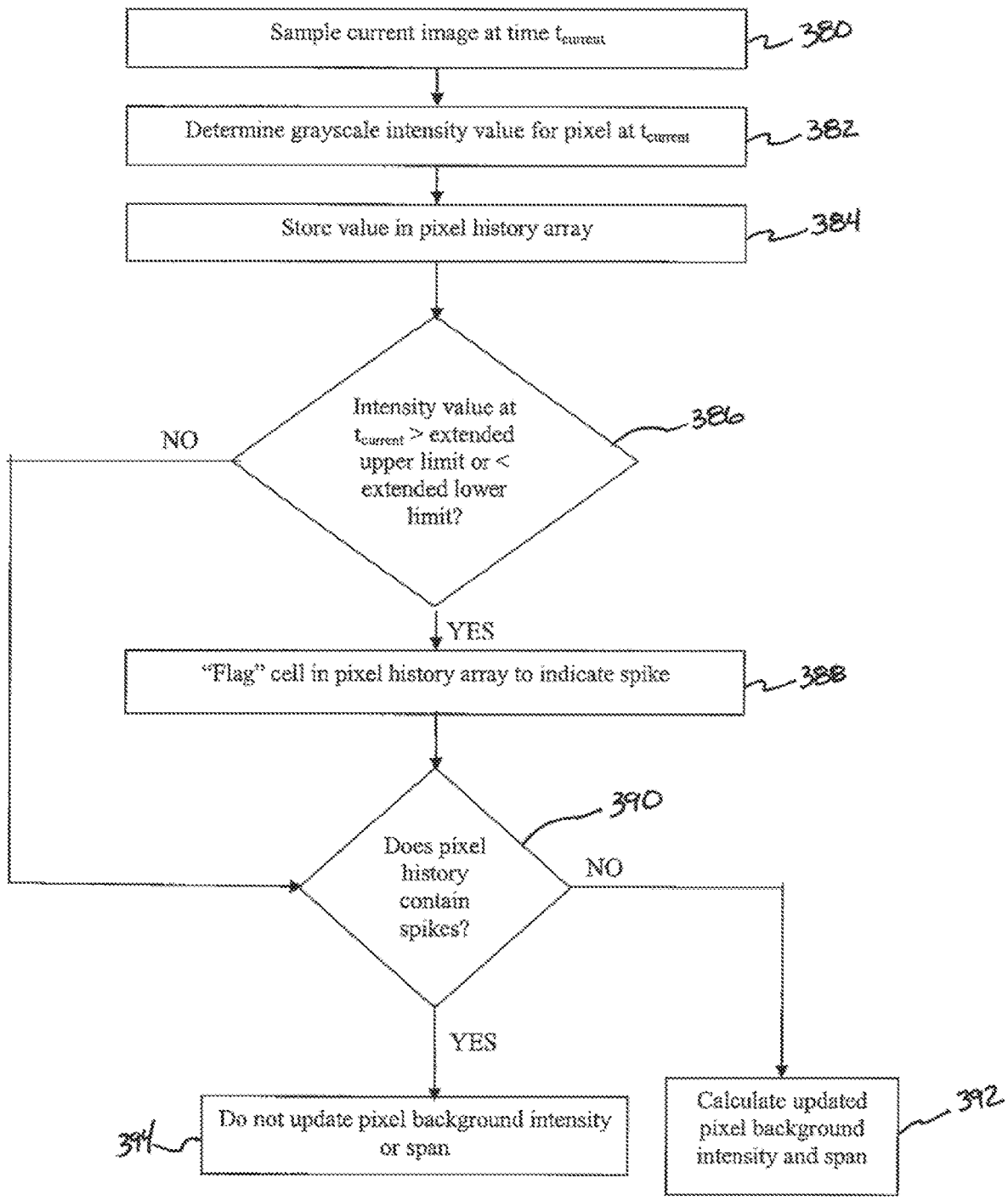
FIG. 26 is a flowchart of the method of updating a background, according to an embodiment of the present invention.

Referring to FIGS. 26-27, Steps 380 to 392 describe the process of updating background B.

In one embodiment, after defining background B in terms of a series of pixel history arrays $HP_{a,b}$, which include pixel intensity averages $I_{avg}$ and spans S, a current, or foreground, image 129 is captured by detector 128, 130. Then, in order to determine which pixels $P_{a,b}$ have changed significantly, thereby indicating motion, pixel intensities of the current image 129 are stored temporarily as foreground image array PF, and compared to stored background B intensity averages $I_{avg}$ and spans S.

Each pixel $PF_{a,b}$ in this new image 129 has a pixel intensity $PF_{a,b}I_{a,b}$ and in one embodiment, is subtracted from the background pixel intensity $P_{a,b}I_{a,b}$. If the magnitude of the difference between foreground pixel intensity $PF_{a,b}I_{a,b}$ and background pixel intensity $P_{a,b}I_{a,b}$ is greater than the magnitude of span S, a value equal to the magnitude of $(P_{a,b}I_{a,b}-PF_{a,b}I_{a,b}-S)$ is stored in a temporary motion image array MI. Otherwise, a zero is stored.

Figure 28:
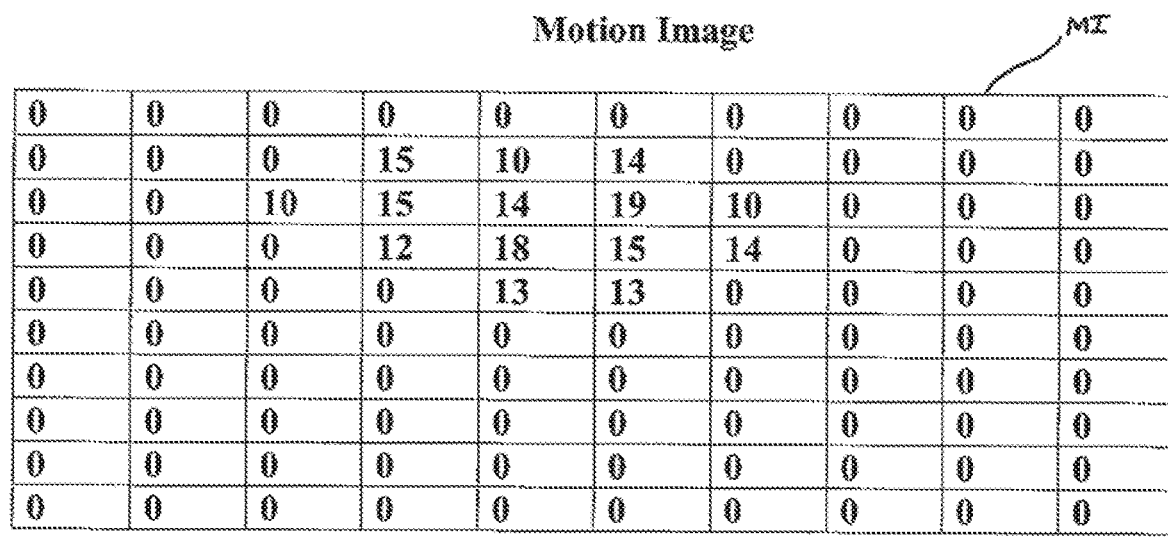
FIG. 28 is a motion image array, according to an embodiment of the present invention.

For example, if new foreground pixel intensity $PF_{1,1}I_{1,1}$ is 150, the background intensity $P_{1,1}I_{1,1}$ is 140, and the allowable span is 20, then the pixel value written to the temporary motion image $MI_{1,1}I_{1,1}$ is 0, meaning no change at all. If $PF_{1,1}I_{1,1}$ is 170 a value of 10 will be stored for $MI_{1,1}I_{1,1}$. Non-zero values indicate motion. FIG. 28 depicts an example of a 10×10 motion image array that includes multiple of motion pixels.

FIGS. 27a-d illustrate the updating process as just described.

In some embodiments, using well-known techniques, a Gaussian filter, such as a 5×5 Gaussian filter, may be executed over the motion image array MI to create a filtered motion image array, FMI. In other embodiments, the improvement gains due to filtering may not be required for a particular application.

Additionally, foreground image 129, for example, at time t=0, may also be compared to a previous image 129, for example, at t=−1, using the methods described above to compare foreground image 129 to background B. This provides an additional temporary image array showing motion between just the current image 129 and the previous image 129. Such an array is defined as last motion image LMI. A filtered version of LMI is designated FLMI.

Examples of a last motion image array LMI and a filtered last motion image array LMI are depicted in FIGS. 30 and 31.

Referring again to FIGS. 29 and 31, motion image arrays, either LMIs or FLMIs include differential pixel intensity data as described above. As described above, pixel cells with non-zero values in motion image arrays, "motion pixels", indicate possible motion at a pixel location in an image 129. In some embodiments, a second, simple filter may be employed to reduce the number of motion pixels by requiring the motion pixel value to be above a pre-defined threshold value, thereby decreasing the probability of false motion.

Figure 29:
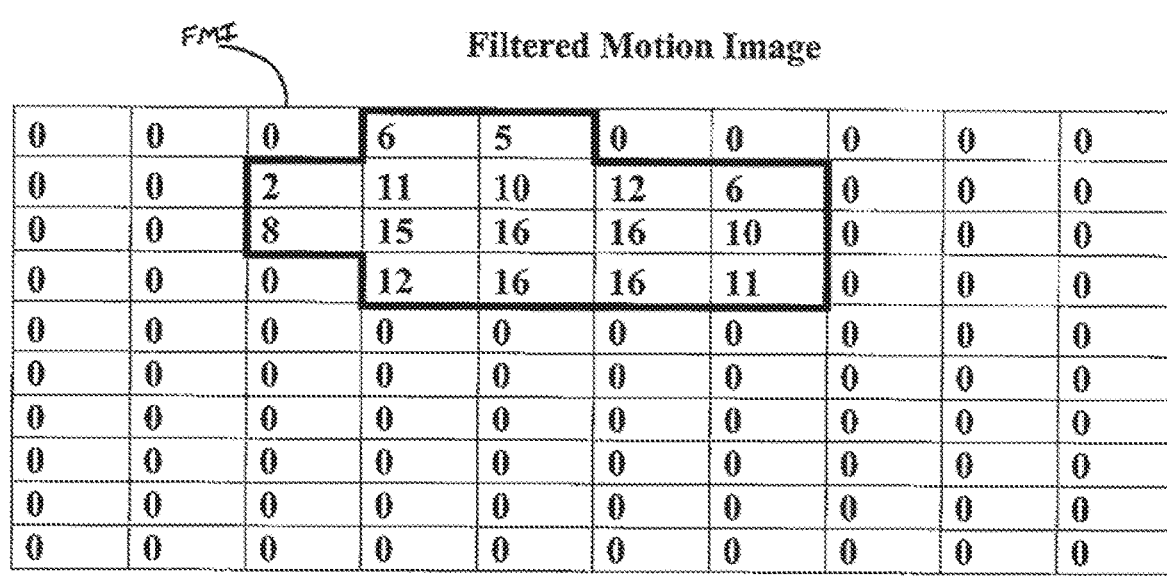
FIG. 29 is a filtered motion image array, according to an embodiment of the present invention.
Figure 32:
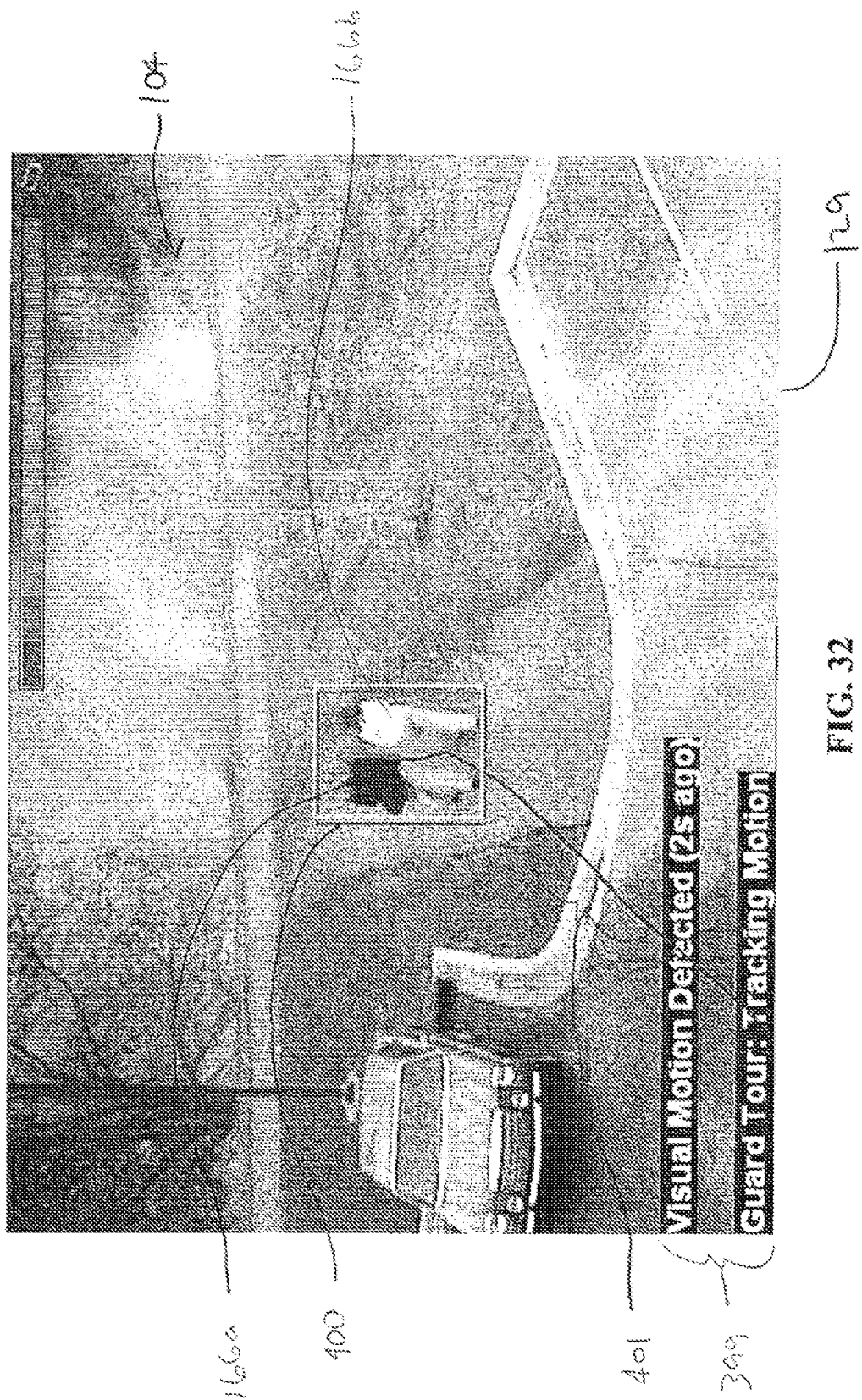
FIG. 32 is a screen image of an object with motion rectangles, according to an embodiment of the present invention.

Adjacent motion pixels may be grouped together, as indicated by shaded borders around the motion pixels of motion arrays EMI and FLMI, as depicted in FIGS. 29 and 31, respectively. These groups of motion pixels form motion blobs 400, and in some embodiments may be displayed on a screen overlaying image 129, and including motion information region 399 and motion path 401, for viewing by user 114, 115, as depicted in FIG. 32.

While motion blobs are being created, additional information is being stored about each motion blob 400.

First, Sobel edge detection is used on each motion blob 400 pixel to determine if the associated foreground pixel is an edge, and if the associated background pixel is an edge. A motion blob 400 pixel is flagged as a "foreground edge" if the foreground pixel is an edge, and the associated background pixel is not an edge, or vice versa. The pixel is flagged as a "new foreground edge" if the pixel is a foreground edge now, but was not a foreground edge in the previous image 129.

A "foreground edge count" is incremented for motion blob 400 if the associated foreground pixel is an edge. A "new edge count" is incremented for blob 400 if the pixel is flagged as a new foreground edge. A comparison of the new edge count to the foreground edge count provides a good indication of how much the actual content of blob 400 is changing versus uniform changes in pixel intensity, independent of the size of the object in the camera image. In other words, if a substantial amount of pixels in blob 400 are changing enough to continually create new edges and possibly cover old edges, it is much more likely there is an object 166 of importance identified in motion blob 400.

Motion blobs 400 may be transformed into one or more types of motion rectangles 402: a base motion rectangle 402a, an edge motion rectangle 402b, or a difference motion rectangle 402c. Similar to motion blobs 400, motion rectangles 402 indicate areas of motion, and may be displayed as a moving graphic overlaying an image 129 for viewing by user 114, 115.

Figure 33:
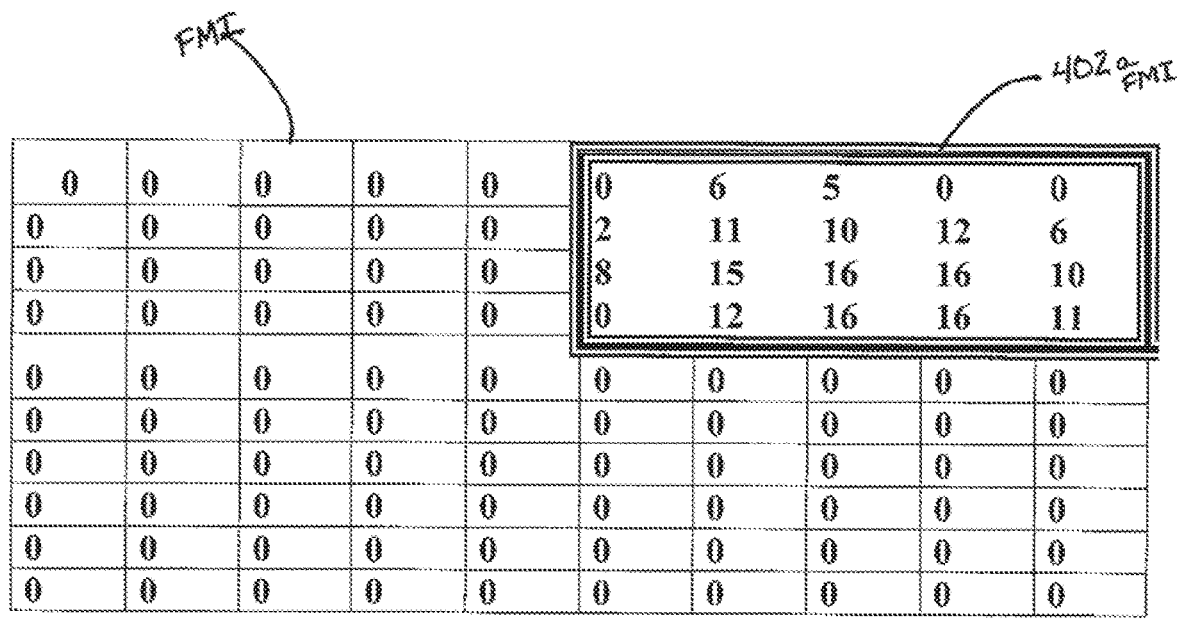
FIG. 33 is a last motion image array with a base motion rectangle, according to an embodiment of the present invention.
Figure 34:
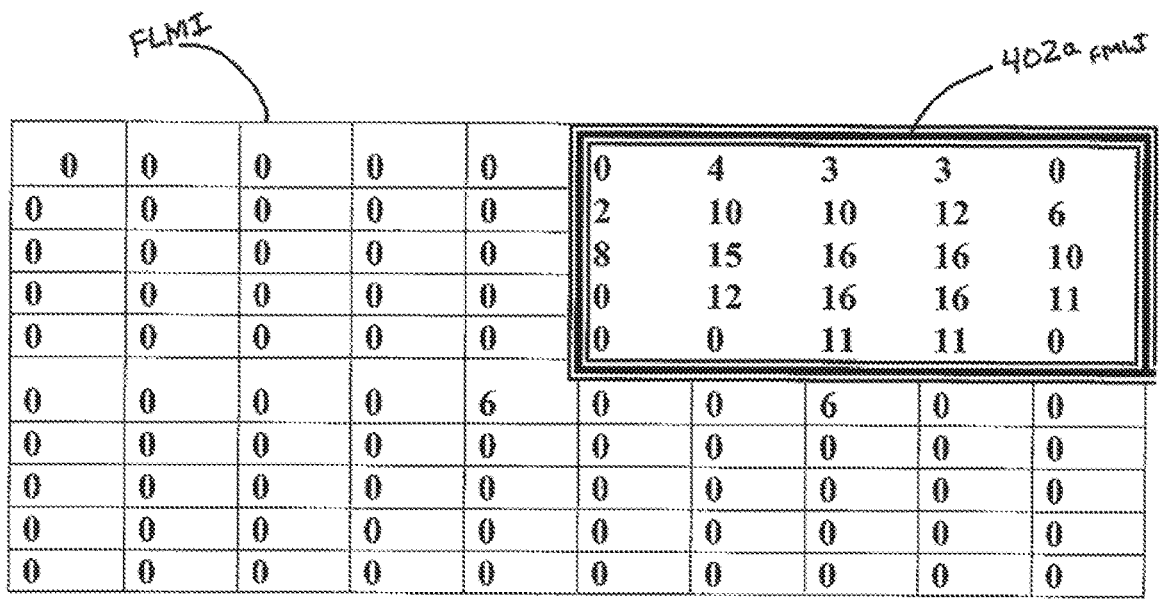
FIG. 34 is a filtered last motion image array with a filtered base motion rectangle, according to an embodiment of the present invention.

A base motion rectangle 402a is stored encompassing the entire blob area, and is used to describe the position of the blob. FIGS. 33 and 34 depict base motion rectangles 402 of motion arrays FMI and FLMI, respectively.

An edge rectangle 402b is stored only encompassing the foreground edge pixels of its corresponding motion blob 400. Edge motion rectangles 402b are generally preferred over base motion rectangles 402a to describe the position of a motion blob 400 if there are enough pixels. This rectangle typically does not include light shadows that should be ignored when calculating the size of a moving object 166.

A difference motion rectangle 402c is stored only encompassing blob pixels where the current image has changed from the previous image. (determined using the last motion image LMI). Difference motion rectangles 402c generally may be preferred over edge motion rectangles 402b if there are enough motion pixels available to create a significant difference motion rectangle 402c. Difference motion rectangles 402c are even better for tracking motion and identifying objects 166, because they do not include light shadows, and also provide an ability to zero in on exactly what is really moving within the entire area of motion blob 400.

Such methods make it possible for system 100 to discern repetitive background motion from true objects in motion, and eliminate false detections of motion due to changing background conditions as described above.

Even though motion blobs 400 are identified in each new image 129, motion blobs 400 or their motion rectangles 402, can be of any possible thing moving, including left-over image noise, precipitation, subtle lighting changes, etc. Motion blobs 400 may not necessarily represent an entire moving object 166. For example, it may be possible to have one person walking, but creating multiple blobs 400 if their shirt happens to be the same color of the background but their head and pants sufficiently contrast with background B.

Therefore, in order to solve this problem, a method of the present invention analyzes and correlates motion blobs 400 from one image 129 to the next, defining regions of interest (ROIs) 404, which may comprise multiple blobs 400 representing a single object 166 and examines whether defined regions of interest (ROIs) 404 are progressive and maintain a steady speed/size.

Referring now to FIGS. 35a-35h, series of images 129 at three different points in time are used to depict a method of forming and tracking ROIs 404.

Figure 35A:
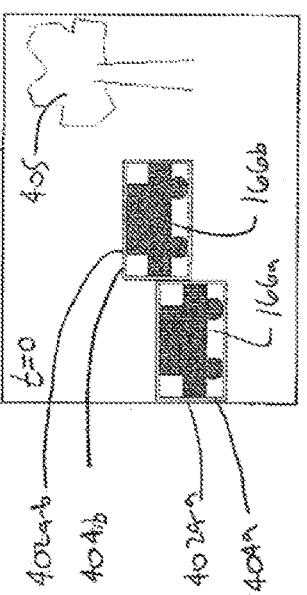
FIGS. 35a-h is a series of diagrams of two objects in motion and their corresponding regions of interest, according to an embodiment of the present invention.

Referring to FIG. 35a, at time t=0, image 129-0, two objects 166a and 166b in motion towards tree 405 are detected. Motion blobs 400a and 400b are defined, as are motion rectangles 402*a-a* and 402*a-b*. Although any of the three different kinds of motion rectangles 402*a,b,c* may be used, base motion rectangles 402*a* are used in this particular example. Because there initially are no ROIs 404 when motion is first detected, new ROIs 404*a* and 404*b*, equal in size and location to blobs 400*a* and 400*b*, are established.

Figure 35D:
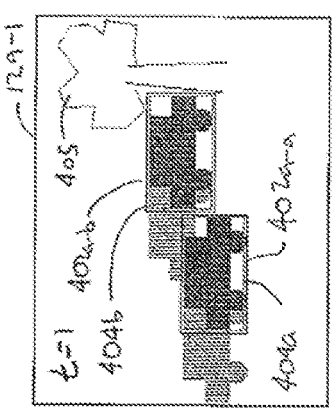
Figure 35G:
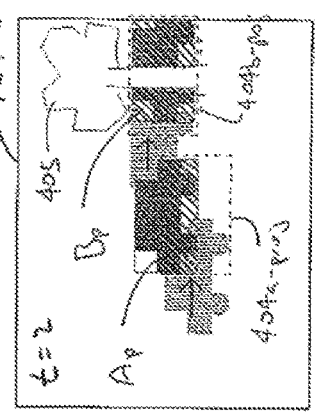
Figure 35B:
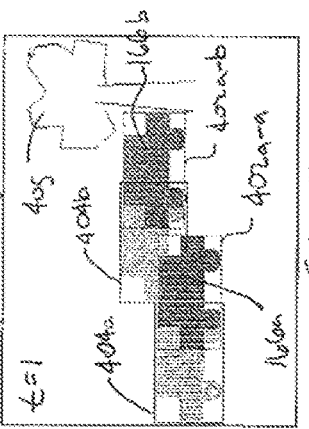

Referring to FIG. 35*b*, at time t=1, image 129-1, objects 166*a* and 166*b* have moved closer to tree 405. New motion rectangles 402*a-a* and 402*a-b* are created to correspond to the new positions of objects 166*a* and 166*b*. ROIs 404*a* and 404*b* remain available for analysis, and in some embodiments, appear as a screen graphic to user 114, 115.

Figure 35E:
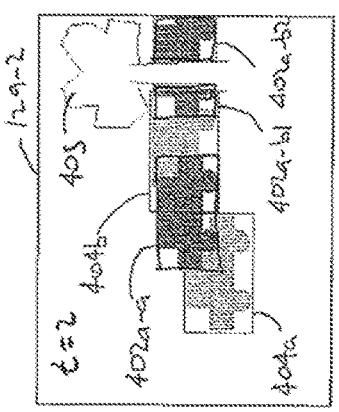
Figure 35H:
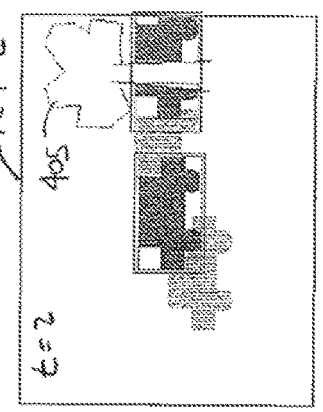
Figure 35C:
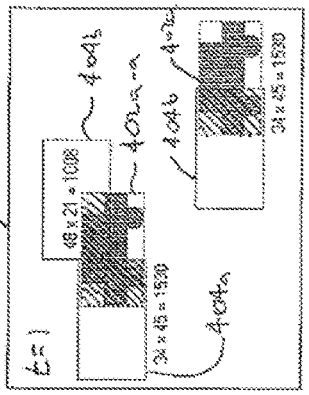

Referring to FIG. 35*c*, each motion rectangle 402*a* is compared to each ROI 404 in terms of pixel overlap. The pixel overlap of motion rectangle 402*a-a* is compared to ROI 404*a* to determine that the two have 1,530 pixels in common, while 404*a-a* has 1,008 pixels in common with 404*b*. Similarly, motion rectangle 402*a-b* has more pixels in common with ROI 404*b*.

Referring now to FIG. 35*d*, still at time t=1, image 129-1, new ROIs 404*a,b* are established corresponding to previously identified motion rectangles 402*a,b*.

Referring now to FIG. 35*e*, time t=2, image 129-2, objects 166*a* and 166*b* have moved, with a portion of object 166*b* being obscured by tree 405. In this situation, three motion rectangles 402*a* have been created, 402*a-a* associated due to object 166*a*, and 402*a-b*1 and 402*a-b*2 due to object 166*b*. Previously known systems likely would mistake the two portions of object 166*b*, identified by system 100 of the present invention as motion rectangles 402*a-b*1 and 402*a-b*2, as two independent moving objects 166. Further, a simple pixel overlap test may also result in a wrong association of 402*a-a* with ROI 404*b*. However, the described method of system 100 correctly identifies motion rectangles 402*a-b*1 and 402*a-b*2 as belonging to a single moving object 166*b*, by considering not only pixel overlap, but ROI 404 speed and direction as described below.

Figure 35F:
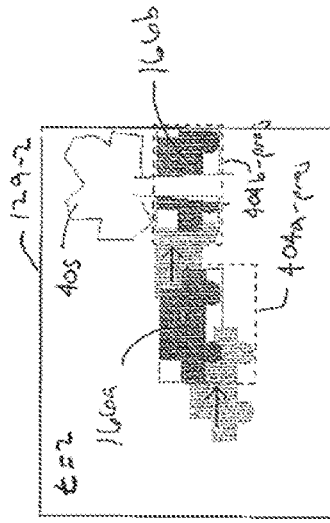

Referring to FIG. 35*f*, speed and direction of each ROI 404 is considered to project ROIs 404*a* and 404*b* from a time t=1 location to an expected or projected location at t=2, as indicated by the dashed rectangles 404*a*-proj and 404*b*-proj.

Referring to FIGS. 35*g* and 35*h*, a pixel overlap is then calculated per the shaded areas Ap and Bp, using projected ROIs 404, resulting in a correct identification of 404*a* and 404*b* at time t=2. This method is then repeated as necessary to continue tracking objects 166.

This process also ensures the size and position of ROIs 404 will change and move across the image fluidly.

An ROI 404 is deleted if a frame or image 129 is processed and no blobs 400 have been assigned to the ROI. Further, an ROI is initially invalid, and not reported to the geospatial engine.

An ROI 404 becomes pre-validated when all of the following conditions are true: First, ROI 404 has been assigned blobs 400 for a user-defined amount of consecutive images. Second, the size of ROI 404 has stayed relatively stable. Stability may be based upon a pre-defined percentage of change allowed for each ROI 404. Increasing and decreasing the percentage change allowed changes the sensitivity of system 100.

As described above, foreground/background edge characteristics are saved for all blobs 400. When these blobs 404 are assigned to ROIs 404, these characteristics are also passed on to ROIs 404. An ROI 404 is then given an object recognition value (ORV) based on a comparison between how many new foreground edges are in blob 404 versus how many edges already existed in the area of blob 404 in background B.

Pre-validated ROIs 404 with ORVs that exceed a minimum ORV substantially represent the spatial area of an object 166 in motion, and are therefore defined as object regions 406 when projected on to geospatial map 154. Such object regions 406 represent "valid" motion.

Figure 36:
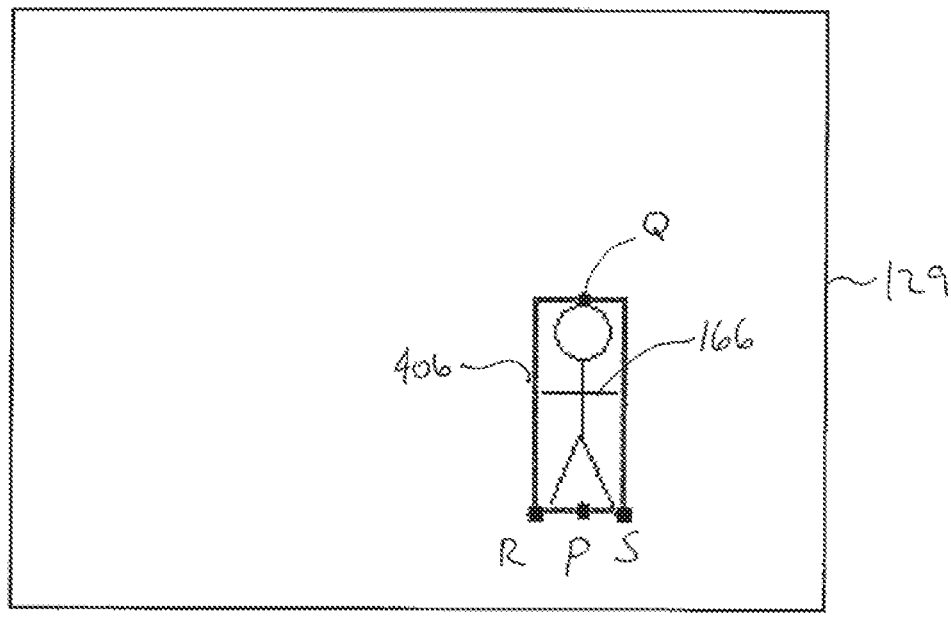
FIG. 36 is a diagram of an image of an object with its object region, according to an embodiment of the present invention.
Figure 37:
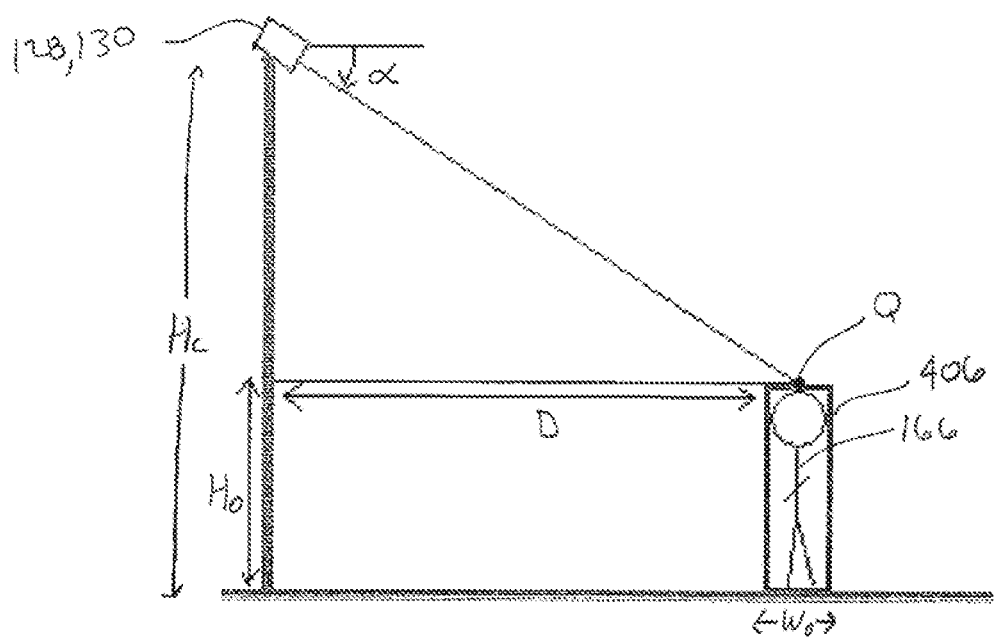
FIG. 37 is a diagram of a detector viewing an object and an object region, according to an embodiment of the present invention.

Referring to FIGS. 36 and 37, after object 166 is detected, camera image coordinates, in terms of pixels, are available for each side of object region 406. To determine a size of object region 406, the screen coordinates indicating the location of object region 406, in pixel terms, must first be transformed to three-dimensional detector model 160 coordinates. These coordinates combined with virtual detector properties of detector model 160 may be used to calculate object region properties such as object region height, width, speed, direction, and so on.

As depicted in FIG. 36, a moving object 166 is defined by its object region 406, with defining points P-S, appearing in image 129. Point P is a lower center point of object region 406, Q an upper center point, and R, S are lower corners. Image coordinates for points P-S are known, or can be easily determined via 3D detector model 160 of detector 128, 130.

To determine the coordinates of object region 406, first project point P from detector image 129 into 3D model 160 using methods described above. Next, find a 3D intersection point of a ray extending out from detector 128, 130 at angle α to point Q where the ray meets a distance of D. Subtract resulting z coordinate from detector height $H_c$ to get object 166 height $H_o$.

To get object width $W_o$, project points R and S onto detector model 160 or geospatial map 154 and calculate the Euclidean distance between them.

As described above, each object region 406 is only projected to detector model 160 or geospatial map 154 after it has accumulated a history of samples. These samples, in the form of time-stamped data describing object location coordinates x,y, are used to calculate a real-world speed Sp and direction Dr of object 166.

To calculate the angular direction Dr, location data over a specified time period, typically several seconds, is used. Data describing the most current location of the object is excluded. Next, all x,y, coordinates are averaged together to get Xavg and Yavg. Time stamps T are averaged determine an average time stamp Tavg. Next, calculate an average detector angle α' angle from Xavg,Yavg to most current image coordinates to indicate direction.

Speed Sp may be calculated by the following formula:

Distance from *X*avg,*Y*avg to current *x,y*/(*T*current−*T*avg).

As detector 128, 130 frames or images 129 are processed and new samples are added to existing object regions 406 on the detector side, the geospatial metrics of object regions 406 are also calculated and added to the respective object regions 406.

Such geospatial metrics are not only useful for generally tracking objects, but may also provide useful, real-time information to user 114, 115 who may be interested in filtering or pinpointing objects based on object metrics. Notably, previously known systems generally do not provide such real-time metrics as an object is being tracked.

Figure 38:
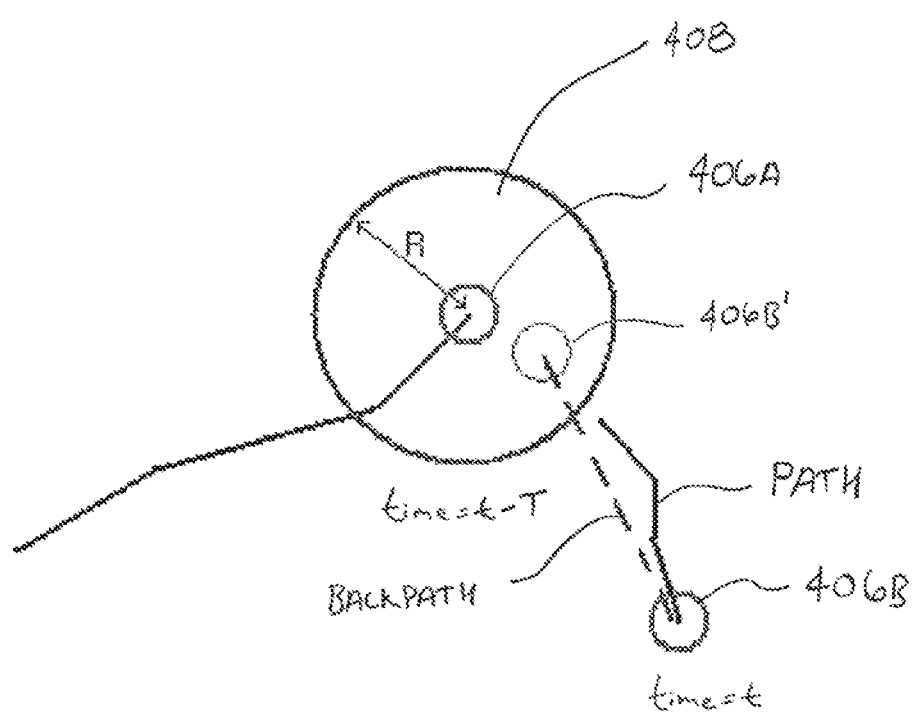
FIG. 38 is a diagram of an object region projected to a geospatial map at time t, and back-projected to an earlier time t-T, according to an embodiment of the present invention.

Referring to FIG. 38, after detector-specific object region 406 is projected to geospatial map 154, system 100 continues tracking object region 406. Further, while object 166 via its object region 406 is tracked over time, and in the detector view, projected object region 406 may change properties while "following" object 166, sometimes disappear and reappearing. This phenomenon appears as periodically changing data within detector model 160, and also, in some embodiments, as changing graphics to user 114, 115 viewing image 129. In one embodiment, user 114, 115 may view an image 129 of detector 128, 130 displaying object 166 in motion, with a graphic of rectangular object region 406 following, or tracking, object 166.

For example, this can happen if object 166 becomes partially obstructed, or especially if fully obstructed, by a tree, car, etc., and reemerges, or if parts of object 166 are same color and intensity as the portion of background B that it passes. In some embodiments, issues of this type are resolved by the methods described with reference to FIG. 35. When object regions 406 of object 166 are projected to geospatial map 154, it is important to group these multiple paths into one known object using detector-specific object grouping so that system 100 knows there is only one object 166 to track.

Figure 39:
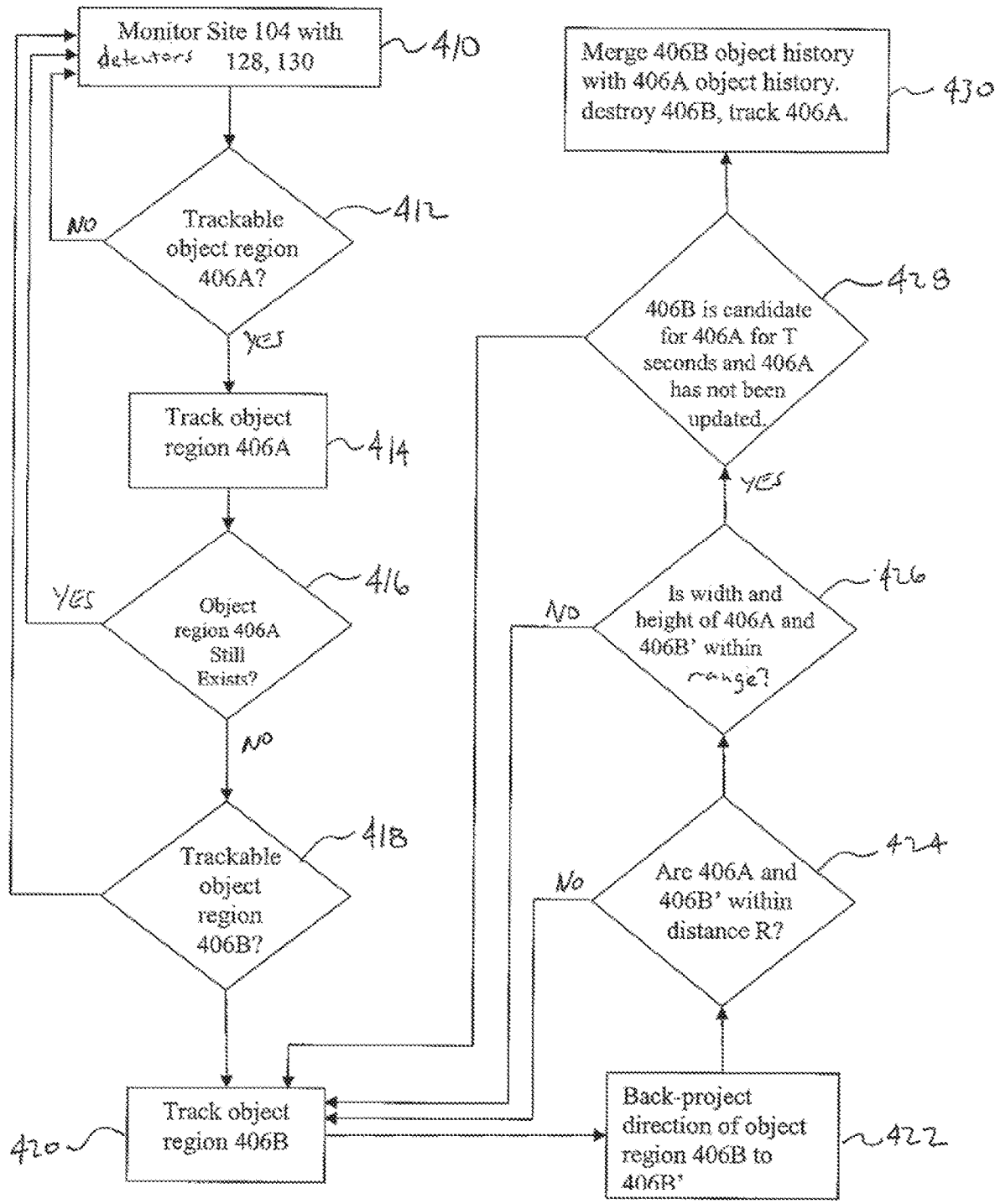
FIG. 39 is a flowchart of a geospatial detector-specific object grouping process, according to an invention of the present invention.

Referring to FIGS. 38 and 39, an embodiment of a process of geospatial detector-specific object grouping is depicted and described.

Referring specifically to FIG. 38, object region 406A exists at time t-T, where T is a period of time, typically several seconds. Area 408 is defined by radius R projecting out from object region 406A. Object region 406B appears at time t outside of area 408, having traveled along path PATH. Object region 406B', located within area 408, represents an estimated location of 406B had it existed, based upon a projected path BACKPATH.

Referring also to FIG. 39, the depicted flowchart describes the geospatial detector-specific object grouping process with reference to FIG. 38.

According to Step 410, site 104 is monitored using detector 128, 130. If a trackable object region 406A appears at Step 412, object region 406A is tracked. If no object region 406 is projected to geospatial 154, monitoring of site 104 by system 100 continues at Step 410. If object region 406A continually appears on geospatial map 154 and is therefore trackable, object region 406A will be tracked at Step 414.

According to Step 416, if object region 406A fails to exist, or disappears, at Step 418, system 100 checks for a second object region, object region 406B.

If object region 406B exists, it will be tracked according to Step 420.

Next, an actual path PATH of object region 406B is stored and used to determine an average speed and direction of object region 406B. The average speed and direction of 406B is used to project 406B along BACKPATH to 406B', which represents a theoretical location of object region 406B at the time that object region 406A ceased to exist, namely time t-T.

According to Step 424, if object region 406B' is not within area 408, defined by radius R and the center point of object region 406A at time t-T, the system 100 continues to track object region 406B, assuming that it is not related to object region 406A. If object region 406B' is within area 408, the width and height of 406A and 406B are compared at Step 426.

According to Step 426, if a height and width of 406A varies from 406B outside of a certain range, or tolerance, then tracking of object region 406B continues at Step 420. However, if the height and width of 406A is within a specified range, for example 50%, then object region 406B becomes a candidate for actually being object region 406A tracked at different points of time, according to Step 428.

Also according to Step 428, if 406B remains a candidate for 406A for a specified period of time T, or in other words if object region 406A has not been updated for time period T, then according to Step 430, the historical data of object regions 406B is merged into object region 406A, and object region 406B is destroyed. As such, object regions 406A and B become one object region 406. In one embodiment, time T is set to approximately two seconds. If time T is set too low, 406A and 406B may be incorrectly identified as a single object region 406. Alternatively, if time T is set too high, correlation becomes less likely.

On the other hand, if during time period T, object region 406A "reappears", then both object region 406B tracking continues according to Step 420.

Now that continuous paths of objects are available for each detector 128, 130, the next process is to combine each object regions 406 from each detector 128, 130 into a single geospatial object group.

Figure 40:
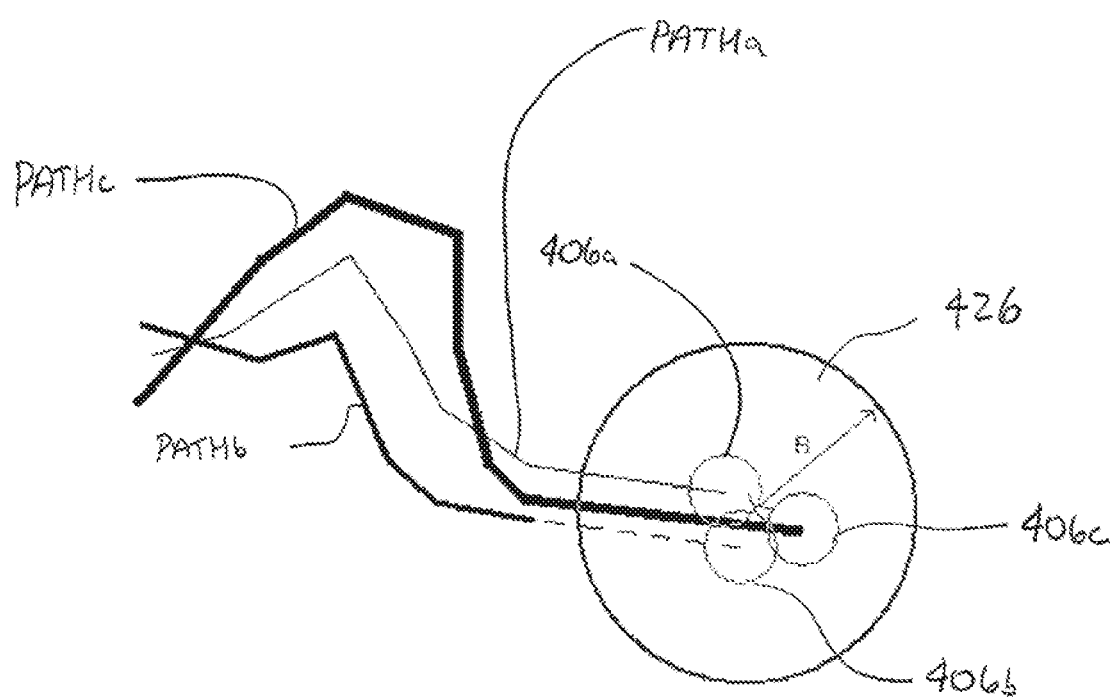
FIG. 40 is a diagram illustrating a geospatial multiple-detector object grouping method, according to an embodiment of the present invention.
Figure 41:
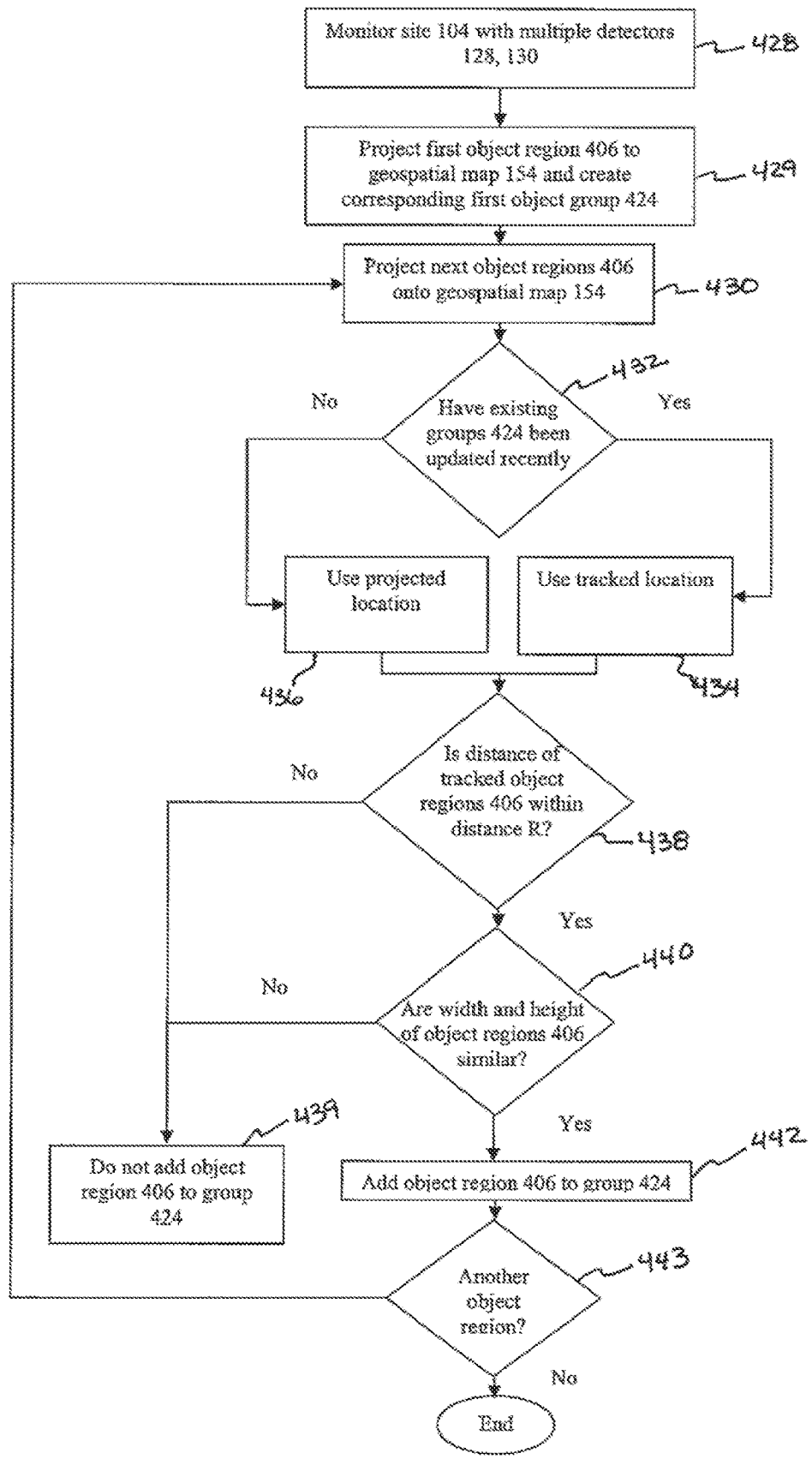
FIG. 41 is a flowchart of geospatial multiple-detector object grouping method illustrated by FIG. 40.

Referring now to FIGS. 40 and 41, an embodiment of a geospatial multiple-detector object grouping method is depicted and described.

Referring specifically to FIG. 40, in this embodiment, three object regions 406a,b,c, deriving from three different detectors 128, 130a,b,c, have been mapped to geospatial map 154. The method of the present invention determines whether object regions 406a,b,c are associated with a single moving object 166, or multiple moving objects 166a,b,c, and accordingly forms one or more groups 424 of object regions 406.

Referring also to FIG. 41, according to Step 428, site 104 is monitored with multiple detectors 128, 130a,b,c.

According to Step 429, a first object region 406 is projected to geospatial map 154, and a first object group 424 is created. First object group 424 is substantially the same as first object region 406, until additional object regions 406 are added, or until otherwise updated or modified.

According to Step 430, a next object region 406 is mapped to geospatial map 154.

According to Step 432, any existing groups 424 are checked for recent updates. According to Step 436, if not updated recently, the projected location is used. Otherwise, according to Step 434, the mapped, or tracked, location is used.

At Step 438, if the distance of a tracked object region 406 is not within a distance R of object group 424 for a specified time period T1, object region 406 is not added to group 424. If object region 406 is within R of object group 424, then dimensional characteristics of object region 406 are considered at Step 440. R and T1 may be determined based upon desired sensitivity of system 100. In one embodiment, T1 is approximately equal to 2 seconds.

According to Step 440, if the width and height of object region 406 is not similar, then object 406 is not added to group 424. In one embodiment, if both the width and height of object region 406 is not within 40% of the height and width of object group 424, then object region 406 is similar to object group 424, and is added to object group 424 at Step 442.

According to Step 443, if additional object regions 406 need to be considered, the steps above are repeated to determine whether each object region 406 should be added to group 424.

Furthermore, if an object region 406 matches multiple groups 424 the object-group pair with the smallest separation distance prevails.

The location, speed, and sizes of the group are determined by a weighted average of all its assigned objects. Most recently, updated objects are given more weight as opposed to objects that have stopped being updated (i.e. due to occlusion or leaving the view of the detector).

Every group 424 is periodically inspected to ensure that its assigned object regions from multiple detectors still belong in the same group 424. In the case of two people walking down a path and then separating in different directions, they may be detected as one object region 406 in the detector view at first, but then two object regions 406 are created when they separate. It is possible that the object group 424 may incorrectly have the first person from one detector grouped with the second person from another detector. This situation is handled by the following:

Gather current locations of each object region 406 contained a group 424. If an object region 406 has not been updated recently, its projected location is considered instead (based on its last known speed and time since it was updated). If any of the distances between the object region 406 locations and the group 424 location is larger than R for a period of T2 seconds, then the object region is removed from group 424. In one embodiment, time period T2 is approximately 3 seconds. Having time period T2 be longer than time period T1 makes it easier for an object region 406 to join an object group 424, as compared to leaving a group 424, potentially increasing the accuracy of system 100.

If an object region 406 is removed from a group 424, it then becomes available for grouping again.

Unlike known motion detection systems, by grouping regions of interest 406 and projecting these groups 424 onto a common geospatial map 154, system 100 of the present invention can detect and track multiple objects 166 using a variety of detectors and detection devices, as well as combine fragments of information, correlate between detectors, and finally analyze the information at a much higher meaningful level.

In order for system 100 to intelligently decide which groups the available primary PTZ detectors 130 should focus on at any moment, they are prioritized by variety of rules and zones.

Detection zones 460 define portions of geospatial map 154 that need to be monitored. Zones 460 are typically defined as polygons, but can also be poly-lines in the case of detecting when an object passes over a "line in the sand".

In one embodiment, system 100 assigns a relative priority ranking to each zone 460. In one embodiment, the priority range has a lower end of zero, for a least important zone, and an upper end of six, for an extremely important zone. Zone 460 priorities may be used to determine a relative threat of a moving object 166.

In one embodiment, zones 460 also have associated filters 462 that control what is detected and tracked within its boundaries. Filters may consist of minimum and maximum values for object width, height and speed. Even though all object regions 406 that are projected to geospatial map 154 are grouped according to the methods described above, in one embodiment, only those that pass through at least one filter 462 are examined further. Other types of filters may screen for a certain kinds of movement, screen for specific visual characteristics in an object 166, or in the case of a thermal camera, analyze temperature data to discern unauthorized objects 166.

Figure 42:
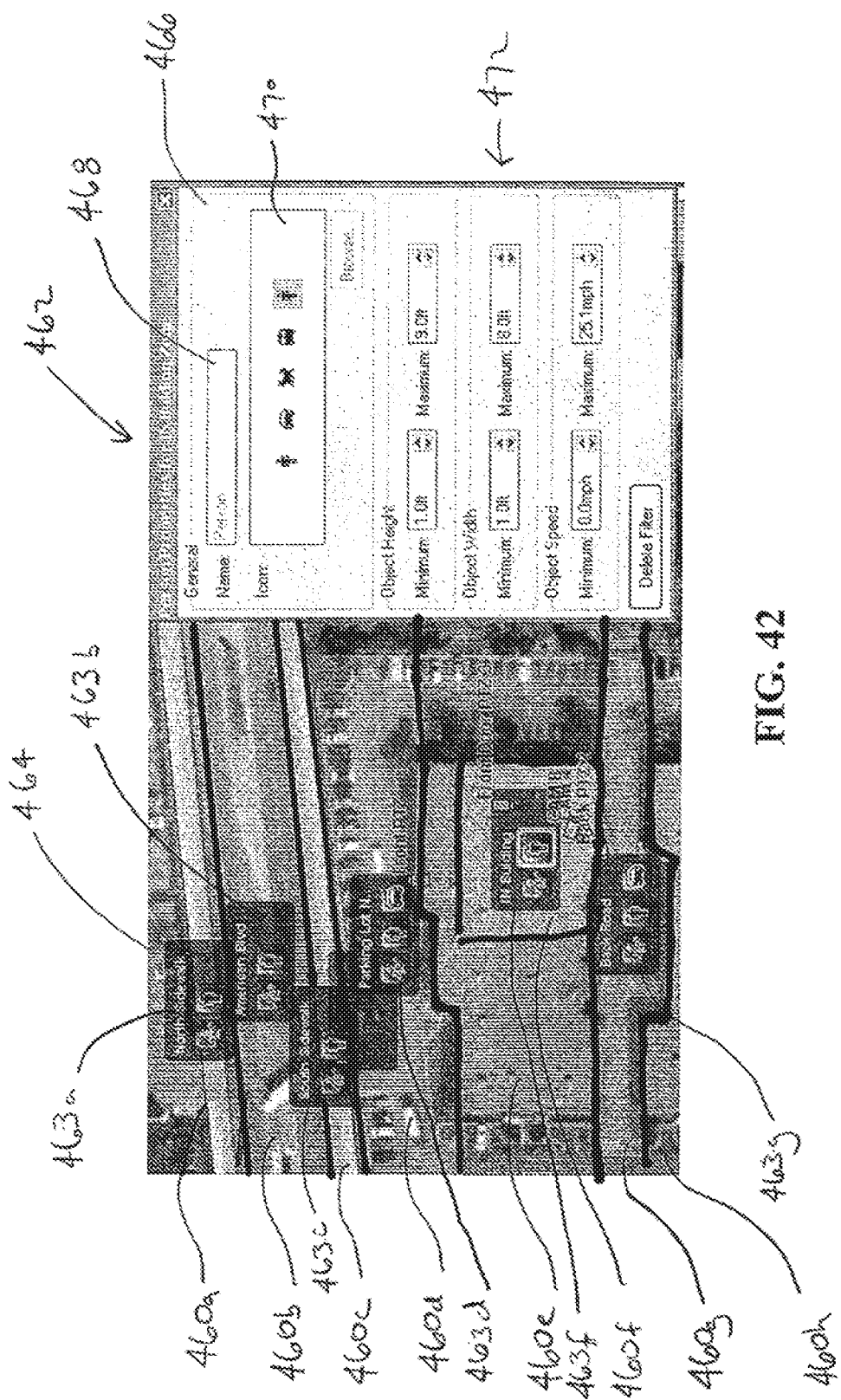
FIG. 42 is a screen image of a site with multiple monitored zones and a dialog box for creating filters, according to an embodiment of the present invention.

Referring to FIG. 42, an image 464 of a graphical user interface depicting a multi-zone monitored site 104 is depicted. In this particular embodiment, site 104 is divided into zones 460a-460h. With the exception of zones 460e and 460h, all zones include filters 462 subject to user control via graphical filter buttons 463 and user dialog box 466.

User 114, 115 may use user dialog box 466 to create customized filters 462. Such customized filters 462 may be used to filter, or specifically detect, certain types of objects 166 or movement. As depicted in FIG. 42, user dialog box 466 includes identification entry box 468, object selection menu 470, and object characteristic entry boxes 472. In the example of FIG. 42, a filter 462 is set to detect only persons via criteria such as a minimum height of 1 ft., maximum height of 9 ft., minimum width of 1 ft., maximum width of 8 ft, and speed up to 25.1 mph. It will be appreciated that any number of filters 462 may be created to focus system 100 on moving objects 166 bearing any number of detectable features.

Figure 43:
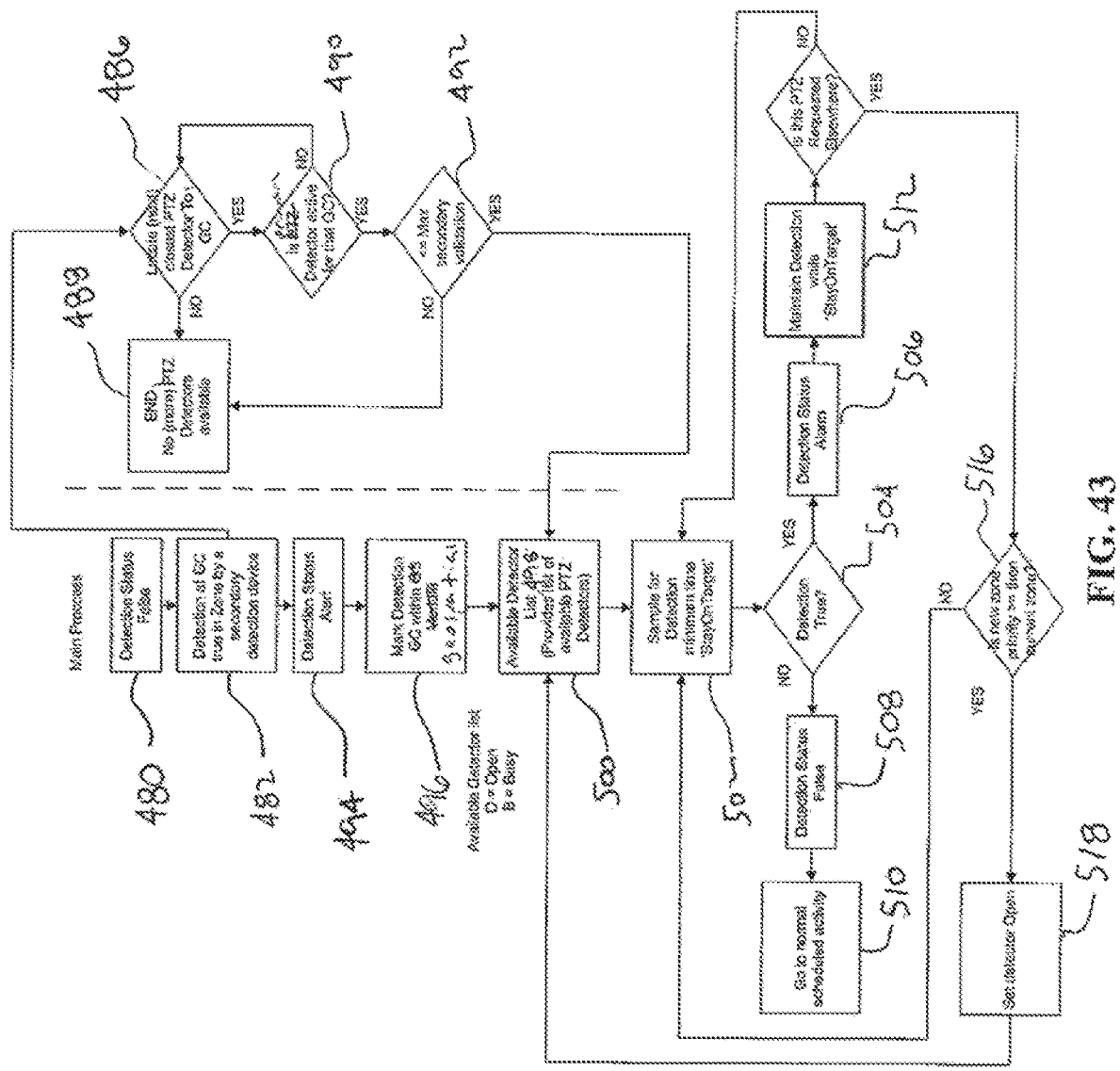
FIG. 43 is a flowchart of a method of prioritizing detectors and validating detected motion, according to an embodiment of the present invention.
Figure 44:
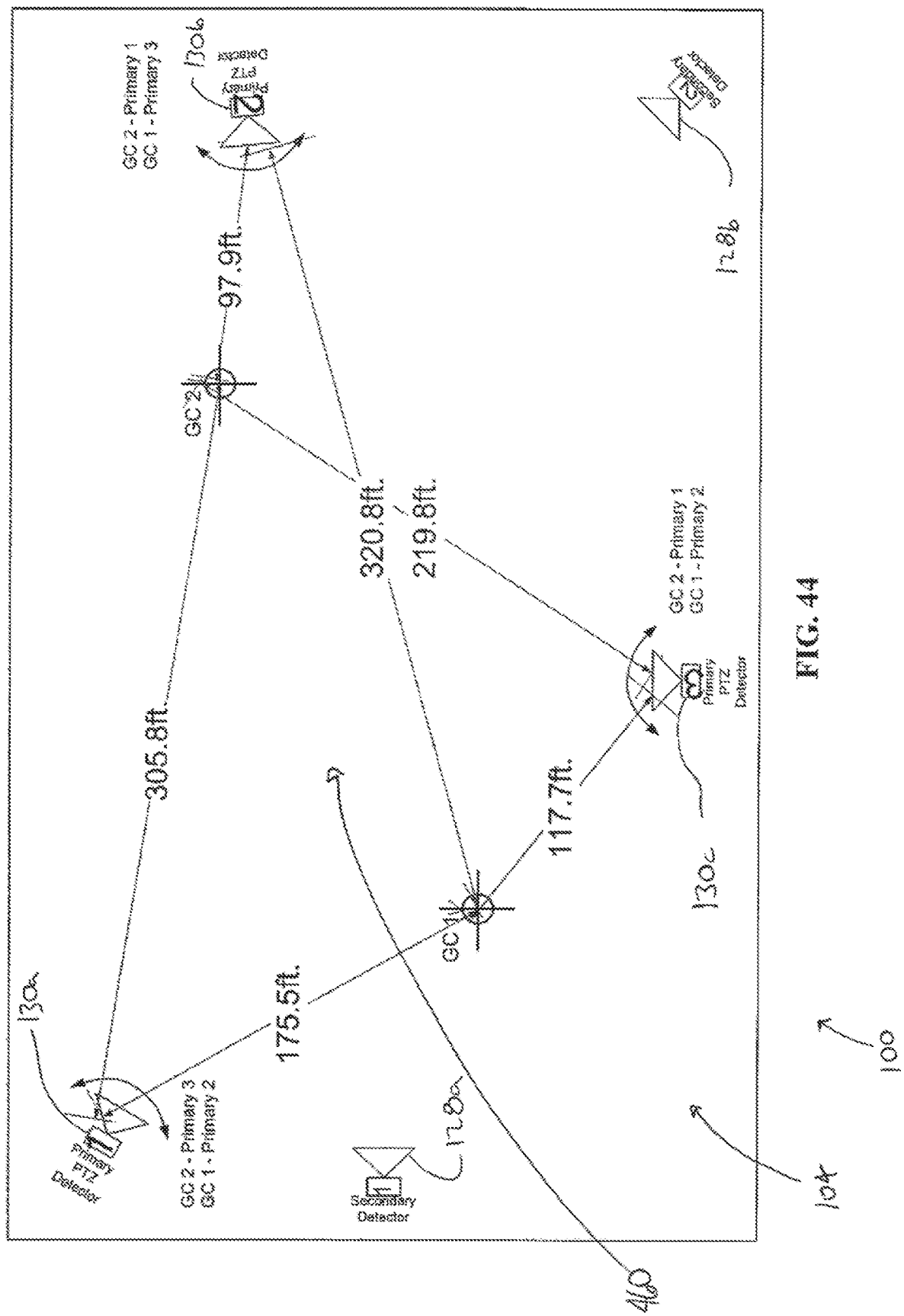
FIG. 44 is a diagram of a monitored site with prioritized detectors, according to the method of FIG. 43.

Referring to FIGS. 43 and 44, a method of prioritizing detectors 128, 130, and validating detected motion is depicted.

Initially, at Step 480, a detection status of system 100 is "false", meaning that no validated motion is detected. At Step 482, an object 166 in motion has been detected in a zone 460, its object region projected to geospatial map 154, causing the detection status of system 100 to change to "alert", according to Step 484.

In this embodiment, motion has been detected by a secondary detector 128, rather than a primary PTZ detector 130. Motion detected by a secondary detector 128 must be verified by a primary detector 130 before it is validated. Motion detected by a primary detector is presumed valid and is processed immediately according to the methods and systems described above, and does not require detection by a second detector 128, 130.

After motion is detected by secondary detector 128, review of available primary detectors 130 is undertaken via Steps 488 to 492.

According to Step 486, primary PTZ detector 130 that is the closest primary detector to the identified GC is located, or determined. If no additional primary PTZ detectors 130 are available, determination is complete per Step 488. If "yes", the primary detector 130 is checked to see whether it is active for the identified CC where motion was detected at Step 490. If detected object 166 in motion may be "seen" by detector 130, it may be considered "active."

If that primary detector 130 is the next closest, and is active in the zone 460 where motion was detected, that primary detector 130 is checked to see whether the maximum number of validating detectors has been reached, according to Step 492. An administrator, or user 114, 115 may determine the maximum number of primary detectors 130 that may attempt to validate motion detection by a secondary detector 128.

The result of steps 486 to 492 is compilation of a list 500 of available and active primary detectors 130 that are close to the identified GC.

For example, in the embodiment depicted in FIG. 44, site 104 is monitored by system 100, which includes three primary PTZ detectors 130a,b,c, and two secondary detectors 128a, b. Motion has been detected at GC1 and GC2 in zone 460. According to the methods described above, detector 130b becomes the first primary detector for GC1 primarily because it is the closest available detector 130, and becomes the third primary detector for GC2, because it is the third closest to GC1. Similarly, primary PTZ detector 130c becomes the first primary detector for GC1, and the second primary detector for GC 2; primary PTZ detector 130a becomes the second primary detector for GC 1 and the third primary detector for GC2. In this depiction, all primary PTZ detectors 130 are active and not requested by other zones According to Step 496, the GC of detected object 166 in motion is noted and stored, while at Step 488, system 100 creates an available primary detector list 490. In one embodiment, list 490 would be a list of available primary PTZ detectors 130. In one embodiment, list 490 may include all primary detectors 130, each having a designation open, meaning available, or busy, meaning unavailable.

According to Step 502, all primary detectors 130 on list 498 begin sampling for detection for a minimum period of time. The minimum amount of time may be set by user 114, 115 or an administrator, based on desired system 100 sensitivity.

If motion is detected at the end of the minimum time period, at Step 504, the detection status of system 100 is elevated to "alarm at Step 506. Otherwise, if motion is not detected at the end of the minimum time period, the detection status is "false" as indicated at Step 508, causing system 100 to resume normal scheduled activities at Step 510.

According to Step 512, if the detection status is elevated to alarm, primary PTZ detectors 130 continue to stay on target, or track object 166.

If, according to Step 514, a primary PTZ detector 130 is not requested elsewhere, i.e., in another zone 460, that particular primary PTZ detector 130 continues to stay on target in the original zone 460, per Step 502. If that particular primary PTZ detector 130 is requested elsewhere, a zone priority check is done at Step 516.

According to Step 516, if the new zone 460 is an equal or greater priority than the current zone 460, then that particular primary PTZ detector 130 becomes open, per Step 518, meaning it is available for use in other zones, including the new zone 460 as requested. Otherwise, that particular primary PTZ detector 130 stays on target per Step 500.

Figure 45:
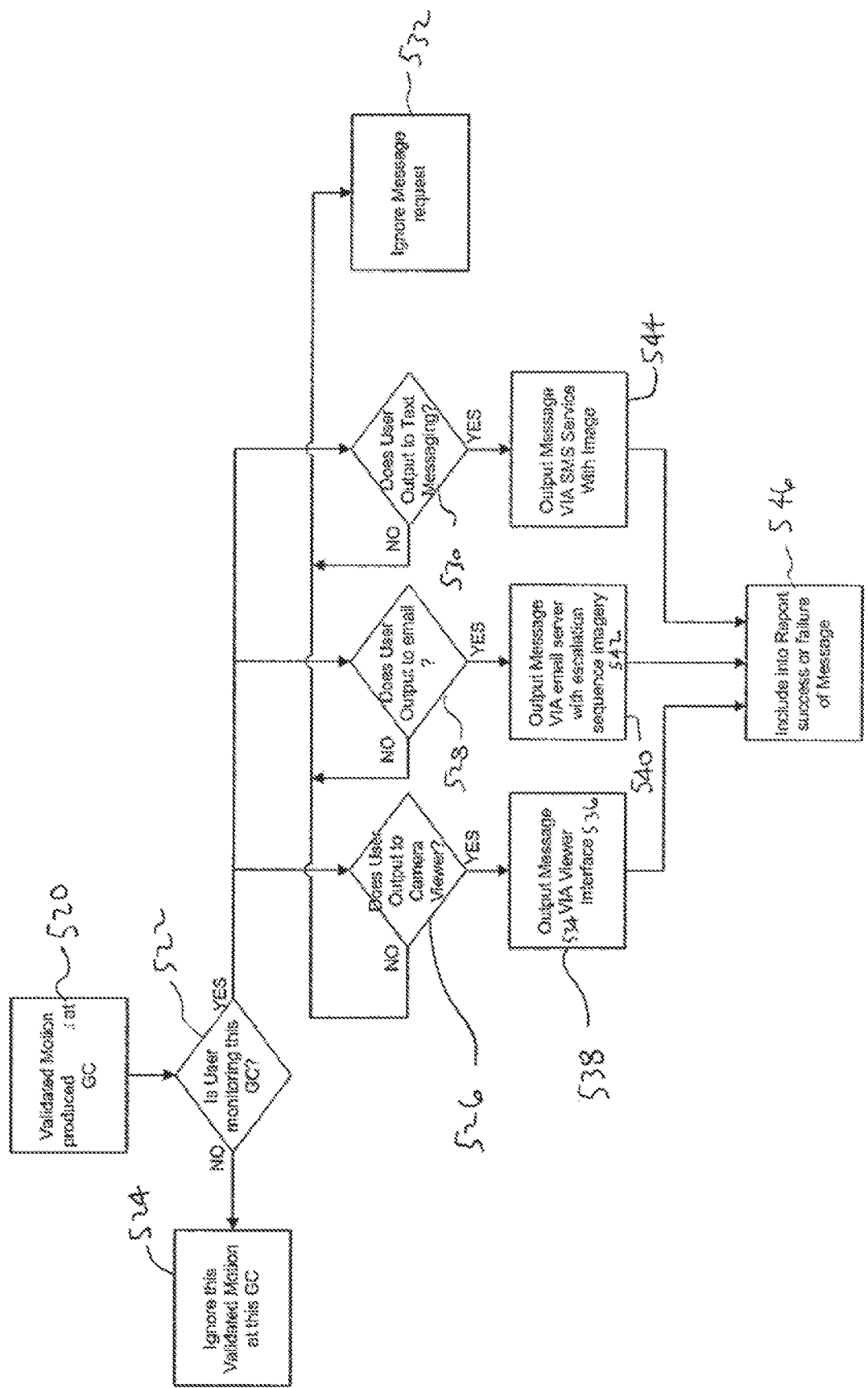
FIG. 45 is a flowchart of an alarm notification method, according to an embodiment of the present invention.

Referring to FIG. 45, the present invention provides systems and methods for notifying users 114, 115 of alarms.

In general, system 100 allows users 114, 115 to determine whether to receive an alarm notice, and how such a notice is to be delivered.

More specifically, according to Step 520, validated motion is detected and a GC identified. According to Steps 522 and 524, if user 114, 115 has elected not to monitor validated motion at the identified GC, the validated motion is ignored. If user 114, 115 has elected to monitor the identified GC, then the notification method is checked via Steps 526 to 530.

If user 114, 115 has elected to view validated motion using a camera viewer, or some sort of system for viewing the images produced by detectors 128, 130, then an output message 534 is sent via a viewer, or user 114, 115, interface 536 according to Step 538.

According to Step 528, if user 114, 115 has elected to receive alarm messages 534 via e-mail, then, according to Step 540, alarm message 534 is sent via e-mail server. In some embodiments, images in the form of escalation sequence imagery 542 may accompany alarm message 534. In one embodiment, escalation sequence imagery 542 includes sequences of images 129 from detectors 128, 130. Further escalation sequence imagery 542 may be sequenced in a manner that prioritizes images 129 such that the most important images are transmitted first, or otherwise emphasized.

According to Step 544, if user 114, 115 has elected to receive SMS notifications, alarm message 534 will be sent via SMS service, along with images, possibly including escalation sequence imagery 542.

In one embodiment, if user 114, 115 has not elected any methods of notification, according to Step 532, alarm messages 534 may be ignored.

In one embodiment, according to Step 546, the success or failure sending and/or receipt of alarm messages 534 are included in a report.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:
1. A video management system comprising:
a plurality of distributed on-site detector controllers (ODCs) including:
    controller hardware of at least one controller processor and controller memory operably coupled to the at least one controller processor; and
    instructions, when executed on the controller hardware, cause the controller hardware of the plurality of distributed ODCs to:
        receive sensor data from a plurality of operably coupled sensors,
        generate one or more sensor-specific virtual models for each of the plurality of operably coupled sensors, wherein generating includes an identical process for each of the plurality of operably coupled sensors, including building a corresponding virtual view of a site for each of the plurality of operably coupled sensors view, wherein each sensor-specific virtual model of the one or more sensor-specific virtual models comprises spatial data in the form of a 3D spatial environment, and temporal data in the form of a fourth dimension of time,
        generate an autonomously generated real-time, comprehensive master geospatially-referenced four-dimensional (4D) virtual model of a geographic area based on the one or more sensor-specific virtual models using a simulation, wherein the master 4D virtual model comprises the spatial data in the form of the 3D spatial environment derived from the one or more sensor-specific virtual models, wherein the master 4D virtual model comprises the temporal data in the form of the fourth dimension of time derived from the one or more sensor-specific virtual models, wherein the master 4D virtual model continuously integrates the spatial data and the temporal data from the one or more sensor-specific virtual models in real time to track objects over time within the master 4D virtual model, wherein the autonomous generation excludes human intervention in integrating the one or more sensor-specific virtual models into the master 4D virtual model, autonomously analyze the sensor data for relevance, and generate a plurality of real-time geospatially-referenced alarm-level events based on the analyzation for relevance, each real-time geospatially-referenced alarm-level event of the plurality of real-time geospatially-referenced alarm-level events including:

a geospatial location of at least one object within the master 4D virtual model at a past time, a present time, and a future time, the geospatial location determined based on tracking of the at least one object within the master 4D virtual model, wherein the tracking includes seamless handoffs between the one or more sensor-specific virtual models within the master 4D virtual model as needed during the tracking process, wherein the seamless handoffs are executed by dynamically reconciling discrepancies between the one or more sensor-specific virtual models in real time, to maintain continuous tracking of the at least one object within the master 4D virtual model, at least one physical attribute for the at least one object captured by the sensor data, wherein the at least one physical attribute includes trajectory forecasting, and an object identity based on the geospatial location over time, wherein the plurality of real-time geospatially-referenced alarm-level events are triggered when a predictive risk threshold is exceeded, wherein the predictive risk threshold is dynamically adjusted based on real-time data from the plurality of operably coupled sensors.

2. The video management system of claim 1, wherein the at least one physical attribute includes an object height, an object width, an object heading, and an object speed, wherein the object height and the object width are dynamically adjusted based on real-time sensor fusion across the plurality of operably coupled sensors.

3. The video management system of claim 1, wherein a coordinate system of the master 4D virtual model is established using global positioning system (GPS) coordinates of calibrating markers, wherein the master 4D virtual model integrates the GPS coordinates with real-time sensor data from the plurality of operably coupled sensors to continuously update object geospatial locations within the 3D spatial environment over time.

4. The video management system of claim 1, wherein instructions, when executed on the controller hardware, cause the controller hardware to identify each of the at least one object present within the master 4D virtual model of the geographic area using a predictive identity signature derived from the master 4D virtual model, wherein the predictive identity signature is based on projected object locations and spatiotemporal grouping patterns over time, such that the at least one object can be tracked independently.

5. The video management system of claim 1, wherein the instructions, when executed on the controller hardware, cause the controller hardware to further update the geospatial location, the at least one physical attribute, and a sensor identity in real time, wherein the updates are synchronized across the plurality of distributed ODCs using a real-time reconciliation algorithm that correlates sensor data and resolves positional discrepancies based on pixel overlap calculations within the master 4D virtual model.

6. The video management system of claim 1, wherein the instructions, when executed on the controller hardware, cause the controller hardware to further update the geospatial location, the at least one physical attribute, and a sensor identity, for a period of time after the at least one object is no longer active, wherein the updates predict potential reactivation based on historical 4D data within the master 4D virtual model, the historical 4D data including pixel history arrays and grouped object regions maintained post-motion.

7. The video management system of claim 1, further comprising:

a management server (MS) including MS hardware of at least one MS processor and MS memory operably coupled to the at least one MS processor; and instructions, when executed on the MS hardware and based on a new alarm-level event or an updated alarm-level event, cause the MS hardware to autonomously receive at least one alarm-level event from the plurality of distributed ODCs and to prioritize the at least one alarm-level event based on a zone-specific threat ranking without user input.

8. The video management system of claim 7, wherein the instructions, when executed on the MS hardware and based on a new alarm-level event or an updated alarm-level event, cause the MS hardware to further group at least one of the plurality of real-time geospatially-referenced alarm-level events by predictive risk categories derived from zone-specific filters, and store the grouped at least one of the plurality of real-time geospatially-referenced alarm-level events with associated escalation sequence imagery.

9. The video management system of claim 7, further comprising:

a multi-detector viewer, wherein the MS further comprises instructions, when executed on the MS hardware and based on a new alarm-level event or an updated alarm-level event, cause the MS hardware to display at least one of the plurality of real-time geospatially-referenced alarm-level events exceeding a predictive risk threshold via the multi-detector viewer to a user in real-time, the multi-detector viewer being remote from the MS and configured to present validated motion data from correlated detector inputs.

10. The video management system of claim 9, wherein the at least one alarm-level event is displayed only upon a determination that the at least one object is a threat, wherein the threat determination is based on a predictive risk score derived from the master 4D virtual model using real-time trajectory projections and zone-specific filter criteria.

11. The video management system of claim 9, wherein the MS further comprises instructions, when executed on the MS hardware, cause the MS hardware to display, via the multi-detector viewer and based on a new alarm-level event or an updated alarm-level event, path data of the at least one object for alarm-level events across multiple object regions, wherein the path data includes a sensor identity, geospatial location, an object height, an object width, an object heading, and an object speed, derived from real-time pixel overlap calculations and zone-specific filters.

12. The video management system of claim 9, wherein the MS further comprises instructions, when executed on the MS hardware, cause the MS hardware to display, via the multi-detector viewer and based on a new alarm-level event or an updated alarm-level event, real-time video for alarm-level events only, including a sensor identity, an object height, an object width, an object heading, and an object speed, derived from validated motion data across correlated detectors.

13. The video management system of claim 7, wherein the at least one alarm-level event is displayed as an image snapshot at its corresponding geospatial location on the master 4D virtual model, wherein the image snapshot is annotated with predictive trajectory data derived from real-time projections within the master 4D virtual model.

14. The video management system of claim 1, wherein a coordinate system of the master 4D virtual model is defined by a dynamically updated matrix of pixels corresponding to straight-line distance measurements captured by the plurality of operably coupled sensors, wherein the dynamically updated matrix is adjusted in real-time based on sensor-specific depth data projected onto the 3D spatial environment.

15. A method of operating a video management system, the video management system including a plurality of distributed on-site detector controllers (ODCs) having controller hardware of at least one controller processor and controller memory operably coupled to the at least one controller processor, the method comprising:
  receiving, with the controller hardware, sensor data from one or more a plurality of operably coupled sensors;
  generating one or more sensor-specific virtual models for each of the plurality of operably coupled sensors, wherein generating includes an identical process for each of the plurality of operably coupled sensors, including building a corresponding virtual view of a site for each of the plurality of operably coupled sensors view, wherein each sensor-specific virtual model of the one or more sensor-specific virtual models comprises spatial data in the form of a 3D spatial environment, and temporal data in the form of a fourth dimension of time,
  generating an autonomously generated real-time, comprehensive master geospatially-referenced four-dimensional (4D) virtual model of a geographic area based on the one or more sensor-specific virtual models using a simulation, wherein the master 4D virtual model comprises the spatial data in the form of the 3D spatial environment derived from the one or more sensor-specific virtual models, wherein the master 4D virtual model comprises the temporal data in the form of the fourth dimension of time derived from the one or more sensor-specific virtual models, wherein the master 4D virtual model continuously integrates the spatial data and the temporal data from the one or more sensor-specific virtual models in real time to track objects over time within the master 4D virtual model, wherein the autonomous generation excludes human intervention in integrating the one or more sensor-specific virtual models into the master 4D virtual model,
  autonomously analyzing the sensor data for relevance; and
  generating a plurality of real-time geospatially-referenced alarm-level events based on the analyzation for relevance, each real-time geospatially-referenced alarm-level event of the plurality of real-time geospatially-referenced alarm-level events including:
    a geospatial location of at least one object within the master 4D virtual model at a past time, a present time, and a future time, the geospatial location determined based on tracking of the at least one object within the master 4D virtual model, wherein the tracking includes seamless handoffs between the one or more sensor-specific virtual models within the master 4D virtual model as needed during the tracking process, wherein the seamless handoffs are executed by dynamically reconciling discrepancies between the one or more sensor-specific virtual models in real time, to maintain continuous tracking of the at least one object within the master 4D virtual model,
    at least one physical attribute for the at least one object captured by the sensor data, wherein the at least one physical attribute includes trajectory forecasting, and
    an object identity based on the geospatial location over time, wherein the plurality of real-time geospatially-referenced alarm-level events are triggered when a predictive risk threshold is exceeded, wherein the predictive risk threshold is dynamically adjusted based on real-time data from the plurality of operably coupled sensors.

16. The method of operating a video management system of claim 15, further comprising autonomously transmitting at least one alarm-level event from the plurality od distributed ODCs to a management server (MS) without user-initiated commands, prior to user notification configuration.

17. The method of operating a video management system of claim 16, wherein the MS includes MS hardware of at least one MS processor and MS memory operably coupled to the at least one MS processor, the method further comprising:
  performing video analytics on the plurality of real-time geospatially-referenced alarm-level events to determine a trigger based on a predictive threat assessment using zone-specific filter criteria; and
  displaying, with the MS hardware and based on the trigger, the at least one alarm-level event via a multi-detector viewer to a user in real-time.

18. The method of operating a video management system of claim 15, wherein a coordinate system of the master 4D virtual model is defined by a dynamically updated matrix of pixels corresponding to straight-line distance measurements captured by the plurality of operably coupled sensors, wherein the dynamically updated matrix is adjusted in real-time based on sensor-specific depth data projected onto the 3D spatial environment.

* * * * *